(12) United States Patent
Jung et al.

(10) Patent No.: US 11,677,447 B2
(45) Date of Patent: Jun. 13, 2023

(54) APPARATUS AND METHOD FOR SELECTING CELL IN WIRELESS COMMUNICATION SYSTEM

(71) Applicant: Samsung Electronics Co., Ltd., Suwon-si (KR)

(72) Inventors: Doyoung Jung, Suwon-si (KR); Sangkyou Ryou, Suwon-si (KR); Junhee Jeong, Bucheon-si (KR); Ingil Baek, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/528,725

(22) Filed: Nov. 17, 2021

(65) Prior Publication Data
US 2022/0077896 A1    Mar. 10, 2022

Related U.S. Application Data

(63) Continuation of application No. 15/696,551, filed on Sep. 6, 2017, now Pat. No. 11,184,057.
(Continued)

(30) Foreign Application Priority Data

Nov. 18, 2016    (KR) .......................... 10-2016-0154471

(51) Int. Cl.
*H03D 1/04*     (2006.01)
*H03D 1/06*     (2006.01)
(Continued)

(52) U.S. Cl.
CPC ........... *H04B 7/043* (2013.01); *H04B 7/0408* (2013.01); *H04B 7/0814* (2013.01)

(58) Field of Classification Search
CPC .... H04B 7/043; H04B 7/0408; H04B 7/0814; H04B 7/088; H04B 1/707; H04B 7/0695
(Continued)

(56) References Cited

U.S. PATENT DOCUMENTS 7,277,709 B2    10/2007    Vadgama
8,036,656 B2    10/2011    Jeong et al.
(Continued)

FOREIGN PATENT DOCUMENTS

CN    1407822 A    4/2003
CN    102378311 A    3/2012
(Continued)

OTHER PUBLICATIONS

Samsung; Discussion on Beam Measurement for 5G New Radio Interface in mmWave Frequency Bands; 3GPP TSG RAN WG2 #94; R2-163652; May 23-27, 2016; Nanjing, China.
(Continued)

*Primary Examiner* — Phuong Phu
(74) *Attorney, Agent, or Firm* — Jefferson IP Law, LLP

(57) ABSTRACT

The present disclosure relates to a pre-5$^{th}$-Generation (5G) or 5G communication system to be provided for supporting higher data rates Beyond 4$^{th}$-Generation (4G) communication system such as Long Term Evolution (LTE). An apparatus of a terminal in a wireless communication system is provided. The apparatus includes at least one transceiver and at least one processor operatively coupled to the at least one transceiver. The at least one processor is configured to control the transceiver to communicate through a cell determined based on information regarding a strength of a received signal for a first cell and a path diversity (PD) for the first cell. The PD comprises information regarding paths associated with the first cell.

18 Claims, 30 Drawing Sheets

Related U.S. Application Data

(60) Provisional application No. 62/383,784, filed on Sep. 6, 2016.

(51) Int. Cl.
| | |
|---|---|
| *H03K 5/01* | (2006.01) |
| *H03K 6/04* | (2006.01) |
| *H04B 1/10* | (2006.01) |
| *H04L 1/00* | (2006.01) |
| *H04L 25/08* | (2006.01) |
| *H04B 7/0426* | (2017.01) |
| *H04B 7/0408* | (2017.01) |
| *H04B 7/08* | (2006.01) |

(58) Field of Classification Search
USPC .............................. 375/346, 350, 229–231
See application file for complete search history.

(56) References Cited

U.S. PATENT DOCUMENTS

| | | | |
|---|---|---|---|
| 8,121,602 | B2 | 2/2012 | Yi et al. |
| 9,288,733 | B2 | 3/2016 | Dimou et al. |
| 2003/0083069 | A1 | 5/2003 | Vadgama |
| 2008/0130582 | A1 | 6/2008 | Lee et al. |
| 2008/0227447 | A1 | 9/2008 | Jeong et al. |
| 2010/0034096 | A1* | 2/2010 | Yin ................. H04B 1/707 370/241 |
| 2011/0182200 | A1 | 7/2011 | Wan et al. |
| 2013/0045690 | A1* | 2/2013 | Seol ................ H04B 7/0695 455/63.4 |
| 2013/0155847 | A1 | 6/2013 | Li et al. |
| 2013/0286960 | A1 | 10/2013 | Li et al. |
| 2013/0301454 | A1 | 11/2013 | Seol et al. |
| 2015/0319754 | A1 | 11/2015 | Ishida et al. |
| 2019/0069229 | A1 | 2/2019 | Lee et al. |
| 2019/0150009 | A1* | 5/2019 | Zhang ................. H04B 7/088 370/252 |

FOREIGN PATENT DOCUMENTS

| | | | |
|---|---|---|---|
| CN | 104284434 | A | 1/2015 |
| CN | 104303477 | A | 1/2015 |
| CN | 105188109 | A | 12/2015 |
| CN | 103313324 | B | 2/2016 |
| CN | 105828416 | A | 8/2016 |
| CN | 105991255 | A | 10/2016 |
| EP | 2 928 251 | A1 | 10/2015 |
| EP | 2 759 170 | B1 | 5/2016 |
| JP | 2012-217176 | A | 11/2012 |
| RU | 2 435 308 | C2 | 11/2011 |
| WO | 2004/039100 | A2 | 5/2004 |
| WO | 2013/048096 | A1 | 4/2013 |
| WO | 2015/105353 | A1 | 7/2015 |
| WO | 2017/123078 | A1 | 7/2017 |
| WO | 2017/218762 | A1 | 12/2017 |
| WO | 2018/017840 | A1 | 1/2018 |
| WO | 2018/027924 | A1 | 2/2018 |
| WO | 2018/034698 | A1 | 2/2018 |

OTHER PUBLICATIONS

Indian Office Action dated Nov. 23, 2021; Indian Appln. No. 201917013905.
Australian Office Action dated Jan. 12, 2022; Australian Appln. No. 2017323374.
3rd Generation Partnership Project; "Technical Specification Group Services and System Aspects Policy and charging control architecture"; Jun. 2016; pp. 245; 3GPP TS 23.203 V13.8.0; (Release 13); 650 Route des Lucioles—Sophia Antipolis, Valbonne —France.
European Search Report dated Apr. 24, 2020; European Appln. No. 17849087.6-1220 / 3510815 PCT/KR2017009781.
Russian Office Action with English translation dated Oct. 6, 2020; Russian Appln. No. 2019109969.
Chinese Office Action with English translation dated Jan. 27, 2021; Chinese Appln. No. 201780055232.9.
Russian Office Action with English translation dated Mar. 10, 2021; Russian Appln. No. 2019109969.
Australian Office Action dated Sep. 9, 2021; Australian Appln. No. 2017323374.
European Examination Report dated Oct. 4, 2021; European Appln. No. 17 849 087.6-1216.
LTE-Advanced; Joint handover scheme based on carrier aggregation in LTE-Advanced system; China Academic Journal Electronic Publishing House; http://www.cnki.net; Jun. 2012; CN.
Intel Corporation; Multiple TAT and TA Group Handling for CA; 3GPP TSG RAN WG2 Meeting #75bis; R2-115378; Oct. 10-14, 2011; Zhuhai, China.
Chinese Office Action with English translation dated Sep. 28, 2021; Chinese Appln. No. 201780055232.9.
Australian Notice of Acceptance dated May 11, 2022; Australian Appln. No. 2017323374.

\* cited by examiner

APPARATUS AND METHOD FOR SELECTING CELL IN WIRELESS COMMUNICATION SYSTEM

CROSS-REFERENCE TO RELATED APPLICATION(S)

This application is a continuation application of prior application Ser. No. 15/696,551, filed on Sep. 6, 2017, which is based on and claims priority under 35 U.S.C. § 119(e) of a U.S. Provisional application filed on Sep. 6, 2016 in the U.S. Patent and Trademark Office and assigned Ser. No. 62/383,784, and 35 U.S.C. § 119(a) of a Korean patent application filed on Nov. 18, 2016 in the Korean Intellectual Property Office and assigned Serial number 10-2016-0154471, the entire disclosure of each of which is hereby incorporated by reference.

TECHNICAL FIELD

The present disclosure relates to a wireless communication system. More particularly, the present disclosure relates to an apparatus and a method for selecting a cell in a wireless communication system.

BACKGROUND

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

In a mobile communication system, supporting the mobility of a terminal is essential. A $5^{th}$-generation (5G) system also supports the mobility of a terminal. To this end, the terminal may continuously measure the quality of a serving cell that currently provides service and the quality of neighboring cells and report the same to a network. In order to determine the quality of cells, it is required to consider the strengths of signals received from the corresponding cells. However, in a beamforming-based wireless communication system, when a cell is selected based only on the strength of a received signal, the cell that is able to serve its purpose may not be actually selected. Accordingly, a reference for selecting a cell through a new method is required.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and a method for effectively selecting a cell in a wireless communication system.

Another aspect of the present disclosure provides an apparatus and a method for defining a cell in a wireless communication system.

Another aspect of the present disclosure provides an apparatus and a method for determining the optimal received signal strength of a cell in a wireless communication system.

Another aspect of the present disclosure provides an apparatus and a method for determining path diversity (PD) of a cell in a wireless communication system.

Another aspect of the present disclosure provides an apparatus and a method for discovering an optimal cell in a wireless communication system.

Another aspect of the present disclosure provides an apparatus and a method for determining an operation mode of a terminal for determining an optimal cell in a wireless communication system.

Another aspect of the present disclosure provides an apparatus and a method for reporting on measurement through beamforming in a wireless communication system.

Another aspect of the present disclosure provides an apparatus and a method for selecting a primary cell or a secondary cell in a wireless communication system.

Another aspect of the present disclosure provides an apparatus and a method for selecting a master cell group (MCG) or a secondary cell group (SCG) in a wireless communication system.

In accordance with an aspect of the present disclosure, an apparatus of a terminal in a wireless communication system is provided. The apparatus includes at least one transceiver and at least one processor operatively coupled to the at least one transceiver. The at least one processor is configured to control the at least one transceiver to communicate through a cell determined based on information regarding a strength of a received signal for a first cell and a PD for the first cell. The PD comprises information regarding paths associated with the first cell.

In accordance with another aspect of the present disclosure, an apparatus of a base station (BS) in a wireless communication system is provided. The apparatus includes at least one transceiver and at least one processor operatively coupled to the at least one transceiver. The at least one processor is configured to receive a measurement result for a first cell from a terminal and identify a cell to perform communication with the terminal. The measurement result comprises information regarding a strength of a received signal for the first cell and a PD for the first cell. The PD comprises information regarding paths associated with the first cell.

In accordance with another aspect of the present disclosure, a method of operating a terminal in a wireless communication system is provided. The method includes communicating through a cell determined based on information regarding a strength of a received signal for a first cell and a PD for the first cell. The PD comprises information regarding paths associated with the first cell.

In accordance with another aspect of the present disclosure, a method of operating a BS in a wireless communication system is provided. The method includes receiving a measurement result for a first cell from a terminal and identifying a cell to perform communication with the terminal. The measurement result comprises information regarding a strength of a received signal for the first cell and a PD for the first cell. The PD comprises information regarding paths associated with the first cell.

An apparatus and a method according to various embodiments of the present disclosure can select a cell that serves an intended purpose by defining the cell in consideration of beams.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
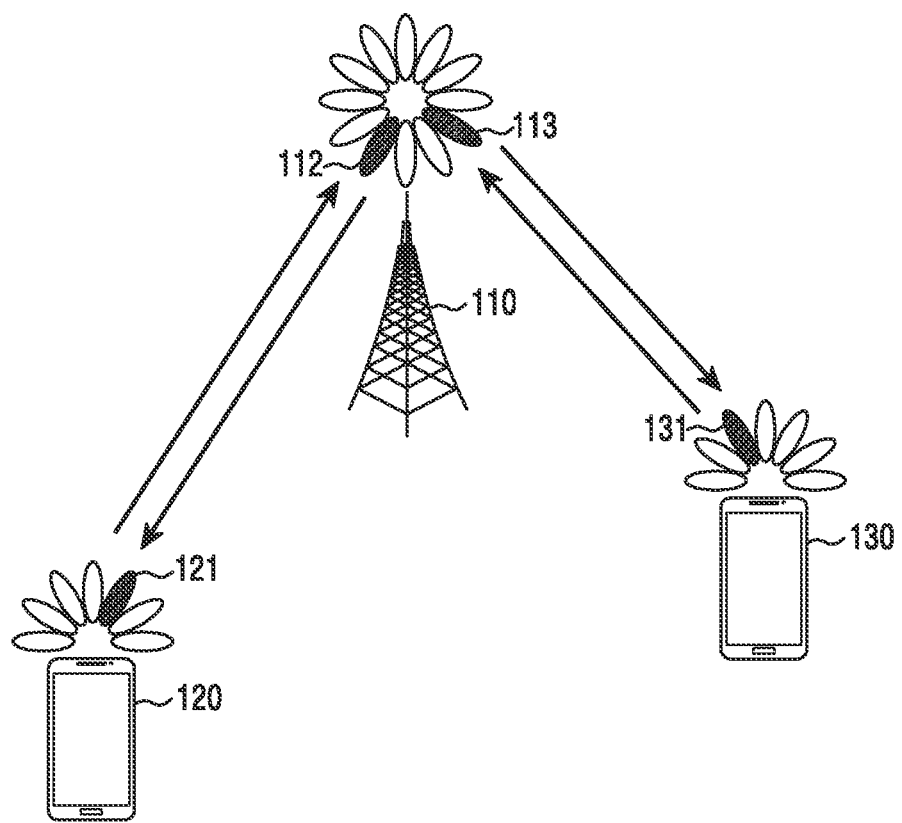
FIG. 1 illustrates a wireless communication system according to various embodiments of the present disclosure.

The following description with reference to the accompanying drawings is provided to assist in a comprehensive understanding of various embodiments of the present disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the present disclosure. Accordingly, it should be apparent to those skilled in the art that the following description of various embodiments of the present disclosure is provided for illustration purposes only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terms used in the present disclosure are only used to describe specific embodiments, and are not intended to limit the present disclosure. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude embodiments of the present disclosure.

Hereinafter, various embodiments of the present disclosure will be described based on an approach of hardware. However, various embodiments of the present disclosure include a technology that uses both hardware and software and thus, the various embodiments of the present disclosure may not exclude the perspective of software.

The expression "a first", "a second", "the first", or "the second" used in various embodiments of the present disclosure may modify various components regardless of the order and/or the importance but does not limit the corresponding components. When an element (e.g., first element) is referred to as being "(functionally or communicatively) connected," or "directly coupled" to another element (second element), the element may be connected directly to another element or connected to another element through yet another element (e.g., third element).

The expression "configured to" as used in various embodiments of the present disclosure may be interchangeably used with, for example, "suitable for", "having the capacity to", "designed to", "adapted to", "made to", or "capable of" in terms of hardware or software, according to circumstances. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a generic-purpose processor (e.g., central processing unit (CPU) or application processor (AP)) that can perform the corresponding operations by executing one or more software programs stored in a memory device.

The present disclosure relates to an apparatus and a method for selecting a cell in a wireless communication system. More specifically, the present disclosure describes technology for selecting a cell through a procedure of determining path diversity (PD) in a wireless communication system.

The terms referring to a signal, the terms referring to a channel, the terms referring to a measurement value, the terms referring to control information, the terms referring to network entities, and the terms referring to elements of a device are used only for convenience of description. Therefore, the present disclosure is not limited by the terms described below, and other terms having equivalent technical meanings may be used.

The terms referring to control information used in the following description, the terms for calculation states (e.g., a mode and an operation), the terms referring to data (e.g., information or a value), the terms referring to network entities (e.g., a cell or a 5GNB), the terms referring to messages (e.g., reporting or a signal), and the terms referring to elements of the device are employed for convenience of description. Therefore, the present disclosure is not limited by the terms described below, and other terms having equivalent technical meanings may be used.

Although the present disclosure describes various embodiments based on the terms used in some communication standards (e.g., long-term evolution (LTE) and LTE-advanced (LTE-A) systems), they are only examples for the description. Various embodiments of the present disclosure may be easily modified and applied to other communication systems.

FIG. 1 illustrates a wireless communication system according to an embodiment of the present disclosure.

Referring to FIG. 1, a base station (BS) 110, a terminal 120, and a terminal 130 are illustrated as some of the nodes using a wireless channel in a wireless communication system. FIG. 1 illustrates only one BS, but another BS, which is the same as or similar to the BS 110, may be further included.

The BS 110 is network infrastructure element that provides wireless access to the terminals 120 and 130. The BS 110 has coverage defined for a predetermined geographical region based on the distance at which a signal can be transmitted. The BS 110 may be referred to as an "access point (AP)", an "eNodeB (eNB)", a "$5^{th}$-generation (5G) node", a "5G NodeB (NB)", a "wireless point", a "transmission/reception point (TRP)", or other terms having equivalent technical meaning, as well as a "BS".

Each of the terminals 120 and 130 is a device used by a user, and performs communication with the BS 110 through a wireless channel. Depending on the case, at least one of the terminals 120 and 130 may operate without user involvement. At least one of the terminals 120 and 130 may be a device that performs machine-type communication (MTC), and may not be carried by the user. Each of the terminals 120 and 130 may be referred to as "user equipment (UE)", a "mobile station", a "subscriber station", a "remote terminal", a "wireless terminal", a "user device", or other terms having the equivalent technical meaning, as well as "terminal".

The BS 110, the terminal 120, and the terminal 130 may transmit and receive wireless signals in millimeter-wave (mmWave) bands (e.g., 28 GHz, 30 GHz, 38 GHz, and 60 GHz). In order to increase a channel gain, the BS 110, the terminal 120, and the terminal 130 may perform beamforming. The beamforming may include transmission beamforming and reception beamforming. That is, the BS 110, the terminal 120, and the terminal 130 may assign directivity to a transmission signal and a reception signal. To this end, the BS 110 and the terminals 120 and 130 may select serving beams 112, 113, 121, and 131 through a beam search procedure.

Figure 2:
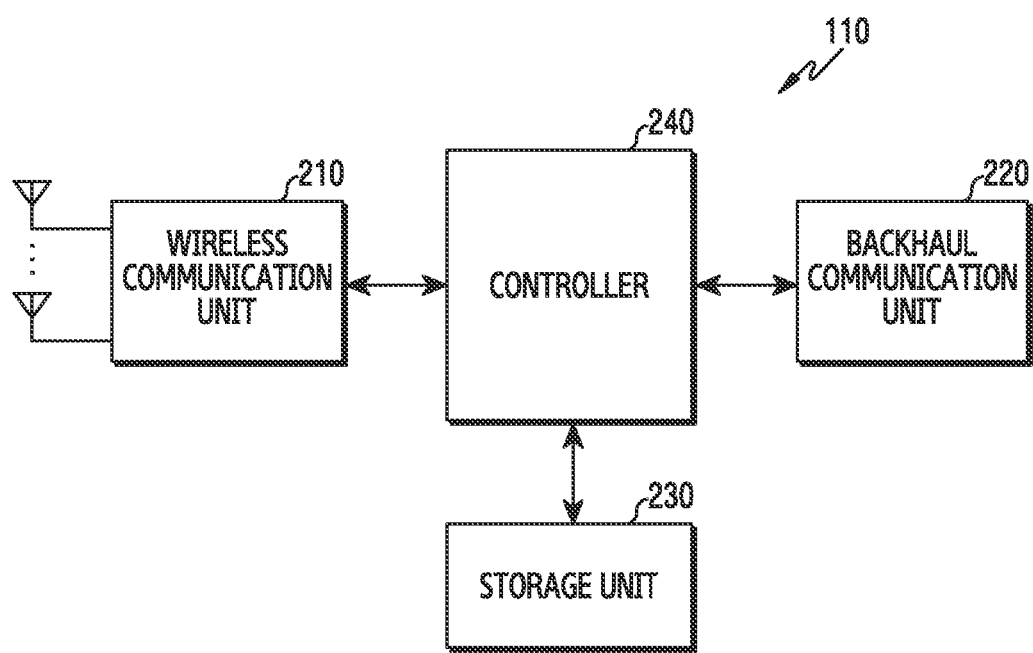
FIG. 2 is a block diagram illustrating a BS in the wireless communication system according to an embodiment of the present disclosure.

FIG. 2 illustrates a configuration of a BS in the wireless communication system according to various embodiments of the present disclosure. The configuration illustrated in FIG. 2 may be understood as the configuration of the BS 110. The term "unit" or used hereinafter may refer to the unit for processing at least one function or operation, and may be implemented in hardware, software, or a combination of hardware and software. The various units may be implemented as at least one processor programmed or configured to carry out the described operations.

Referring to FIG. 2, the BS 110 may include a wireless communication unit 210, a backhaul communication unit 220, a storage unit 230, and a controller 240.

The wireless communication unit 210 performs functions for transmitting and receiving signals through a wireless channel. For example, the wireless communication unit 210 may perform a function of conversion between a baseband signal and bitstreams according to a physical layer standard of the system. In data transmission, the wireless communication unit 210 generates complex symbols by encoding and modulating transmission bitstreams. In data reception, the wireless communication unit 210 reconstructs reception bitstreams by demodulating and decoding the baseband signal. The wireless communication unit 210 up-converts the baseband signal into a radio-frequency (RF) band signal, transmits the converted signal through an antenna, and then down-converts the RF band signal received through the antenna into the baseband signal.

To this end, the wireless communication unit 210 may include a transmission filter, a reception filter, an amplifier, a mixer, an oscillator, a digital-to-analog convertor (DAC), an analog-to-digital convertor (ADC), and the like. The wireless communication unit 210 may include a plurality of transmission/reception paths. The wireless communication unit 210 may include at least one antenna array consisting of a plurality of antenna elements. On the hardware side, the wireless communication unit 210 may include a digital unit and an analog unit, and the analog unit may include a plurality of sub-units according to operation power, operation frequency, and the like.

The wireless communication unit 210 transmits and receives the signal as described above. Accordingly, the wireless communication unit 210 may be referred to as a "transmitter", a "receiver", or a "transceiver". Further, in the following description, transmission and reception performed through the wireless channel may be used to have a meaning including the processing performed by the wireless communication unit 210 as described above.

According to various embodiments of the present disclosure, the wireless communication unit 210 may transmit reference signals. The reference signals may be signals for determining an optimal received signal value for each of at least one cell of the BS 110. The wireless communication unit 210 may receive measurement results corresponding to the reference signals. The measurement results may include measurement results for cells of the BS 110. The measurement results may include cell representative values (CRVs) of the BS 110.

The backhaul communication unit 220 provides an interface for performing communication with other nodes within the network. The backhaul communication unit 220 converts bitstreams transmitted to another node (e.g., another access node, another BS, a higher node, or a core network), from the BS 110 into a physical signal and converts the physical signal received from the other node into the bitstreams.

The storage unit 230 stores a basic program, an application, and data such as setting information for the operation of the BS 110. The storage unit 230 may include volatile memory, non-volatile memory, or a combination of volatile memory and non-volatile memory. The storage unit 230 provides stored data in response to a request from the controller 240.

The controller 240 controls the general operation of the BS 110. For example, the controller 240 transmits and receives a signal through the wireless communication unit 210 or the backhaul communication unit 220. Further, the controller 240 records data in the storage unit 230 and reads the recorded data. To this end, the controller 240 may include at least one processor.

According to various embodiments of the present disclosure, the controller 240 may include a calculation unit for performing a calculation operation on each of the CRVs of a plurality of cells. The calculation unit may correspond to an instruction set or code stored in the storage unit 230, and may be instructions/code that reside at least temporarily in the controller 240, a storage space that stores the instructions/code, or part of the circuitry included in the controller 240. The calculation unit may perform an arithmetic operation for calculating a maximum value, an arithmetic operation for calculating an average value, or an arithmetic operation for calculating a total sum based on settings. The controller 240 may control the BS 110 to perform operations according to various embodiments of the present disclosure described below.

Figure 3:
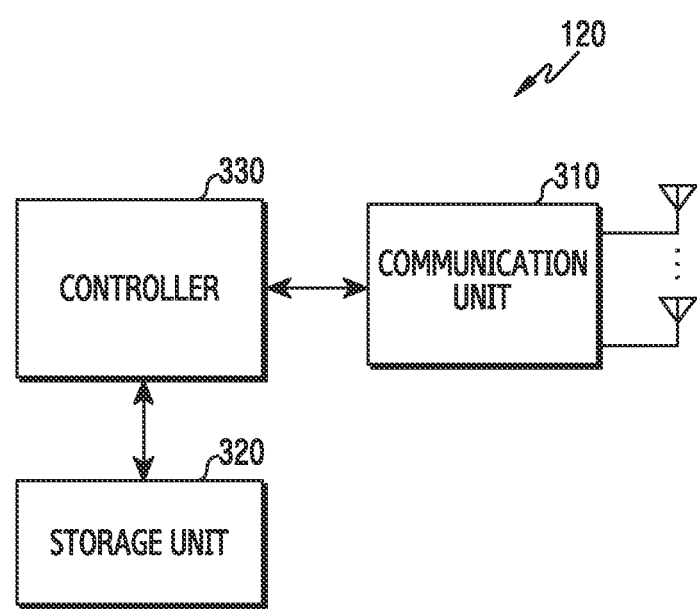
FIG. 3 illustrates the configuration of a terminal in the wireless communication system according to an embodiment of the present disclosure.

FIG. 3 illustrates a configuration of a terminal in a wireless communication system according to an embodiment of the present disclosure. The configuration illustrated in FIG. 3 may be understood as the configuration of the terminal 120. The term "unit" used hereinafter may refer to the unit for processing at least one function or operation and may be implemented in hardware, software, or a combination of hardware and software.

Referring to FIG. 3, the terminal 120 includes a communication unit 310, a storage unit 320, and a controller 330.

The communication unit 310 performs functions for transmitting/receiving a signal through a wireless channel. The communication unit 310 performs a function of conversion between a baseband signal and bitstreams according to a physical layer standard of the system. When data is transmitted, the communication unit 310 generates complex symbols by encoding and modulating a transmission bitstream. When data is received, the communication unit 310 reconstructs a reception bitstream by demodulating and decoding a baseband signal. The communication unit 310 up-converts the baseband signal into an RF band signal, transmits the converted signal through an antenna, and then down-converts the RF band signal received through the antenna into the baseband signal. The communication unit 310 may include a transmission filter, a reception filter, an amplifier, a mixer, an oscillator, a DAC, and an ADC.

The communication unit 310 may include a plurality of transmission/reception paths. In addition, the communication unit 310 may include at least one antenna array consisting of a plurality of antenna elements. On the hardware side, the wireless communication unit 210 may include a digital circuit and an analog circuit (e.g., a RF integrated circuit (RFIC)). The digital circuit and the analog circuit may be implemented as one package. The communication unit 310 may include a plurality of RF chains. The communication unit 310 may perform beamforming.

The communication unit 310 may include different communication modules to process signals in different frequency bands. The communication unit 310 may include a plurality of communication modules to support a plurality of different radio access technologies. The different radio access technologies may include bluetooth low energy (BLE), Wi-Fi, Wi-Fi Gigabyte, and cellular network (e.g., LTE). The different frequency bands may include a super-high frequency (SHF) (e.g., 2.5 GHz or 5 GHz) band and a millimeter (mm) wave (e.g., 60 GHz) band.

The communication unit 310 transmits and receives the signal as described above. Accordingly, the communication unit 310 may be referred to as a "transmitter", a "receiver", or a "transceiver". In the following description, transmission and reception performed through the wireless channel is used to have a meaning including the processing performed by the communication unit 310 as described above.

According to an embodiment of the present disclosure, the communication unit 310 may receive reference signals. The reference signals may be reference signals received through different pairs of beams or different paths. The communication unit 310 may determine an optimal received signal value for each of at least one cell. The communication unit 310 may transmit measurement results corresponding to the reference signals. The measurement results may include a measurement result for a particular cell. The measurement results may include a CRV for the particular cell.

The storage unit 320 stores a basic program, an application, and data such as setting information for the operation of the terminal 120. The storage unit 320 may include a volatile memory, a non-volatile memory, or a combination of volatile memory and non-volatile memory. The storage unit 320 provides stored data in response to a request from the controller 330.

The controller 330 controls the general operation of the terminal 120. For example, the controller 330 transmits and receives a signal through the communication unit 310. The controller 330 records data in the storage unit 320 and reads the recorded data. To this end, the controller 330 may include at least one processor or microprocessor, or may play the part of the processor. The relevant portion of the communication unit 310 or the controller 330 may be referred to as a communication processor (CP). The controller 330 may include a measurement calculation unit for calculating a CRV by the terminal 120. The measurement calculation unit may perform an arithmetic operation for determining one reference signal received power (RSRP) value that represents a plurality of RSRP values. The measurement calculation unit may perform an arithmetic operation for calculating a maximum value, an arithmetic operation for calculating an average value, or an arithmetic operation for calculating a total sum. The measurement calculation unit may calculate a CRV that represents a particular cell by applying a preset weighted value to each of the determined RSRP value and PD value. The controller 330 may control the terminal 120 to perform operations according to various embodiments described below.

Figure 4A:
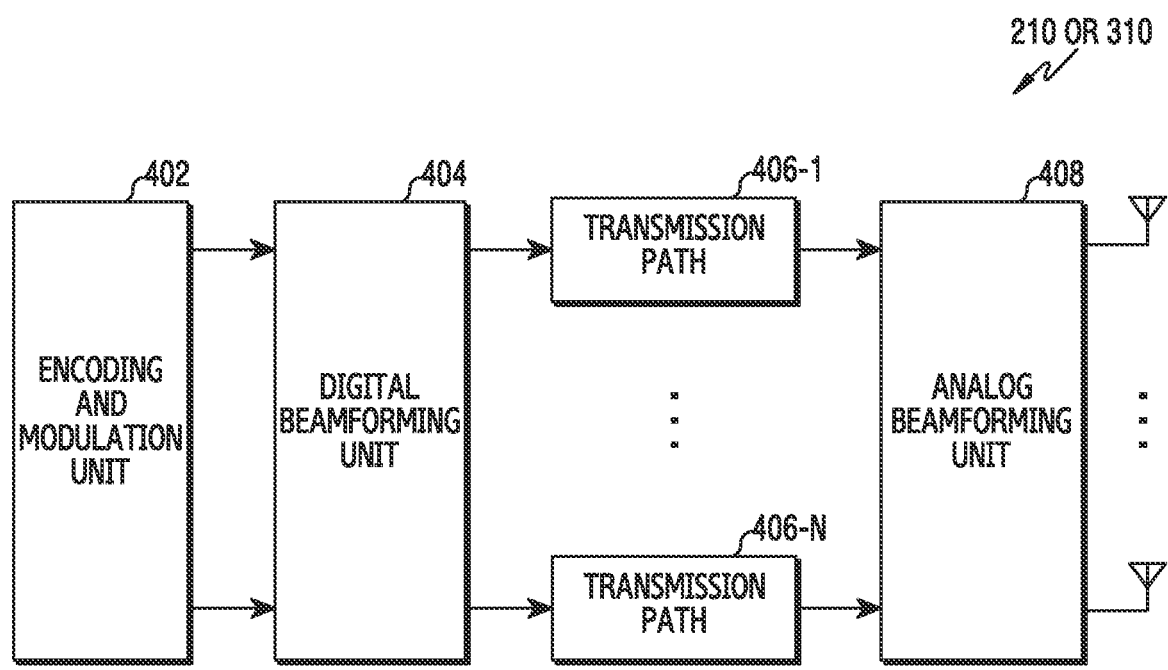
FIGS. 4A, 4B, and 4C illustrate the configuration of a communication unit in the wireless communication system according to various embodiments of the present disclosure.
Figure 4B:
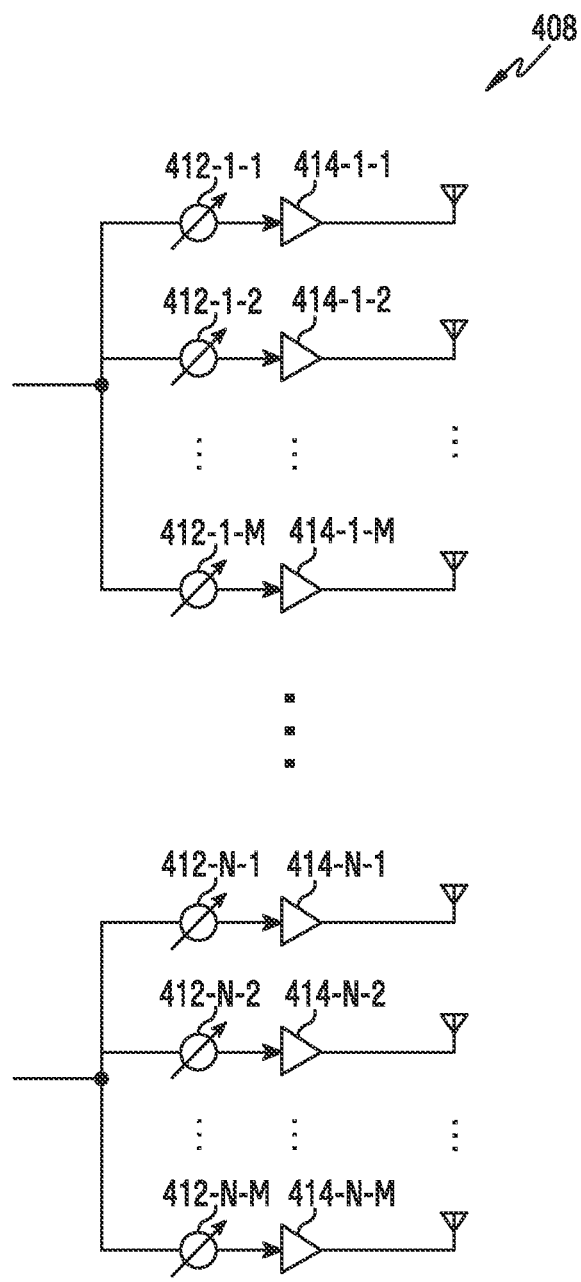
Figure 4C:
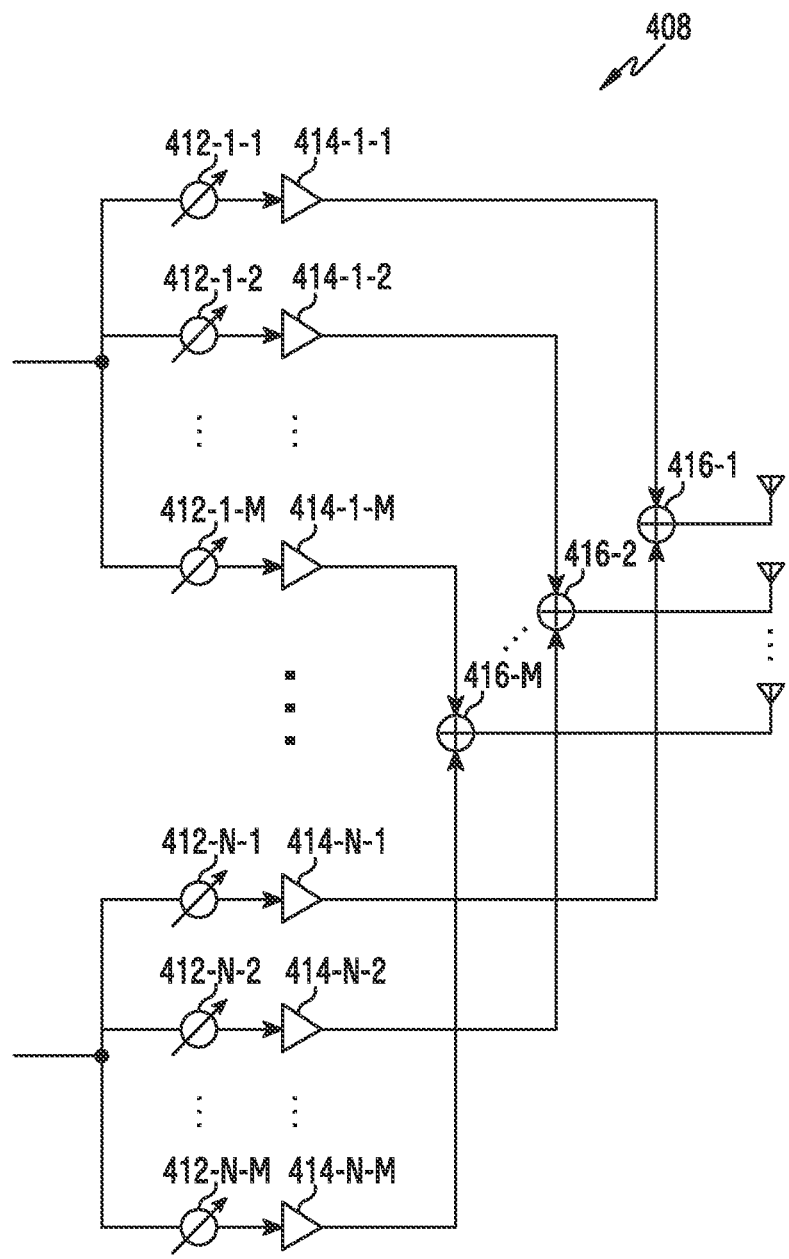

FIGS. 4A, 4B, and 4C illustrate a configuration of a communication unit in a wireless communication system according to an embodiment of the present disclosure. FIGS. 4A, 4B, and 4C illustrate examples of the detailed configuration of the communication unit 210 of FIG. 2 or the communication unit 310 of FIG. 3. More specifically, FIGS. 4A, 4B, and 4C illustrate elements for performing beamforming as the part of the communication unit 210 of FIG. 2 or the communication unit 310 of FIG. 3.

Referring to FIG. 4A, the communication unit 210 or 310 includes an encoding and modulation unit 402, a digital beamforming unit 404, a plurality of transmission paths 406-1 to 406-N, and an analog beamforming unit 408.

The encoding and modulation unit 402 performs channel encoding. For the channel encoding, at least one of a low-density parity check (LDPC) code, a convolution code, and a polar code may be used. The encoding and modulation unit 402 generates modulation symbols by performing constellation mapping.

The digital beamforming unit 404 performs beamforming for a digital signal (e.g., modulation symbols). To this end, the digital beamforming unit 404 multiplies the modulation symbols by beamforming weighted values. The beamforming weighted values may be used for changing the size and phase of the signal, and may be referred to as a "precoding matrix" or a "precoder". The digital beamforming unit 404 outputs the digitally beamformed modulation symbols to the plurality of transmission paths 406-1 to 406-N. According to a multiple input multiple output (MIMO) transmission scheme, the modulation symbols may be multiplexed, or the same modulation symbols may be provided to the plurality of transmission paths 406-1 to 406-N.

The plurality of transmission paths 406-1 to 406-N convert the digitally beamformed digital signals into analog signals. To this end, each of the plurality of transmission paths 406-1 to 406-N may include an inverse fast Fourier transform (IFFT) calculation unit, a cyclic prefix (CP) insertion unit, a DAC, and an up-conversion unit. The CP insertion unit is for an orthogonal frequency division multiplexing (OFDM) scheme, and may be omitted when another physical layer scheme (e.g., a filter bank multi-carrier (FBMC)) is applied. The plurality of transmission paths 406-1 to 406-N provide independent signal processing processes for a plurality of streams generated through the digital beamforming. However, depending on the implementation, some of the elements of the plurality of transmission paths 406-1 to 406-N may be used in common.

The analog beamforming unit 408 performs beamforming on analog signals. To this end, the digital beamforming unit 404 multiplies the analog signals by beamforming weighted values. The beamformed weighted values are used to change the size and phase of the signal. The analog beamforming unit 408 may be configured as illustrated in FIG. 4B or 4C according to a connection structure between the plurality of transmission paths 406-1 to 406-N and the antennas.

Referring to FIG. 4B, signals input into the analog beamforming unit 408 may be transmitted through the antennas via phase/size conversion and amplification operation. At this time, the signals in respective paths are transmitted through different antenna sets, that is, antenna arrays. In the processing of signals input through a first path, the signals are converted into signal sequences having the same or different phase/size by phase/size conversion units 412-1-1 to 412-1-M, are amplified by amplifiers 414-1-1 to 414-1-M, and are transmitted through antennas.

Referring to FIG. 4C, the signals input into the analog beamforming unit 408 are transmitted through the antennas via phase/size conversion and amplification operation. The signals in respective paths are transmitted through the same antenna set (i.e., the antenna array). In the processing of signals input through a first path, the signals are converted into signal sequences having the same or different phase/size by the phase/size conversion units 412-1-1 to 412-1-M and are amplified by the amplifiers 414-1-1 to 414-1-M. In order to be transmitted through one antenna array, the amplified signals are summed by summing units 416-1-1 to 416-1-M and then transmitted through the antennas.

FIG. 4B illustrates an example in which an independent antenna array is used for each transmission path, and FIG. 4C illustrates an example in which transmission paths share one antenna array. However, according to another embodiment of the present disclosure, some transmission paths may use independent antenna arrays and the remaining transmission paths may share one antenna array. According to another embodiment of the present disclosure, a structure that may adaptively vary depending on the situation may be used by applying a switchable structure between transmission paths and antenna arrays.

A cell may refer to an area that one BS can cover. One BS may cover a single cell or multiple cells. The multiple cells may be divided by a frequency supporting multiple cells or an area of a covered sector. Hereinafter, the term "BS" may be used as a term including a cell, or the term "cell" may be used as a term referring to a BS.

A serving cell may correspond to a cell that provides higher-layer signaling (e.g., radio resource control (RRC) signaling) with the terminal, and may refer to a single cell or multiple cells. When the terminal is not configured to support carrier aggregation (CA) or dual connectivity (DC), the serving cell may be a single cell including a primary cell. When the terminal is configured to support CA or DC, the serving cell may be a set of one or more cells including both a primary cell and at least one second cell.

Figure 5A:
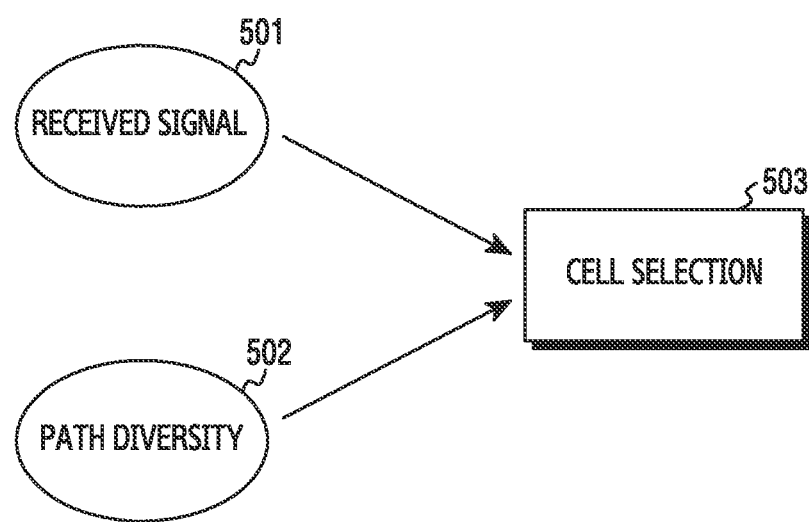
FIG. 5A illustrates the concept for a cell according to an embodiment of the present disclosure.

FIG. 5A illustrates an element for indicating a cell according to an embodiment of the present disclosure.

Referring to FIG. 5A, the element may be a received signal 501 or PD 502.

The received signal 501 may indicate information on a signal associated with the cell. The signal associated with the cell may refer to a signal received through the cell. The information on the signal may contain a parameter associated with the signal. For example, the parameter associated with the signal may be an index indicating the strength of the signal or an index indicating the quality of the signal. The parameter associated with the signal may be one selected from parameters of a plurality of signals including the signal. For example, the parameter associated with the signal may refer to the highest signal strength value among signal strength values of the plurality of signals.

Hereinafter, an optimal received signal value may refer to the highest value among a plurality of received signal values. The plurality of received signal values may refer to received signal values measured from a plurality of signals (e.g., reference signals) transmitted and received through all beam pairs that can be configured by BSs (or cells) and terminals. The optimal received signal value may refer to a maximum value among received signal values measured for all beam pairs between the BS and the terminal. The received signal value may be expressed by the signal strength, such as RSRP, reference signal received quality (RSRQ), and received signal strength indicator (RSSI). Alternatively, the received signal value may be expressed as signal quality, such as a signal-to-interference-and-noise ratio (SINR), a carrier-to-interference-and-noise ratio (CINR), and a signal-to-noise ratio (SNR).

The PD 502 may be information on paths. The paths may be paths through which signals can be transmitted. The paths may be paths associated with the electronic device. The information on the paths associated with the electronic device may contain information on the number of paths that are supported by the electronic device. The paths may be paths associated with the cell. The information on the paths associated with the cell may contain information on the number of paths. For example, a cell having three paths is guaranteed PD somewhat better than a cell having one path. Each of the paths may be a path through which signals can be transmitted through the cell. The paths may be paths included in channels between the terminal and the BS.

Hereinafter, PD may be information on paths between the BS (or cell) and the terminal. The PD may be evaluated based on paths that guarantee at least a predetermined level of quality or at least a predetermined level of reception strength. As the PD is guaranteed, the terminal may communicate with the BS through various channel environments. Meanwhile, the PD may include information on the degree of independence of the paths. That is, the PD may indicate the degree of correlation (or non-correlation) of the paths. The PD may be expressed by a value within a predetermined range. In this case, as the diversity value is higher, it may mean that the number of independent paths is larger. As the diversity value is lower, it may mean that the number of correlated paths is larger. As the diversity value is higher, it may mean that the directions of two beam pairs are more different. As the diversity value is lower, it may mean that the directions of two beam pairs are more similar.

Hereinafter, the path may refer to a channel for transmitting a wireless signal. The path may correspond to a pair of beams. The path may correspond to a pair of beams. In some cases, the path may be referred to as a "link", "channel", or another term having an equivalent meaning.

In the present disclosure, characteristics of the cell may be expressed in consideration of the received signal 501 and the PD 502. The characteristics of the cell may include at least one of data throughput when the signal is transmitted/received through the cell, a security level when communication is performed through the cell, a degree of robustness against noise or interference, an obstacle when communication is performed through the cell, and a degree of influence from an element such as a mobile object. The characteristics of the cell may include information on how suitable the cell is for communication or how well the cell serves the purpose of the terminal (or user). According to the characteristics of each of a plurality of cells, at least one cell 503 may be selected. The apparatus according to various embodiments of the present disclosure may select a cell in consideration of paths (e.g., the PD 502) as well as the received signal 501. The apparatus may be a terminal or a network entity beyond, a BS depending on a predetermined procedure.

Hereinafter, the present disclosure describes a method of, in consideration of an optimal received signal value of a cell and PD of the cell, acquiring information indicating the characteristics of the corresponding cell (e.g., information representing the cell) and embodiments therefor.

Figure 5B:
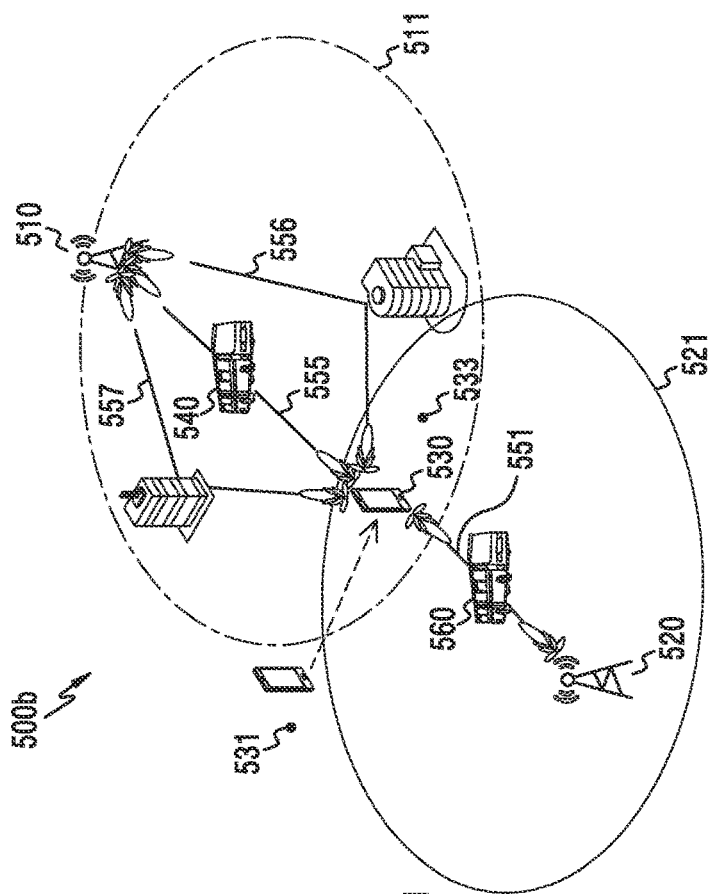
FIG. 5B illustrates an example of wireless communication environments according to an embodiment of the present disclosure.
Figure 5B:
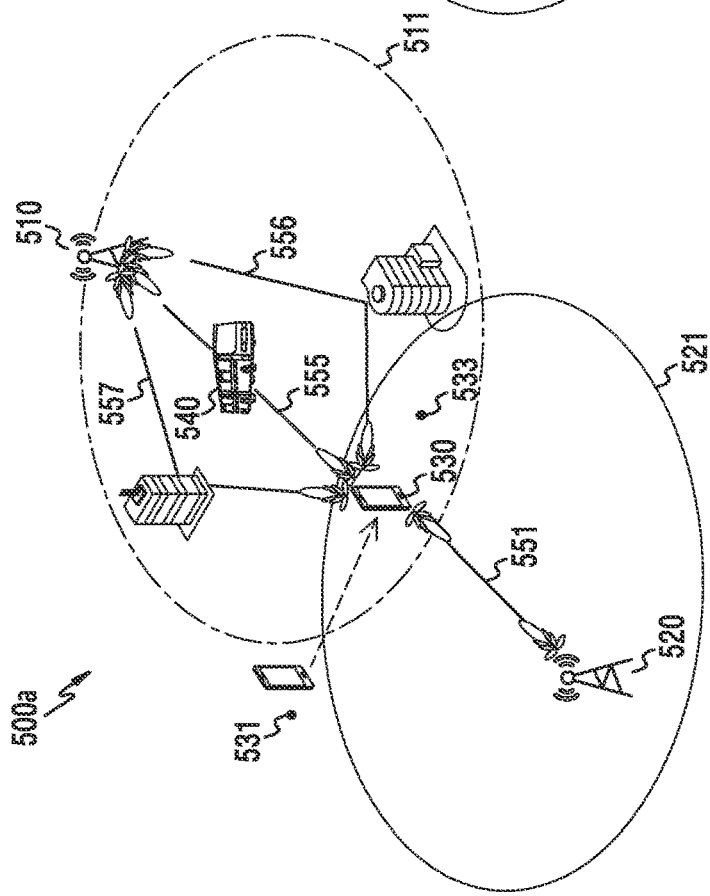

FIG. 5B illustrates an example of a wireless communication environment according to various embodiments of the present disclosure.

Referring to FIG. 5B, the wireless communication environment may be a wireless communication environment 500a or a wireless communication environment 500b.

Referring to FIG. 5B, the wireless communication environment 500a and the wireless communication environment 500b may include a BS 510, a BS 520, and a terminal 530. The BS 510 may provide a service to the terminal 530 located within a cell 511. The BS 520 may provide a service to the terminal 530 located within a cell 521. The cell 511 may provide a path 555, a path 556, and a path 557 to the terminal 530 located at a position 533. The cell 521 may provide a path 551 to the terminal 530 located at the position 533.

The wireless communication environment 500a may show the situation in which the terminal 530 moves to the position 533 from a position 531 before an obstacle 560 enters. The position 533 may be included within a region in which signals of the cell 511 and the cell 521 are all received by the terminal 530. After moving to the position 533, the terminal 530 may perform a measurement report on neighboring cells for handover to a target cell from a serving cell or perform a cell search and measurement for initial access or re-access. The terminal 530 may measure signals received from a plurality of cells (e.g., the cell 511 and the cell 521) and determine received signal values. In FIG. 5B, it is assumed that received signal values increase in the order of the signal received through the path 551, the signal received through the path 556, the signal received through the path 557, and the signal received through the path 555. An obstacle 540 blocks the path 555. The terminal 530 may determine that the received signal value of the cell 521 that provides the path 551 is the greatest. Accordingly, the terminal 530 may determine that the cell 521 is most suitable for configuration of connection. The terminal 530 may be connected to the cell 521 through an access procedure (e.g., a random-access procedure or an RRC connection procedure).

The wireless communication environment 500b represents the situation in which the terminal 530 moves to the position 533 from the position 531 and then the obstacle 560 enters. As the obstacle 560 enters, the cell 521 may not provide optimal communication service to the terminal 530 through the path 551. For example, since the obstacle 560 enters, the terminal 530 may detect that the measured received signal value is smaller than a particular threshold value and determine that radio link failure (RLF) has occurred. The terminal 530 may attempt to recover a radio link after determining the occurrence of RLF. Due to the occurrence of the RLF, the quality of service that the terminal 530 receives may be deteriorated. Due to a delay time (about 1000 ms) attributable to the detection of the occurrence of the RLF and a delay time (about 1000 ms) attributable to recovery of the RLF, the service to the terminal 530 may be delayed.

When the radio link is not recovered, the terminal 530 may establish a new RRC connection. The terminal 530 may select the cell 511 that provides a link of the path 556. When the obstacle 560 escapes from the path 551, the terminal 530 may determine that the received signal value, measured later through the path 551, is greater than received signal values from other paths. The terminal 530 may select the cell 521 that provides the link of the path 551 again. As the terminal 530 repeatedly changes the cell selected according to movement of the obstacle 560, a ping-pong phenomenon may occur.

In the wireless communication environment illustrated in FIG. 5B, while the cell 511 provides three paths, the cell 521 provides one path. When the terminal 530 selects the cell 521 in consideration only of the received signal value, the above-described problems may occur in the case in which the path 551 is blocked. However, when the terminal 530 selects the cell 511 in consideration of the number of paths, even though the path 555, which is one of the three paths, is blocked by the obstacle 540, the other paths 556 and 557 are still available, so that the terminal 530 may not experience RLF or the ping-pong phenomenon.

As described above, the method of selecting a cell based only on the optimal received signal value may be sensitive to movement of the obstacle. The method considering only the optimal received signal value may also change the states of paths even when the terminal moves, and may thus cause deterioration of communication quality, a communication delay, or the ping-pong phenomenon. Accordingly, it is preferable to select a cell in consideration of available paths between the BS (or cell) or the terminal as well as the received signal value. The available paths may be paths that guarantee a predetermined quality or greater, or a predetermined received signal strength value or higher. The available path may be referred to as a "usable path", "effective path", "active path", or another term having the equivalent technical meaning. Through the consideration of available paths, the terminal may select a cell that serves the purpose required by the terminal or perform a measurement report to select the cell even if the cell does not provide maximum throughput.

Figure 5C:
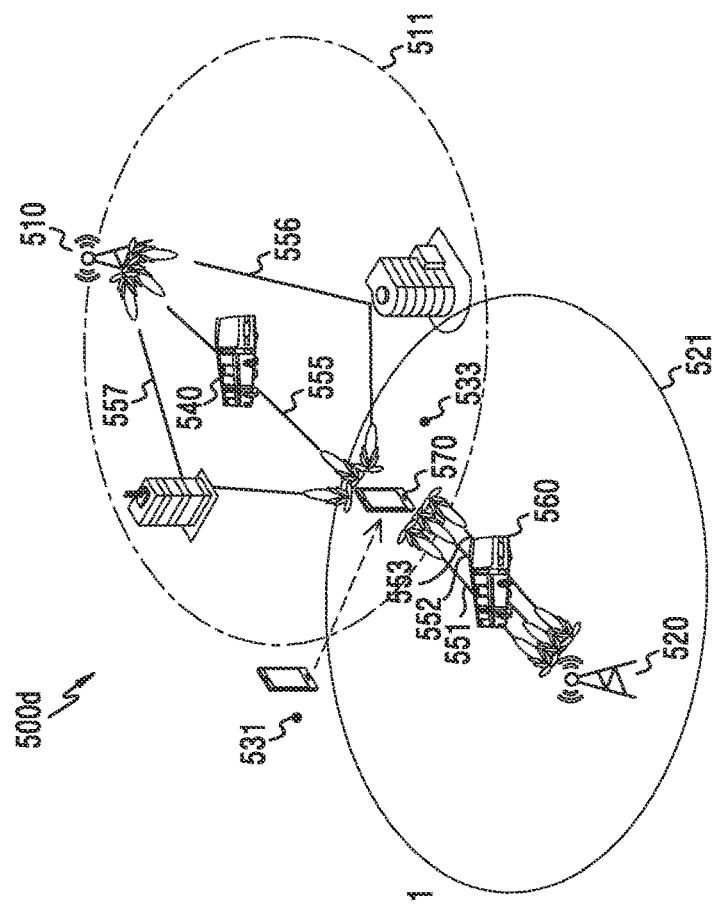
FIG. 5C illustrates another example of wireless communication environments according to an embodiment of the present disclosure.
Figure 5C:
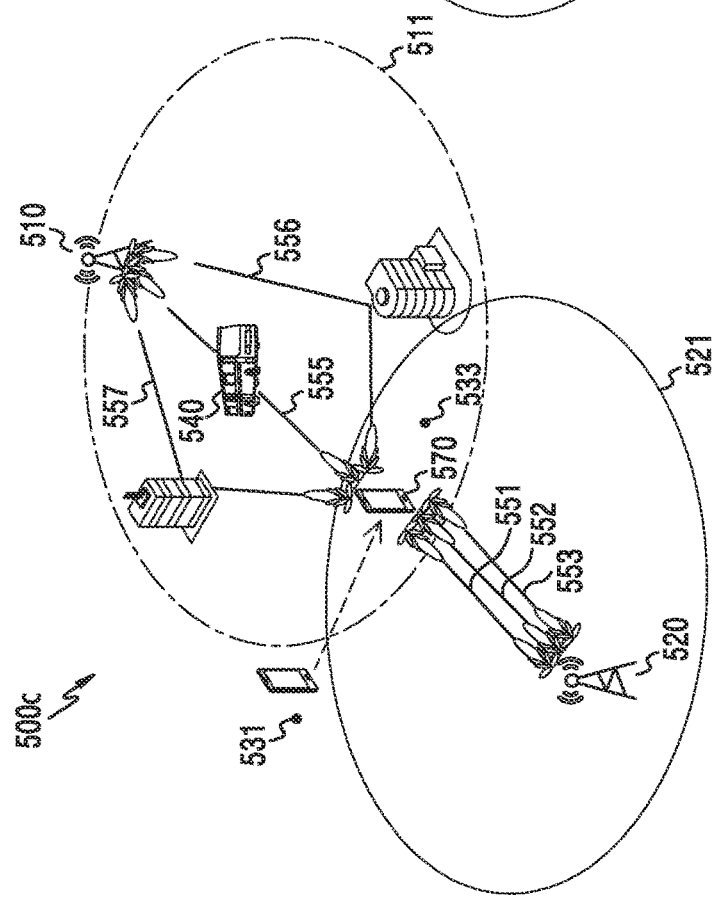

FIG. 5C illustrates another example of wireless communication environments according to an embodiment of the present disclosure.

Referring to FIG. 5C, the wireless communication environment may be a wireless communication environment 500c or a wireless communication environment 500d.

Referring to FIG. 5C, the wireless communication environment 500c and the wireless communication environment 500d may include a BS 510, a BS 520, and a terminal 570. The BS 510 may provide service to the terminal 570 located within a cell 511. The BS 520 may provide service to the terminal 570 located within the cell 521. The cell 511 may provide a path 555, a path 556, and a path 557 to the terminal 570 located at a position 533. The cell 521 may provide paths 551, 552, and 553 to the terminal 570 located at the position 533.

The wireless communication environment 500c shows the situation in which the terminal 570 moves to the position 533 from the position 531 before the obstacle 560 enters. Hereinafter, it is assumed that received signal values increase in the order of the signals received from the path 551, the path 552, and the path 553, the signal received from the path 556, the signal received from the path 557, and the signal received from the path 555. The obstacle 540 has entered the path 555. Unlike FIG. 5B, it is assumed that the terminal 570 considers the number of paths as well as the optimal received signal value when selecting the cell. The terminal 570 may provide the paths 551, 552, and 553 having received signal values greater than the received signal value of the cell 511 and may determine that the cell 521 is the most suitable cell for handover or is to be added since the cell 521 has the same number of paths (three) as the cell 511. The terminal 570 may perform handover to the cell 521 or perform the access procedure for the cell 521.

The wireless communication environment 500d shows the situation in which the terminal 570 moves to the position 533 from the position 531, after which the obstacle 560 enters. As the obstacle 560 enters, the cell 521 may not provide optimal communication service to the terminal 570 through the paths 551 to 553. All links of the cell 521 may be blocked by the one obstacle 560. This is because the paths 551 to 553 are not independent paths. The terminal 570 may experience a time delay or the ping-pong phenomenon due to the RLF detection and the recovery, as in FIG. 5B. In contrast, among links of the cell 511, only one associated with the path 555 is blocked due to the obstacle 540. The cell 511 may provide service to the terminal 570 through the independent paths 556 and 557. When the terminal 570 selects the cell 511, the terminal 570 may not experience the above-described phenomena.

As described with reference to FIG. 5C, when selecting the cell, the user may avoid all available paths that are blocked by one obstacle by further considering the independency of the paths as well the number of available paths. Even though one path is blocked by the obstacle, the remaining paths may be capable of maintaining their connections through the selection of a cell that provides independent paths. The independent paths may refer to paths having low correlation therebetween. For example, the paths 551 to 553 have the same or similar directivities and thus have relatively high correlation therebetween. In contrast, the paths 555 to 557 have different directivities (i.e., relatively divided directivities), and thus correspond to independent paths having relatively low correlation therebetween. The terminal may identify the paths having low correlation, thereby compensating for a robustness problem due to the directivity characteristics of the beam. Information on available paths of the cell may be referred to as "PD" of the cell. The PD of the cell may include the degree of independence of the available paths, that is, the degree of non-correlation of the available paths of the cell. A cell that serves the required purpose may be selected using the PD value as well as the optimal received signal value.

Hereinafter, the present disclosure describes an operation of calculating a value that represents the cell in consideration of the directivity characteristics of the beam. The present disclosure describes the operation of determining received signal values in consideration of a plurality of RSRP values with reference to FIGS. 6, 7A, and 7B. The present disclosure also describes the operation of determining the PD value of the cell in order to compensate for the robustness problem with reference to FIGS. 8, 9, and 10.

Figure 6:
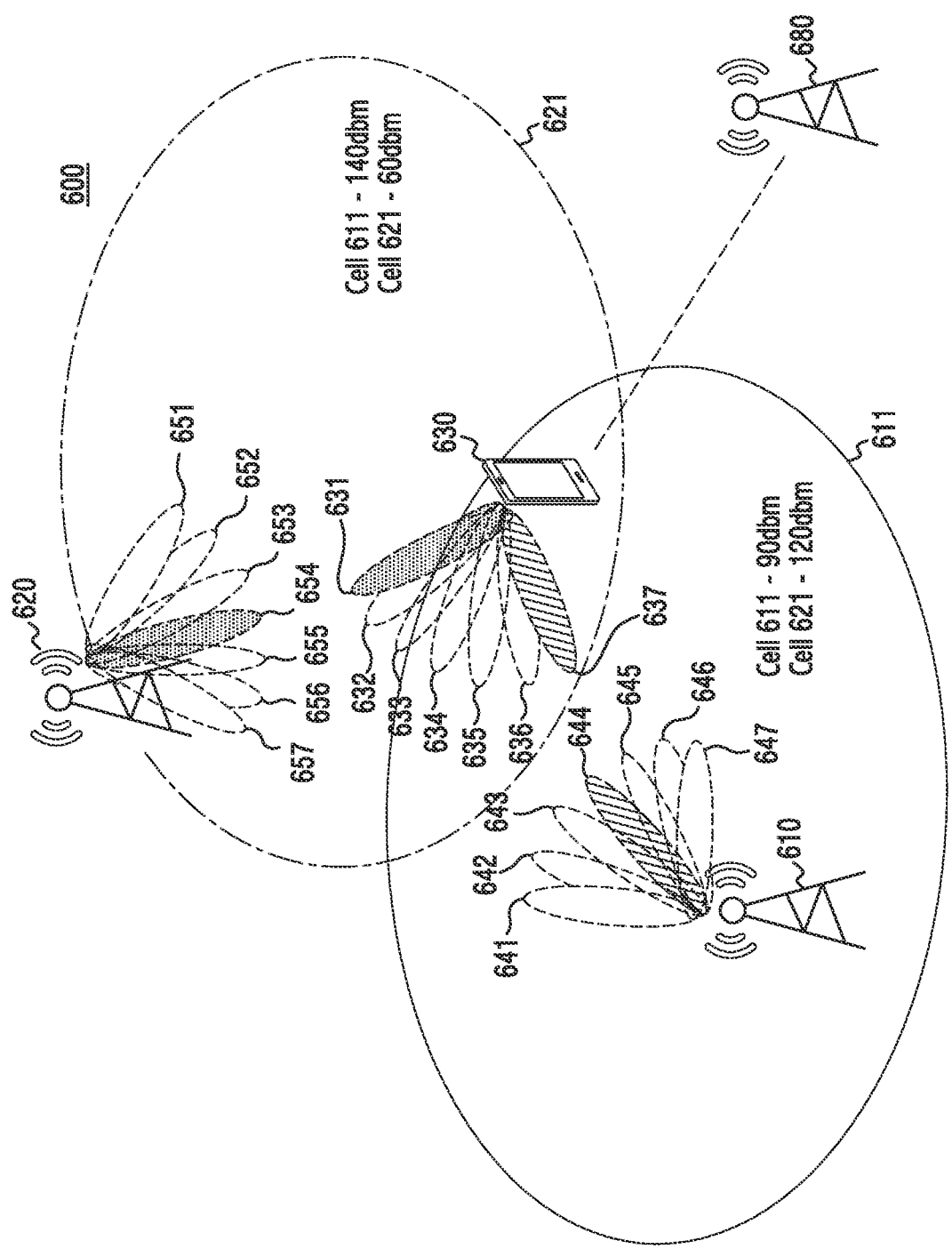
FIG. 6 illustrates an example of a wireless communication environment for determining an optimal received signal value according to an embodiment of the present disclosure.

FIG. 6 illustrates an example of a wireless communication environment for determining an optimal received signal value according to an embodiment of the present disclosure.

Referring to FIG. 6, the wireless communication environment may be a wireless communication environment 600.

Referring to FIG. 6, the wireless communication environment 600 may include a BS 610, a BS 620, and a terminal 630. The BS 610 and the BS 620 may be the BS 110 of FIG. 1. The terminal 630 may be the terminal 120 of FIG. 1. The BS 610 may service a cell 611. The BS 610 may communicate with the terminal 630 in the cell 611 through beams 641 to 647. The BS 620 may service a cell 621. The BS 620 may communicate with the terminal 630 in the cell 621 through beams 651 to 657. The terminal 630 may communicate with the BS 610 or the BS 620 through beams 631 to 637. The wireless communication environment 600 may include a BS 680. The BS 680 may be a serving BS of the terminal 630. Hereinafter, although it is described that each of the BS 610, the BS 620, and the terminal 630 perform communication through seven beams, this is only for convenience of description, and the present disclosure is not limited thereto. In other words, the terminal 630 may support fifteen beams.

For cell section in handover to a target cell from the serving cell or in an initial access procedure, the terminal 630 may perform measurement on the cells (e.g., the cell 611 and the cell 621). Hereinafter, for convenience of description, although it is described that an RSRP value of a received signal is determined by the measurement, the present disclosure is not limited thereto. In addition to the RSRP, RSRQ or RSSI may be measured. When the measurement of the RSRP value of each cell is performed through the beam 631 of the terminal 630, the terminal 630 may acquire an RSRP measurement result of "−90 dbm" for the cell 611 and an RSRP measurement result of "−120 dbm" for the cell 621, which is a neighboring cell of the cell 611. Based on the measurement results, the cell 611 may be selected. When the measurement is performed through the beam 637 of the terminal 630, the terminal 630 may acquire an RSRP measurement result of "−140 dbm" for the cell 611 and an RSRP measurement value of "−60 dbm" for the cell 621. Based on the measurement results, the cell 621 may be selected. That is, depending on the beam used by the terminal 630 for the measurement, different RSRP values are measured and different cells are selected (e.g., whether to or not perform handover). As described above, when the apparatus supporting beamforming-based communication, such as the BS 610, the BS 620, or the terminal 630, measures received signal values for a particular cell only through a particular beam or beams, measurement results may not accurately represent the particular cell. Accordingly, one received signal value corresponding to the cell in consideration of a plurality of beams is required. The present disclosure describes embodiments of determining one representative received signal value based on RSRP values for a plurality of beams. Hereinafter, one representative received strength value may be referred to as an "optimal received signal value", but may also be referred to as "representative received signal value", "representative received strength", or another term having the equivalent meaning.

RSRP Measurement Using a Plurality of Beams

When measuring neighboring cells, the terminal 630 may be required to use a plurality of beams in order to measure a value that represents each of the neighboring cells. The terminal 630 may measure the neighboring cells through a beam-sweeping operation. One transmission beam and one reception beam may configure one path. The terminal 630 may measure each path established through configurable beams. The terminal 630 may acquire an RSRP value for each of the paths. For example, when four transmission beams and two reception beams are supported, the terminal 630 may acquire 8 (=4×2) RSRP values at every sweeping interval.

The terminal 630 may determine an optimal received signal value for the neighboring cell based on the RSRP values received at every sweeping interval. Each of the acquired RSRP values may correspond to a path (beam pair or link) determined by one transmission beam and one reception beam. The terminal 630 may derive a value corresponding to the neighboring cell based on the acquired RSRP values. The value corresponding to the neighboring cell corresponds to an optimal received signal value for the neighboring cell used in the cell selection and is a value that represents the neighboring cell.

The value that represents the neighboring cell may be one RSRP value or a combination of two or more RSRP values that represent the neighboring cell, or may be determined by filtering the RSRP values at least once. In order to determine the optimal received signal value for the neighboring cell from the acquired RSRP values, the terminal 630 may or may not perform at least one of layer-1 filtering and layer-3 filtering. The terminal 630 may determine the optimal received signal value for the neighboring cell via various methods, regardless of the order of filtering operation.

The terminal 630 may determine the optimal received signal value for the neighboring cell before performing layer-1 filtering, that is, without filtering. The terminal 630 may determine the optimal received signal value for the neighboring cell by performing a calculation operation on all RSRP values at a $k^{th}$ sweeping interval. For example, the terminal 630 may determine a maximum value of the RSRP values at the $k^{th}$ sweeping interval as the optimal received signal value for the neighboring cell. In another example, the terminal 630 may determine an average value of the RSRP values at the $k^{th}$ sweeping interval as the optimal received signal value for the neighboring cell. In another example, the terminal 630 may determine the sum of the RSRP values at the $k^{th}$ sweeping interval as the optimal received signal value for the neighboring cell.

Figure 7A:
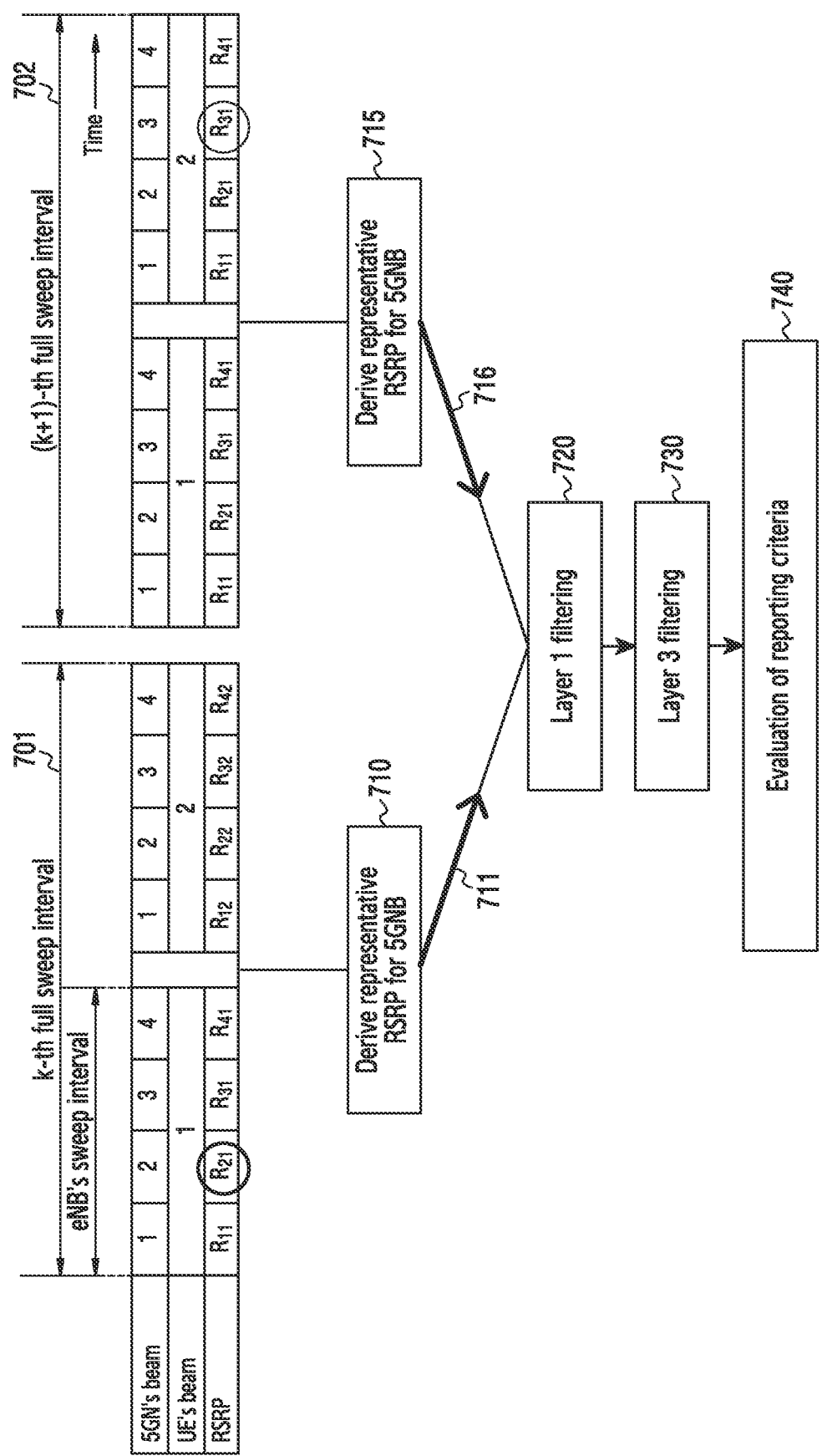
FIG. 7A illustrates an example of determining an optimal received signal value according to an embodiment of the present disclosure.

The terminal 630 may determine an optimal received signal value of a cell, as illustrated in FIG. 7A.

FIG. 7A illustrates an example of determining an optimal received signal value according to an embodiment of the present disclosure.

Referring to FIG. 7A, FIG. 7A shows the situation in which the BS 620 supports four beams and the terminal 630 supports two beams. Eight pairs of beams are specified per sweeping interval. Accordingly, the terminal 630 may acquire eight RSRP values $R_{11}, R_{21}, R_{31}, R_{41}, R_{12}, R_{22}, R_{32},$ and $R_{42}$ at one sweeping interval. $R_{xy}$ refers to an $x^{th}$ transmission beam (BS beam) and a $y^{th}$ reception beam (terminal beam).

Referring to FIG. 7A, in operation 710, the terminal 630 may determine the maximum value of the eight RSRP values at a $k^{th}$ interval 701. When the maximum value is $R_{21}$, the terminal 630 may determine $R_{21}$ at the $k^{th}$ interval 701 to be a first value 711. Hereinafter, an example of determining a representative value (e.g., the first value 711 or a second value 716) of the cell at each sweeping interval based on the maximum value is described, but the average value or an arithmetic sum operation may be used.

In operation 715, the terminal 630 may determine the maximum value of the eight RSRP values at a $k+1^{th}$ interval 702. When the maximum value is $R_{32}$, the terminal 630 may determine $R_{32}$ at the $k+1^{th}$ interval 702 to be the second value 716.

In operation 720, the terminal 630 may perform layer-1 filtering on each of the first value 711 and the second value 716. The terminal 630 may acquire $M_{n-1}$ from the first value 711. The terminal 630 may acquire $M_n$ from the second value 716. $M_{n-1}$ and $M_n$ may be cell level values.

In operation 730, the terminal 630 may perform layer-3 filtering on the results of layer-1 filtering. The terminal 630 may acquire $F_{n-1}$ from $M_{n-1}$. The terminal 630 may acquire $F_n$ from $M_n$. $F_n$ may be the value of a cell level. $F_{n-1}$ and $F_n$ may be determined according to Equation 1 below.

$$F_n = (1-a) \cdot F_{n-1} + a \cdot M_n \quad \text{Equation 1}$$

In Equation 1, $M_n$ denotes the measurement result most recently received from layer-1. $F_n$ denotes an updated measurement result of layer-3 filtering and is used for a measurement report. $F_{n-1}$ denotes a previous measurement result of layer-3 filtering, and $F_0$ corresponds to $M_1$. a denotes a filter constant.

In operation 740, the terminal 630 may evaluate whether reporting criteria are satisfied. Further, the terminal 630 may generate measurement results from the layer-3 filtering results. The terminal 630 according to various embodiments of the present disclosure may generate not only the layer-3 filtering results but also the measurement result for the cell 621 based on the PD value of the cell 621. Although not illustrated in FIG. 7A, when the reporting criteria are satisfied, the terminal 630 may report on the generated measurement results to the BS 680.

In other embodiments, after performing the layer-3 filtering, the terminal 630 may determine the optimal received signal value for the neighboring cell. For example, for the RSRP values at the $k^{th}$ sweeping interval and the RSRP values at the $k+1^{th}$ sweeping interval, the terminal 630 may perform layer-1 filtering and layer-3 filtering based on beams of the BS (5GNB' beams) included in the neighboring cell. As the result of the layer-3 filtering, the terminal 630 may calculate a value corresponding to each of the beams of the BS. The terminal 630 may determine the optimal received signal value for the neighboring cell by performing a calculation operation on the values corresponding to the beams of the BS.

In another example, on the RSRP values at the $k^{th}$ sweeping interval and the RSRP values at the $k+1^{th}$ sweeping interval, the terminal 630 may perform layer-1 filtering and layer-3 filtering based on beams of the terminal 630 (UE's beams). As a result of the performance of the layer-3 filtering, the terminal 630 may calculate a value corresponding to each of the beams of the terminal 630. The terminal 630 may calculate the optimal received signal value for the neighboring cell by performing a calculation operation (e.g., maximum value, average, or sum) on the values corresponding to the beams of the terminal 630.

The situation in which the BS 620 supports four beams and the terminal 630 supports two beams is described with reference to FIG. 7B.

Figure 7B:
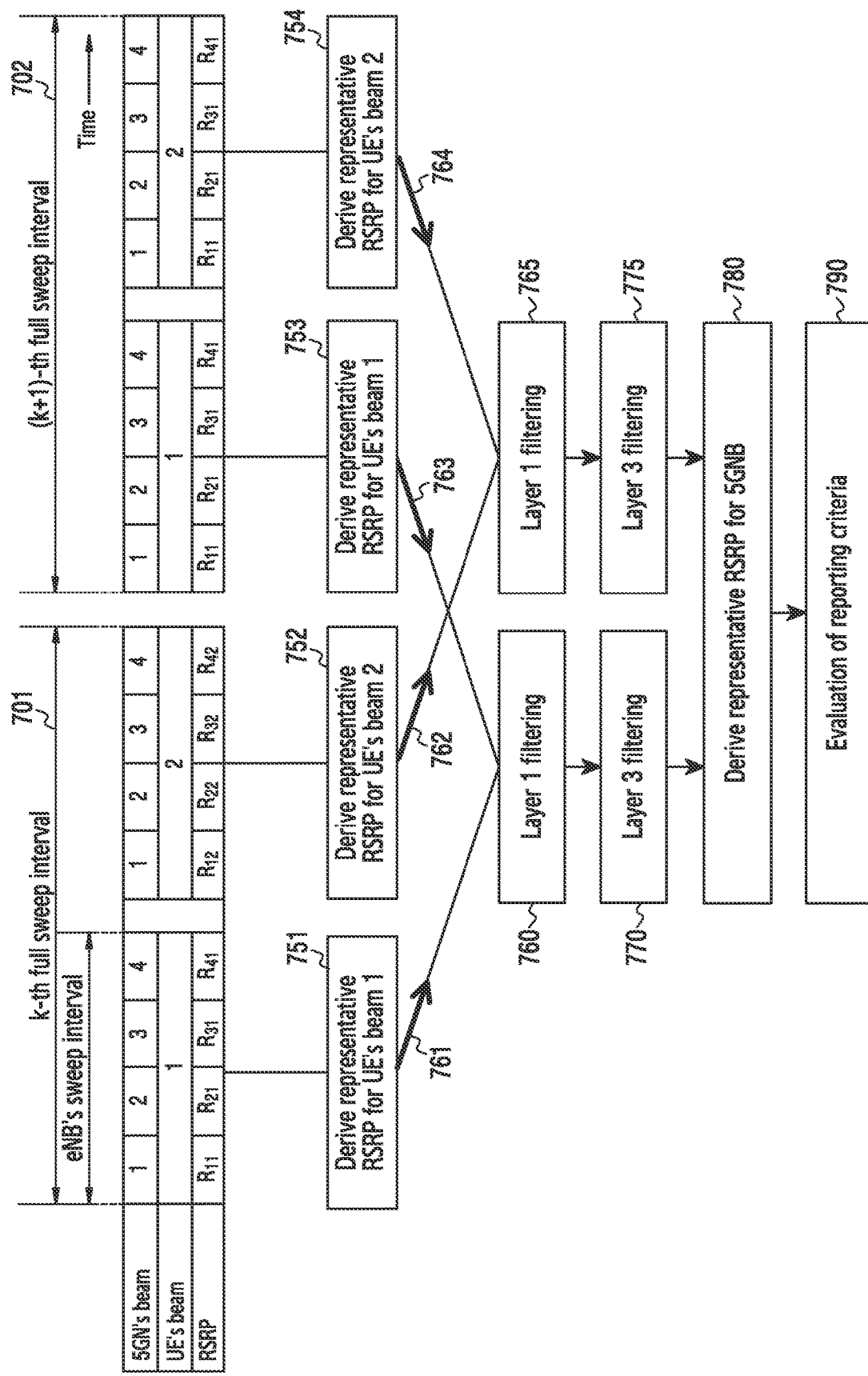
FIG. 7B illustrates another example of determining an optimal received signal value according to an embodiment of the present disclosure.

FIG. 7B illustrates another example of determining an optimal received signal value according to an embodiment of the present disclosure.

Referring to FIG. 7B, eight pairs of beams are specified per sweeping interval. Accordingly, the terminal 630 may acquire eight RSRP values $R_{11}, R_{21}, R_{31}, R_{41}, R_{12}, R_{22}, R_{32},$ and $R_{42}$ at one sweeping interval. $R_{xy}$ refers to an $x^{th}$ transmission beam (BS beam) and a $y^{th}$ reception beam (terminal beam).

Referring to FIG. 7B, in operation 751, the terminal 630 may calculate a value 761 corresponding to a first beam of the UE 630 at the $k^{th}$ sweeping interval 701. The terminal 630 may calculate the value 761 corresponding to the first beam of the terminal 630 through the calculation operation for the four RSRP values $R_{11}, R_{21}, R_{31},$ and $R_{41}$ at the $k^{th}$ sweeping interval 701. Hereinafter, an example of determining a representative value of the beams of the UE at each sweeping interval based on the average value is described, but the maximum value or an arithmetic sum operation may be used.

In operation 752, the terminal 630 may calculate a value 762 corresponding to a second beam of the terminal 630 at the $k^{th}$ sweeping interval 701.

In operation 753, the terminal 630 may calculate a value 763 corresponding to the first beam of the UE 630 at the $k+1^{th}$ sweeping interval 702.

In operation 754, the terminal 630 may calculate a value 764 corresponding to the second beam of the terminal 630 at the $k+1^{th}$ sweeping interval 702.

In operation 760, the terminal 630 may perform layer-1 filtering on the values 761 and 763 corresponding to the first beam. The terminal 630 may respectively acquire $M_{n-1}$ and $M_n$ for the first beam of the terminal 630 from the values 761 and 763 corresponding to the first beam.

In operation 765, the terminal 630 may perform layer-1 filtering on the values 762 and 764 corresponding to the second beam. The terminal 630 may respectively acquire $M_{n-1}$ and $M_n$ for the second beam of the terminal 630 from the values 762 and 764 corresponding to the second beam.

In operation 770, the terminal 630 may perform layer-3 filtering on the result of the layer-1 filtering. The terminal 630 may acquire $F_{n-1}$ for the first beam from $M_{n-1}$ for the first beam. The terminal 630 may acquire $F_n$ for the first beam from $M_n$ for the first beam. $F_{n-1}$ and $F_n$ may be determined according to Equation 1 above.

In operation 775, the terminal 630 may perform layer-3 filtering on the result of the layer-1 filtering. The terminal 630 may acquire $F_n$ for the second beam from $M_n$ for the second beam. $F_n$ may be determined according to Equation 1 above.

In operation 780, the terminal 630 may determine a maximum value between the result of the layer-3 filtering for the first beam of the terminal 630 and the result of the layer-3 filtering for the second beam as the optimal received signal value for the cell 621. As described above, the average calculation or the sum calculation may be used in addition to the calculation of the maximum value between the result of the layer-3 filtering for the first beam and the result of the layer-3 filtering for the second beam.

In operation 790, the terminal 630 may evaluate whether reporting criteria are satisfied. The terminal 630 may generate a measurement result from the determined optimal received signal value. The terminal 630 according to various embodiments of the present disclosure may generate not only the optimal received signal value but also the measurement result for the cell 621 based on the PD value of the cell 621. Although not illustrated in FIG. 7B, when the reporting criteria are satisfied, the terminal 630 may report on the generated measurement result to the BS 680, which is the serving BS.

In another example, on the RSRP values at the $k^{th}$ sweeping interval and the RSRP values at the $k+1^{th}$ sweeping interval, the terminal 630 may perform layer-1 filtering and layer-3 filtering based on each of beam pairs corresponding to a combination of beams of the neighboring BS included in the neighboring cell and beams of the terminal 630. As a result of the layer-3 filtering, the terminal 630 may calculate a value corresponding to each of the beam pairs. The terminal 630 may determine the optimal received signal value for the neighboring cell by performing the calculation (e.g., the maximum value, the average value, or the sum) on the values corresponding to the beam pairs.

In other embodiments, the terminal 630 may determine the optimal received signal value for the neighboring cell after the layer-1 filtering and before the layer-3 filtering.

When the optimal received signal value for the neighboring cell is calculated before the layer-1 filtering, the terminal 630 may improve accuracy by reflecting an instantaneous RSRP value. However, due to the performance of calculations on many RSRP values, a large number of calculations may act as a burden on the terminal 630. In contrast to this, the terminal 630 may reduce the number of calculations by calculating the optimal received signal value for the neighboring cell after the layer-3 filtering. In some embodiments, the terminal 630 may adjust the sequence of the calculation of the optimal received signal value for the neighboring cell and the layer-1 filtering and the optimal received signal value for the neighboring cell and the layer-3 filtering according to a predetermined derivation mode. The terminal 630 may adaptively control the effects of reduction in calculation amounts and accuracy improvement by changing the sequence of the calculation of the optimal received signal value and the filtering operations.

As described above, it is assumed that the terminal 630 measures each cell in consideration of the beams of the BS 610 or 620 and the beams of the terminal 630. The terminal 630 may acquire a measurement value "−90 dbm" through the beam 631 as the optimal received signal strength value of the cell 611. The terminal 630 may acquire a measurement value "−60 dbm" through the beam 637 as the optimal received signal strength value of the cell 621. The terminal 630 may determine to perform handover from the cell 611 to the cell 621. In other words, the terminal 630 may determine the optimal received signal strength value that represents the cell by considering RSRP values for all beams.

Figure 8:
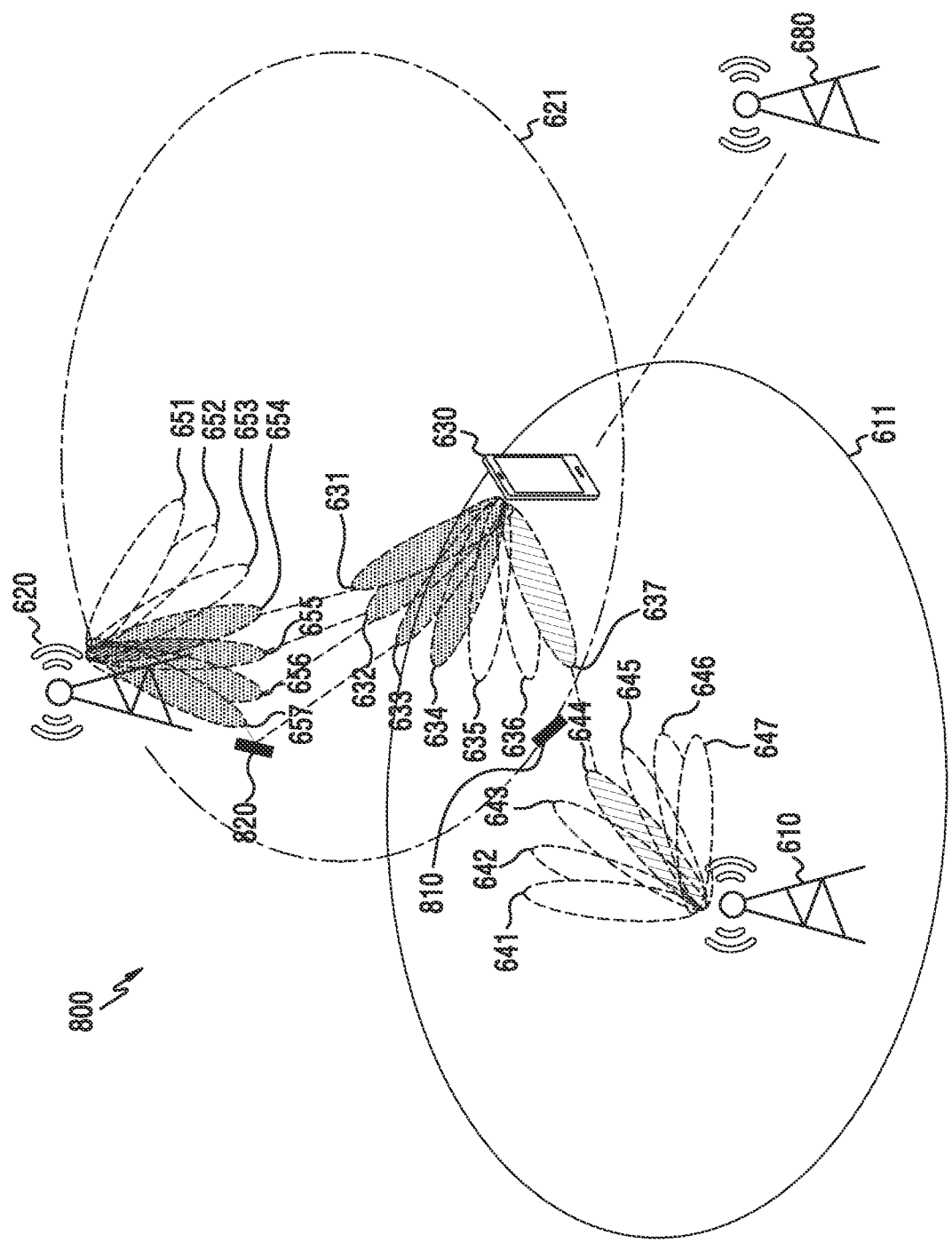
FIG. 8 illustrates an example of a wireless communication environment for determining a path diversity (PD) value according to an embodiment of the present disclosure.

FIG. 8 illustrates an example of a wireless communication environment for determining a PD value according to various embodiments of the present disclosure.

Referring to FIG. 8, the wireless communication environment may be a wireless communication environment 800.

Referring to FIG. 8, the wireless communication environment 800 may include the BS 610, the BS 620, and the terminal 630 included in the wireless communication environment 600 of FIG. 6. As illustrated in FIG. 6, the BS 610 may communicate with the terminal 630 in the cell 611 through beams 641 to 647. The BS 620 may communicate with the terminal 630 in the cell 621 through beams 651 to 657. The terminal 630 may communicate with the BS 610 or the BS 620 through beams 631 to 637. The wireless communication environment 800 may be an environment further including an obstacle 810 and an obstacle 820 compared to the wireless communication environment 600. The wireless communication environment 800 may include the obstacle 810 between the BS 610 and the terminal 630. The wireless communication environment 800 may include the obstacle 820 between the BS 620 and the terminal 630.

The terminal 630 may communicate with the BS 610 through a plurality of beams 631 to 637. The BS 610 may communicate through a plurality of beams 641 to 647. Based on consideration of a downlink, one transmission beam of the BS 610 and one reception beam of the terminal 630 may configure one path according to the directivity characteristics of the beams. For example, 49 (=7×7) paths may exist between the BS 610 and the terminal 630. The terminal 630 may also consider 49 paths in the same way for the BS 620 as well as the BS 610.

The terminal 630 may measure a neighboring cell (e.g., the cell 611 or the cell 621) to access a stable cell. The measurement may include an operation of determining a PD value of the corresponding cell. Some of the paths between the terminal 630 and the cell 611 may be blocked by the obstacle 810. The terminal 630 may determine that there is one available path for the cell 611. The terminal 630 may determine a first PD value for the one available path. The terminal 630 may guarantee at least one available path among the paths with the cell 621 due to the obstacle 820. The terminal 630 may determine that there are four available paths for the cell 621. The terminal 630 may determine a second PD value for the four available paths.

Between the cell 611 and the cell 621, the cell 621 may be selected as a cell robust to a state change (i.e., as a stable cell). For example, when searching for a cell to be handed over from the serving cell, the terminal 630 may report on a measurement result based on the second PD value to the serving BS 680. Snice the second PD value is greater than the first PD value, the serving BS 680 may determine to perform handover of the terminal 630 to the cell 621. In another example, when searching for a cell for initial access, the terminal 630 may select the cell 621 as the cell that the terminal 630 accesses. As described above, the terminal 630 may consider available paths in order to select the robust cell. The terminal 630 may also indicate the robustness of a particular cell by calculating PD values for the available paths. Even in the case of the same number of available paths, when beams included in the paths have relatively high correlation, the PD value may be relatively small. This is because the diversity of paths is not guaranteed.

PD

When measuring the cell 621, the terminal 630 may be required to consider a degree of non-correlation between available paths as well as the number of available paths among the paths. Hereinafter, the following description is made based on the beams of the terminal 630, which is the subject that performs the measurement, but a procedure described below may be equally applied to the beams of the BS 620, which is the target that receives the measurement report.

The terminal 630 may identify beams corresponding to an available path among N beams. The available path refers to a path that provides reception power greater than or equal to a threshold value. The terminal 630 may determine whether an RSRP value for each of the beams of the terminal 630 is greater than or equal to the threshold value. In some embodiments, the threshold value may refer to minimum reception power for communication. In other embodiments, the threshold value may refer to minimum reception power that satisfies a data rate and a modulation and coding scheme (MCS) required on an application driven by the terminal 630. In other embodiments, the threshold value may be a value randomly set for a cell to be measured.

When an RSRP of an $i^{th}$ beam is greater than or equal to the threshold value, the terminal 630 may insert the $i^{th}$ beam into a beam candidate set. When an RSRP of a $j^{th}$ beam is smaller than the threshold value, the terminal 630 may not insert the $j^{th}$ beam into the beam candidate set. The terminal 630 may identify K beam candidates having RSRP values greater than or equal to the threshold value among the N beams. Paths through the identified K beam candidates may be referred to as effective paths, effective links, available paths, or available links.

For identifying the available path, an index (metric) indicating a radio quality, as well as the RSRP, may be used. For example, the terminal 630 may identify the available paths based on RSRQ or RSSI, indicating the quality of the received signal through each beam. In another example, the terminal 630 may identify the available paths based on a SNR, a CINR, a SINR, or a signal-to-interference ratio (SIR) including information related to noise and/or interference for each beam. In another example, the terminal 630 may identify the available paths based on an index related to an error rate of the signal through each beam, such as an error vector magnitude (EVM), a bit error rate (BER), or a block error rate (BLER). Although the following description will be made based on the RSRP, the present disclosure is not limited thereto. As described above, for identifying available paths to determine the PD value, various indexes indicating the radio quality may be used.

The terminal 630 may calculate a degree of non-correlation for the available paths. The terminal 630 may calculate the degree of non-correlation for the available paths based on a beam distance (BD). More specifically, the terminal 630 may calculate the degree of non-correlation from a BD between two predetermined beams among the beams corresponding to the available paths. The BD may be defined as a distance between coordinates indicated by maximum gains in main lobes of the two beams. The determination of the BD may be performed as illustrated in FIG. 9.

Figure 9:
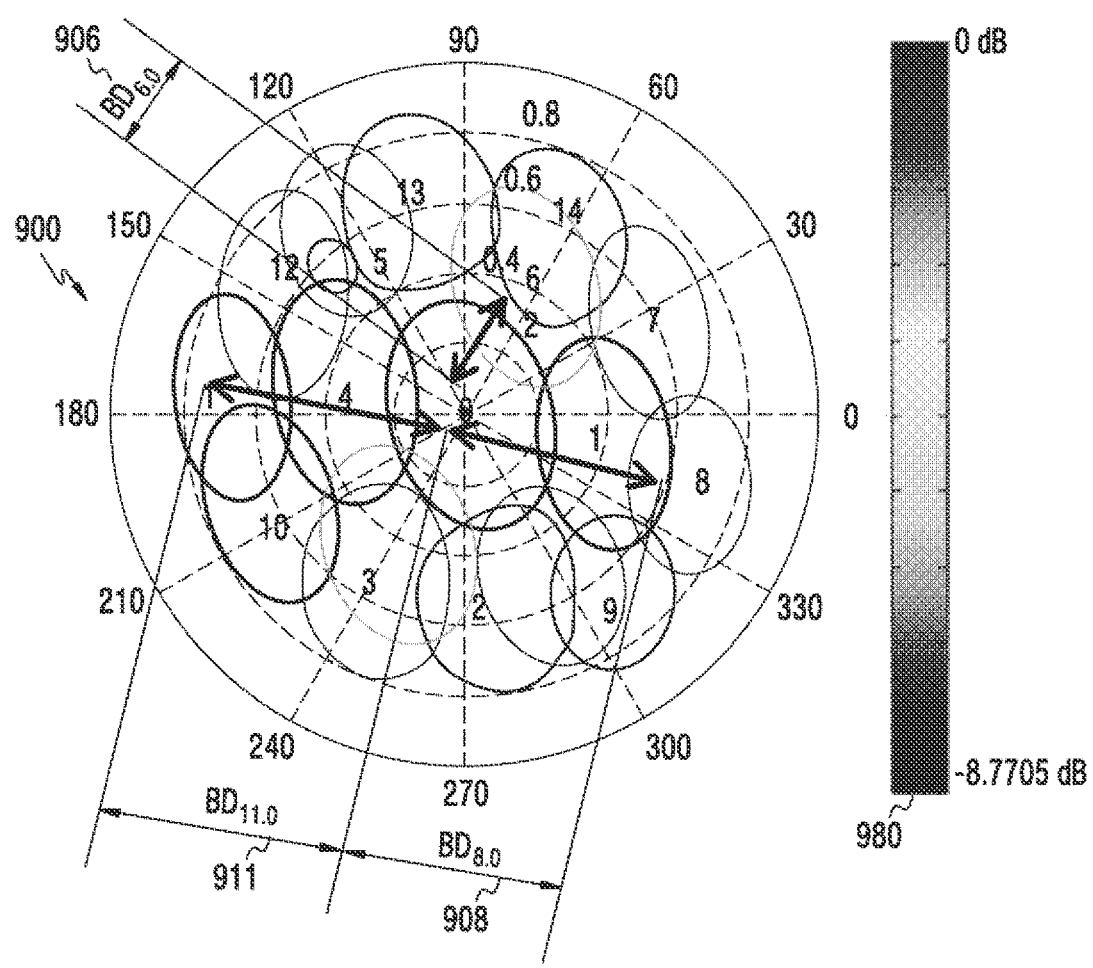
FIG. 9 illustrates an example of determining PD according to an embodiment of the present disclosure.

FIG. 9 illustrates the situation in which the terminal 630 provides fifteen beams according to an embodiment of the present disclosure.

Referring to, FIG. 9, the graph 900 shows cross sections having half power (3 dB) in main lobes of the fifteen beams. The fifteen beams may have indexes from 0 to 14. The color corresponding to each beam indicates the strength of the beam corresponding to an axis 980. A BD between two beams ($i_1$th beam and $i_2$th beam) may be the distance between coordinates $(x_{i1}, y_{i1}, z_{i1})$ and $(x_{i2}, y_{i2}, z_{i2})$ indicated by maximum gains in main lobes of the two beams. In some embodiments, the distance between two points may be a Manhattan distance. The BD may be defined as Equation 2 below.

$$BD_{i_1,i_2} = |x_{i_1}-x_{i_2}|+|y_{i_1}-y_{i_2}|+|z_{i_1}-z_{i_2}| \qquad \text{Equation 2}$$

In Equation 2, $BD_{i_1,i_2}$ denotes the BD between the $i_1$th beam and the $i_2$th beam. $(x_{i1}, y_{i1}, z_{i1})$ denotes a coordinate value having a maximum gain in the main lobe of the $i_1$th beam in an xyz coordinate system. $(x_{i2}, y_{i2}, z_{i2})$ denotes a coordinate value having a maximum gain in the main lobe of the $i_2$-th beam in an xyz coordinate system.

In other embodiments, the distance between two points may be a Euclidean distance. The BD may be defined as Equation 3 below.

$$BD_{i_1,i_2} = \sqrt{(x_{i_1}-x_{i_2})^2+(y_{i_1}-y_{i_2})^2+(z_{i_1}-z_{i_2})^2} \qquad \text{Equation 3}$$

In Equation 3, $BD_{i_1,i_2}$ denotes the distance between the $i_1$th beam and the $i_2$th beam. $(x_{i1}, y_{i1}, z_{i1})$ denotes a coordinate value having a maximum gain in the main lobe of the $i_1$th beam in an xyz coordinate system. $(x_{i2}, y_{i2}, z_{i2})$ denotes a coordinate value having a maximum gain in the main lobe of the $i_2$-th beam in an xyz coordinate system.

The graph 900 may show a BD 906 between a $0^{th}$ beam and a $6^{th}$ beam, a BD 908 between the $0^{th}$ beam and an $8^{th}$ beam, and a BD 911 between the $0^{th}$ beam and an $11^{th}$ beam. For example, the BD 906 may be 12, the BD 908 may be 33, and the BD 911 may be 41. When the BD 911 is longer than the BD 906, the graph 900 may mean that the $11^{th}$ beam and the $0^{th}$ beam are less strongly correlated than the $6^{th}$ beam and the $0^{th}$ beam. The BD determined from the graph 900 may indicate how much two beams are uncorrelated, how much two beams are independent from each other, or how different the directions of the two beams are.

The terminal 630 may store a table indicating BDs of beams supported by the terminal 630. In some embodiments, the terminal 630 may store a table containing previously calculated BD values of the beams of the terminal 630. The table may show a predetermined pair of two beams and a BD value therebetween. When the number of beams that are supported by the terminal 630 is N, the terminal 630 may store a table including $_NC_2$ pairs of beams and BD values corresponding to the beam pairs.

In other embodiments, the terminal 630 may store a table including coordinate values indicating vectors on three-dimensional beams to calculate BD values for the beams of the terminal 630. The coordinate values may be xyz coordinate system values or polar coordinate values. When the number of beams that are supported by the terminal 630 is N, the terminal 630 may store a parameter set indicating the N beams.

The terminal 630 may identify beams corresponding to available paths and determine BD values for the identified beams from the stored table. The terminal 630 may calculate the PD value of the cell 621 based on the determined BD values. The terminal 630 may calculate PD values for the available paths. If conditions for a signal strength that guarantees communication between the terminal 630 and the BS 620 are not satisfied, the PD may not be guaranteed even for sufficiently uncorrelated paths. Accordingly, the terminal 630 may calculate the PD value based on BD values for identified K beams greater than or equal to a threshold value. The terminal 630 may calculate the PD value according to Equation 4 below.

$$PD = \sum_{j=1}^{K}\sum_{i=1}^{K} BD_{i,j} \qquad \text{Equation 4}$$

In Equation 4, PD denotes the PD Value, and $BD_{i,j}$ denotes a BD between an $i^{th}$ beam and a $j^{th}$ beam. When i=j, $BD_{i,j}$ is 0. In the present disclosure, although it has been described that the terminal 630 may identify available paths of a plurality of paths and then determine BDs for the identified available paths so as to determine the PD value of the cell, the present disclosure is not limited to the above order. The terminal 630 may determine BDs for all of a plurality of beams, identify available paths, and then select BD values only for the available paths so as to determine the PD value of the cell.

When a BD between two beams is relatively longer, the BD may mean that the two beams are relatively uncorrelated. This may be derived from the simulation in which communication is performed through a reception beam of one terminal and a transmission beam of one BS in a 28 GHz band. When the terminal determines two predetermined optimal transmission beams, correlation between the two transmission beams is shown as Table 2 below. It is assumed that indexes of beams are sequentially indexed in a clockwise direction based on a $0^{th}$ beam as illustrated in FIG. 9.

TABLE 1

| Beam index difference | Case 1 (LOS) | Case 2 (LOS) | Case 1 (NLOS) | Case 2 (NLOS) |
| --- | --- | --- | --- | --- |
| 1 | 97.07% | 97.84% | 74.02% | 55.01% |
| 2 | 1.42% | 0.67% | 22.22% | 23.25% |
| 3 | 0.08% | 0.18% | 4.15% | 12.22% |
| 4 | 0.5% | 0.2% | 0.55% | 6.1% |
| 5 | 0.19% | 0.22% | 0.03% | 2.19% |
| 6 | 0.02% | 0.3% | 0% | 0.9% |
| 7 | 0% | 0.25% | 0.01% | 0.25% |
| 8 | 0% | 0.17% | 0.02% | 0.07% |
| 9 | 0% | 0.14% | 0% | 0.01% |
| 10 | 0% | 0.02% | 0% | 0% |
| 11 | 0% | 0.01% | 0% | 0% |

In case 1, the number of transmission antennas is 8, a half-power beam width (3 dB beam width) is 12°, the number of transmission beams is 10, and transmission angles are −54°, 12°, and 54°. In case 2, the number of transmission antennas is 12, a half-power beam width (3 dB beam width) is 6°, the number of transmission beams is 20, and transmission angles are −57°, 6°, and 57°. A line of sight (LOS) environment refers to an environment in which a straight path between the BS and the terminal is secured, and a non-LOS (NLOS) environment refers to an environment in which the straight path is not secured.

When the index difference between two beams is 1 in the LOS environment of case 1, the possibility that if one beam is blocked, the other beam is also blocked is 97.07%. The blocking of the beam may mean that a signal strength value is equal to or lower than a threshold value. When the index difference between two beams is 11 in the NLOS environment of case 2, if one beam is blocked, the other beam is not blocked (0%). Each element in Table 1 indicates correlation between two beams having the corresponding index difference.

Through comparison between the LOS environment of case 1 and the LOS environment of case 2, the correlation between beams varies depending on the number of transmission antenna ports, the half-power beam width, and the number of transmission beams. In some embodiments, when using the table to determine the BD of the identified beams, the terminal 630 may select the table according to at least one of the number of transmission antenna ports, the half-power beam width, and the number of transmission beams. The terminal 630 may determine the BD based on the selected table.

Through comparison between the LOS environment of case 1 and the NLOS environment of case 1, the correlation between beams in the NLOS environment is lower than the correlation between beams in the LOS environment. In some embodiments, when using the table to determine the BD of the identified beams, the terminal 630 may select the table according to whether the channel environment corresponds to the LOS environment or the NLOS environment. To this end, the terminal 630 may determine whether the channel environment corresponds to the LOS environment and determine the correlation between beams based on the table corresponding to the result of the determination on whether the channel environment corresponds to the LOS environment. For example, the terminal 630 may determine whether the channel between the BS 610 and the terminal 630 corresponds to the LOS environment according to a channel impulse response (CIR) of an impulse signal transmitted from the BS 610. The impulse signal may be a reference signal or a separate signal defined for CIR. The terminal 630 may determine that a first received signal is a signal transmitted through the path having the shortest straight distance. When the value of the first received signal is greater than or equal to a value of a signal received later, the terminal 630 may determine that the channel corresponds to the LOS environment. When the value of the first received signal is smaller than the value of the signal received later, the terminal 630 may determine that the channel corresponds to the NLOS environment. The terminal 630 may determine the BD based on the selected table according to whether the channel environment corresponds to the LOS environment or the NLOS environment.

In Table 1, indexes of beams are sequentially indexed from adjacent beams. As seen in Table 1, the greater a beam index value is, the closer the correlation is to 0%. In contrast, the smaller the beam index value is, the closer the correlation is to 100%. Because beams are spaced apart from each other in an actual 3D space, the correlation is low.

Although the present disclosure has described that the terminal 630 calculates the PD value for the cell based on BD values for beams of the terminal 630, when BD values for the BS of the cell are acquired, the PD value for the target cell may be calculated based on BD values for the BS as well as the BD values for the terminal 630. In some embodiments, the terminal 630 may identify available paths having RSRP greater than or equal to a threshold value among a plurality of paths. The terminal 630 may determine BD values corresponding to beam pairs included in the identified available paths. For example, the terminal 630 may determine BD values for beams included in a path A and beams included in a path B based on the following equation.

$$BD_{A,B} = BD_{A_{UE},B_{UE}} + BD_{A_{BS},B_{BS}} \qquad \text{Equation 5}$$

$BD_{A,B}$ denotes a BD value for beams included in the path A and beams included in the path B. $BD_{A_{UE},B_{UE}}$ denotes a BD value between a beam of a terminal included in the path A and a beam of a terminal included in the path B. $BD_{A_{BS},B_{BS}}$ denotes a BD value between a beam of a BS included in the path A and a beam of a BS included in the path B. Although the add operation has been described as an example, other operations such as a multiplication operation may be used.

The terminal 630 may acquire information on BD values of the BS in various ways. In some embodiments, the terminal 630 may acquire information on BD values of the BS through measurement configuration information received from the serving BS 680. In other embodiments, the terminal 630 may receive a separate message from the BS and acquire information on the BD values of the BS. In other embodiments, the terminal 630 may share in advance the information on the BD values of the BS. At this time, the BS may communicate with the terminal 630 through beams in a predetermined way.

In the present disclosure, the BD may be defined in a manner that is different from that described above. In some embodiments, a BD between two beams ($i^{th}$ beam and $j^{th}$ beam) may be defined as a value that is determined based on a difference between at least one first parameter indicating (or forming) the $i^{th}$ beam and at least one second parameter indicating (or forming) the $j^{th}$ beam. At least one first parameter or at least one second parameter may be referred to as a beamforming parameter. For example, the beamforming parameter may include at least one of an index of a precoding codebook used in a digital end, a beamforming matrix, and a beamforming vector. In another example, the beamforming parameter may include at least one of a phase and size value for each antenna and a physical attitude control value for an antenna (e.g., a rotation quantity or a tilting quantity).

For example, the terminal 630 may calculate a degree of non-correlation between the available paths based on indexes of the codebook. The terminal 630 may calculate the degree of non-correlation from indexes of the codebook indicating beams corresponding to the available paths and configuration of the codebook. The codebook may be a codebook having a dual-codebook structure for antennas in a 2D array. The indexes of the codebook may include an index for a first dimension (e.g., a horizontal dimension) and an index for a second dimension (e.g., a vertical dimension). For example, the indexes of the codebook (W) may include an index $i_{1,1}$ for a horizontal dimensional and an index $i_{1,2}$ for a vertical dimensional of a first codebook ($W_1$), and an index $i_2$ of a second codebook ($W_2$). The codebook (W) may be indicated by a pattern by a function x for the index $i_{1,1}$, a function y for the index $i_{1,2}$, and a codebook configuration, and the index $i_2$ included in the pattern. Each index may indicate a beam direction and a component for a beam in a particular direction. The terminal 630 may determine a PMI for beams greater than or equal to a threshold value for reference signals received from the serving BS 680 through beams. The terminal 630 may determine correlation between beams corresponding to available paths based on designated codebook configuration and a difference value between parameters (e.g., x and y) corresponding to the determined PMI or a difference value between the indexes (e.g., $i_{1,1}$ and $i_{1,2}$).

Although the present disclosure describes that the PD value for the cell is calculated based on the BD value for each beam, the PD value for the cell may be calculated without using the BD. In some embodiments, the terminal 630 may receive signals, which have not been beamformed, and calculate the PD value for the cell. The BS 620 to be measured may transmit a non-beamformed reference signal, that is, an omnidirectional reference signal. The omnidirectional reference signal may be a signal separately defined for calculating the PD value or one type of the reference signal. The terminal 630 may receive the omnidirectional reference signal. The reference signal transmitted through a radio channel may be received through multiple paths, and the terminal 630 may receive a plurality of components of the reference signal at different time points. The terminal 630 may identify components greater than or equal to a threshold value among the plurality of components of the received reference signal. The terminal 630 may determine a reception time point value for each of the components greater than or equal to the threshold value. The terminal 630 may determine the PD value for the cell based on distribution of the reception time point values for each of the components greater than or equal to the threshold value. For example, when a relatively large number of components greater than or equal to the threshold value is distributed within a predetermined interval, the terminal 630 may determine the PD value for the corresponding cell to be small. In contrast, when reception time point values of the many components greater than or equal to the threshold value are distributed at a predetermined interval or longer, the terminal 630 may determine the PD value for the corresponding cell to be great.

Figure 10:
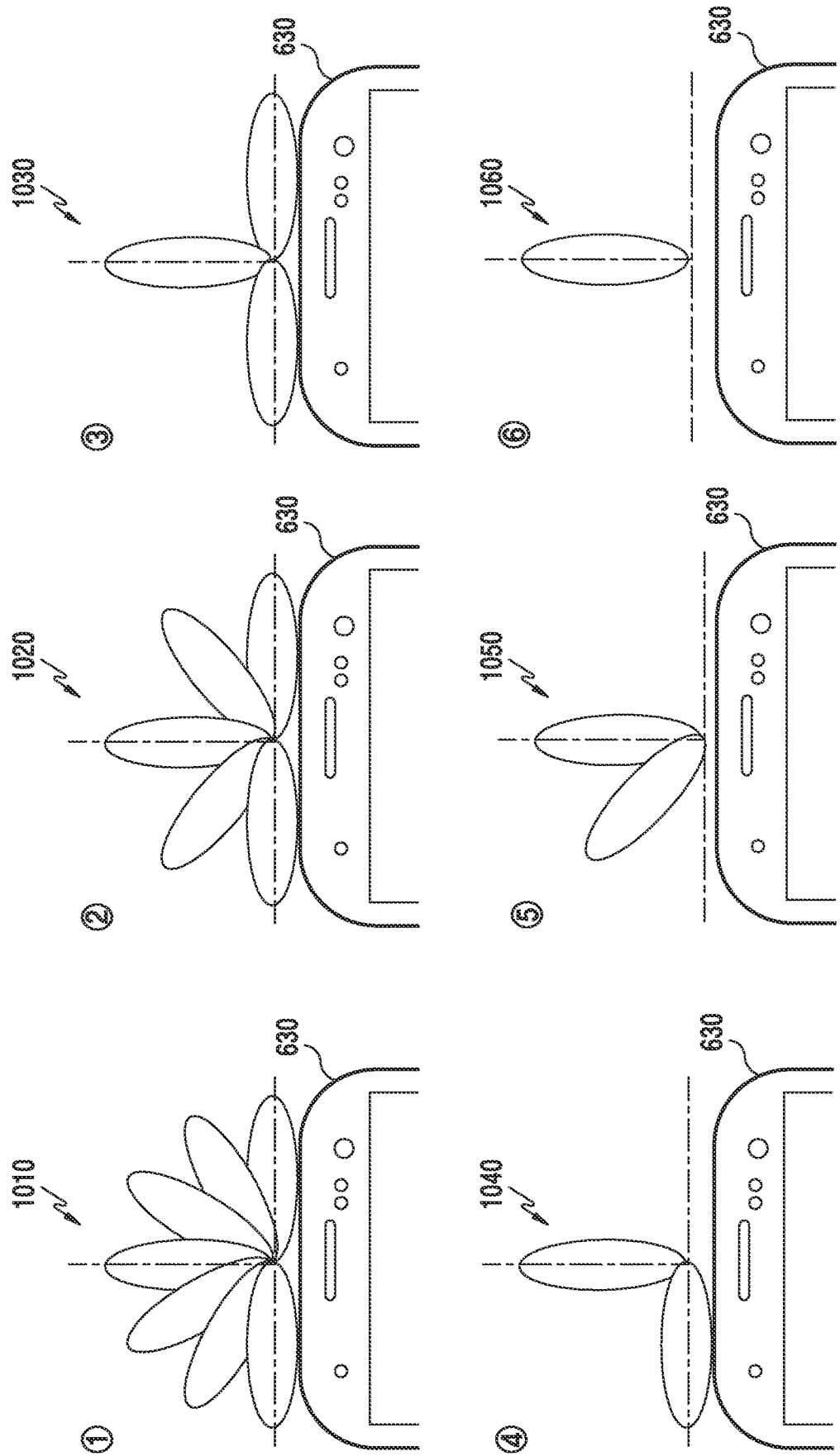
FIG. 10 illustrates an example of comparison of PD values according to an embodiment of the present disclosure.

FIG. 10 illustrates an example of comparison between PD values according to an embodiment of the present disclosure.

Referring to FIG. 10, a path set 1010 may include seven available paths. Reception beams included in the available paths associated with the path set 1010 may form angles of 30° therebetween. A path set 1020 may include five available paths. Reception beams included in the available paths associated with the path set 1020 may form angles of 45° therebetween. A path set 1030 may include three available paths. Reception beams included in the available paths associated with the path set 1030 may form an angle of 90° therebetween. A path set 1040 may include two available paths. Reception beams included in the available paths associated with the path set 1040 may form an angle of 90° therebetween. A path set 1050 may include two available paths. Reception beams included in the available paths associated with the path set 1050 may form an angle of 45° therebetween. A path set 1060 may include one available path. A reception beam of the terminal 630 included in the available path associated with the path set 1060 corresponds to a BD and may have a basic value (e.g., 0).

Referring to Equation 4 above, the terminal 630 may determine that the PD value for the path set 1010 having the largest number of available paths is greatest. Since the angle formed between two beams in the path set 1040 is greater than the angle formed between two beams in the path set 1050, the terminal 630 may determine that the PD value for the path set 1040 is greater than the PD value for the path set 1050. This is because the two beams are more independent as the angle (equal to or smaller than 180°) formed by two beams is greater. The terminal 630 may determine that the PD values increase in the order of the path set 1010, the path set 1020, the path set 1030, the path set 1040, the path set 1050, and the path set 1060. As the number of available paths increases, the PD value has a greater value. As BD values for available paths have a greater value, the PD value may have a greater value.

The terminal 630 may determine a value that represents the cell (hereinafter, referred to as a CRV)) based on the optimal received signal value for the cell calculated in FIGS. 6 to 7B and the PD value of the cell determined in FIGS. 8, 9, and 10. In some embodiments, the terminal 630 may determine the CRV based on Equation 6 below.

$$CRV = \partial * BestBRSRP + (1-\partial) * \text{Path Diversity} \quad \text{Equation 6}$$

In Equation 6, CRV denotes the CRV, best BRSRP denotes the optimal received signal value for the cell, PD denotes the PD value for the cell, and $\partial$ denotes a weighting factor.

By adaptively controlling the weighting factor $\partial$ according to the situation, the characteristics of the CRV may vary. For example, when the weighting factor $\partial$ is relatively great, a CRV calculated by assigning a greater weighted value to best BRSRP than PD may be determined. When the weighting factor $\partial$ is relatively great, it is more likely to select a cell that may provide high throughput. In contrast, when the weighting factor $\partial$ is relatively small, a CRV calculated by assigning a smaller weighted value to best BRSRP than PD may be determined. When the weighting factor ∂ is relatively small, it is more likely to select a cell robust to a channel change due to an obstacle or movement of the terminal.

The best BRSRP may be an indication value indicating the optimal received signal value for the cell. The reported value may be one of 98 values from 0 to 97. The best BRSRP may be determined based on the following table.

TABLE 2

| Indication value | Optimal received signal value (RSRP) | Unit |
|---|---|---|
| 00 | RSRP < −140 | dbm |
| 01 | −140 £ RSRP < −139 | dbm |
| 02 | −139 £ RSRP < −138 | dbm |
| ... | ... | dbm |
| 95 | −46 £ RSRP < −45 | dbm |
| 96 | −45 £ RSRP < −44 | dbm |
| 97 | −44 £ RSRP | dbm |

PD may be an index indicating the PD value for the cell. In some embodiments, the index may be one of 98 values from 0 to 97. The terminal 630 may normalize the PD value for the cell. For example, the terminal 630 may map the PD value for the cell to a mapping value corresponding to one of the values from 0 to 97. For example, the terminal 630 may determine a mapping value corresponding to the PD value for the cell based on Equation 7 below.

$$V_{mapped} = \left\lfloor \frac{98 * (V_{original} - V_{min})}{V_{max} - V_{min} + 1} \right\rfloor \quad \text{Equation 7}$$

In Equation 7, $V_{mapped}$ denotes the mapping value and $V_{original}$ denotes the PD value for the cell. $V_{max}$ denotes the greater value among PD values to be mapped through Equation 7. $V_{min}$ denotes the smallest value among the PD values to be mapped through Equation 7.

The terminal 630 may store a table including ranges of the 98 PD values and indexes corresponding thereto. The terminal 630 may calculate a particular PD based on the stored table, identify a corresponding index, and determine a CRV through the identified index. The terminal 630 may determine that the CRV is a value greater than or equal to 0 and equal to or smaller than 97 by controlling best BRSRP and PD to be greater than or equal to 0 and equal to or smaller than 97.

According to various embodiments of the present disclosure, the terminal 630 may determine the representative value for the cell. For example, the representative value may be determined as Equation 6. In this case, in order to determine the representative value, the determination of the weighting factor ∂ is required. The terminal 630 may acquire the weighting factor ∂ through various methods.

In some embodiments, the terminal 630 may receive the weighting factor ∂ from the serving BS 680. The serving BS 680 may be a BS that supports the serving cell providing service to the terminal 630. The serving BS 680 may determine the weighting factor ∂ for the terminal 630. For example, the serving BS 680 may determine the weighting factor ∂ based on information on neighboring cells near the terminal 630. The information on the neighboring cells may include at least one piece of frequency-band information, beam information, location information, and topology information of each of the neighboring cells. The topology information may be synthetic information on locations of the BSs that support the neighboring cells, a connection network relation (e.g., wireless backhaul or wired backhaul), and directions of supported beams. The serving BS 680 may estimate the value of the number of available paths or independent paths of the terminal 630 from the information on the neighboring cells near the terminal 630. When the number of available paths or independent paths of each of the neighboring cells is greater than or equal to a threshold value, it may be determined that robustness greater than or equal to a predetermined level is guaranteed. Accordingly, the serving BS 680 may determine the weighting factor ∂ to be relatively greater such that the cell is selected based on throughput of the signal.

The serving BS 680 may provide the determined weighting factor ∂ to the terminal 630. For example, the serving BS 680 may insert the weighting factor ∂ into measurement configuration information transmitted in FIG. 12A described below. The serving BS 680 may transmit the measurement configuration information containing the weighting factor d to the terminal 630. In another example, the serving BS 680 may also transmit the weighting factor ∂ to the terminal 630 through a separate downlink channel.

The serving BS 680 may transmit a control signal to the terminal 630 instead of directly transmitting the determined weighting factor ∂ to the terminal 630. The control signal may be a signal indicating the difference between a previous weighting factor and a newly determined weighting factor. For example, the control signal may be a signal indicating one of increase, decrease, and keep. In addition, the control signal may be a signal indicating a default value.

In other embodiments, the terminal 630 may acquire the weighting factor ∂ according to the internal configuration of the terminal 630. For example, the terminal 630 may differently set the weighting factor ∂ depending on the set to which a driven application belongs. When the driven application belongs to an application set that requires seamless service, such as a streaming service, the terminal 630 may set the weighting factor ∂ to be smaller. This is because the seamless service requires channel robustness more than high signal throughput.

In another example, the terminal 630 may set the weighting factor ∂ differently depending on a detected movement speed of the terminal 630. When the terminal 630 move relatively slowly, the weighting factor ∂ may be set to be great. This is because it is determined that security for the channel is guaranteed due to low mobility, and thus the terminal 630 requires high signal throughput.

In another example, the terminal 630 may set the weighting factor ∂ differently depending on the internal state (e.g., a battery state or a brightness state) of the terminal 630. When the charge level of the battery of the terminal 630 is relatively low, the terminal 630 may set the weighting factor ∂ to be small such that a signal having low throughput is received.

In another example, the terminal 630 may set the weighting factor ∂ to a predetermined value according to settings by the user of the terminal 630. The user of the terminal 630 may input a value corresponding to the weighting factor ∂ through a user interface (UI) provided by the terminal 630. The terminal 630 may set the weighting factor ∂ to be the input value. The terminal 630 may measure the cell 621 based on the set weighting factor ∂.

Based on the measurement, the cell having the greatest CRV may be selected. For example, like the handover procedure in FIG. 12A described below, the terminal 630 may transmit a measurement report including the measurement result of the cell 621 to the serving BS 680. The serving BS 680 may select the cell by comparing the CRV of the cell 621 with CRVs of other cells. In another example, like the initial access procedure in FIG. 12B, which is described below, the terminal 630 may select the cell 621 as a cell to be accessed by comparing the CRV of the cell 621 with CRVs of other cells.

Figure 11A:
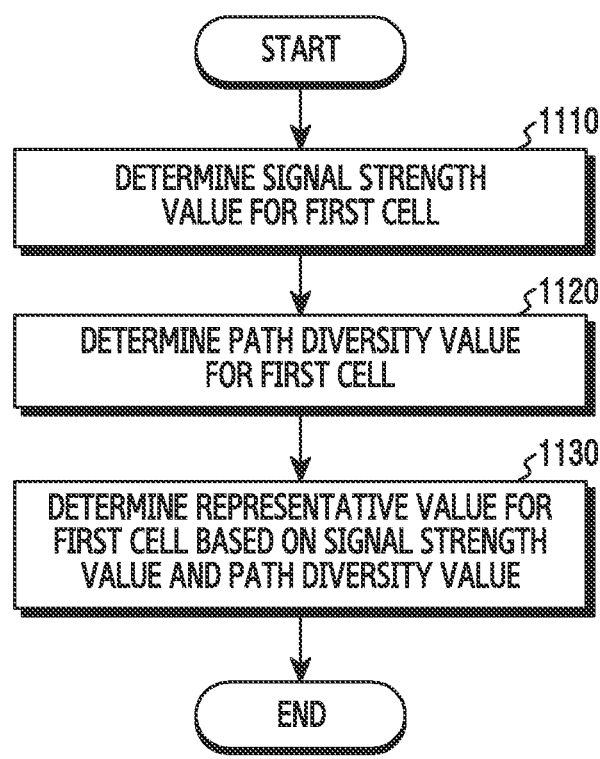
FIG. 11A is a flowchart illustrating the operation of a terminal for determining a cell representative value (CRV) according to an embodiment of the present disclosure.

FIG. 11A is a flowchart illustrating the operation of a terminal for determining a CRV according to an embodiment of the present disclosure. The terminal may be the terminal 630 of FIG. 6.

Referring to FIG. 11A, in operation 1110, the terminal 630 may determine a signal strength value for a first cell. The first cell may be a serving cell or a neighboring cell of the terminal 630. The signal strength value may be an optimal received signal strength value calculated through measurement of a reference signal by the terminal 630. The signal strength value may be a signal strength value that represents the first cell. The reference signal may be a beamformed reference signal. The reference signal may be a cell-specific reference signal (CRS), a channel state information-reference signal (CSI-RS), or a demodulation-reference signal (DM-RS). The terminal 630 may use different types of reference signals depending on whether an RRC connection with the serving cell is established.

The terminal 630 may acquire a signal strength value for each of the received reference signals. The terminal 630 may determine an optimal received signal value that represents the first cell from the acquired signal strength values. The terminal 630 may determine the optimal received signal value for the first cell from the acquired signal values before performing at least one of layer-1 filtering and layer-3 filtering. For example, through a calculation operation of calculating the greatest value of the signal strength values acquired at a $k^{th}$ sweeping interval, the terminal 630 may determine an optimal received signal value corresponding to the $k^{th}$ sweeping interval. After layer-3 filtering, the terminal 630 may determine the optimal received signal value for the first cell. For example, by performing a first calculation operation on (e.g., determining a maximum value, summing, or averaging) signal strength values corresponding to a first reception beam of the terminal 630 at the $k^{th}$ sweeping interval, the terminal 630 may determine a signal strength value that represents the first reception beam. The terminal 630 may perform layer-1 filtering and layer-3 filtering on the signal strength value that represents the first reception beam. The terminal 630 may determine the signal strength value that represents the first cell by performing a second calculation operation on (e.g., determining a maximum value, summing, or averaging) signal strength values that represent respective reception beams of the terminal 630 having passed through layer-3 filtering. The signal strength value that represents the first cell may be the optimal received signal value for the first cell.

In operation 1120, the terminal 630 may determine a PD value for the first cell. The PD value for the first cell may be a parameter value indicating a degree of non-correlation between paths associated with the first cell. The terminal 630 may identify available paths among a plurality of paths between the terminal 630 and the first cell, determine BD values of beams included in the available paths, and determine a PD value for the first cell based on the determined BD values. The greater the determined BD values, the greater the PD value. The greater the number of determined BD values, the greater the PD value. For example, the terminal 630 may determine the BD based on Equation 4 or Equation 5 above.

In operation 1130, the terminal 630 may determine the representative value for the first cell based on the signal strength value and the PD value. The terminal 630 may determine the representative value for the first cell based on the weighting factor as well as the signal strength value and the PD value. The terminal 630 may determine a first weighted value and a second weighted value from the weighting factor. The first weighting factor may be inversely proportional to the second weighted value. The greater the first weighted value, the smaller the second weighted value. For example, when the first weighted value is ∂, the second weighted value may be 1−∂. The terminal 630 may determine the representative value (that is, the CRV) for the first cell by applying the first weighted value to the signal strength value and applying the second weighted value to the PD value. For example, the terminal 630 may determine the CRV for the first cell based on Equation 6 above.

Figure 11B:
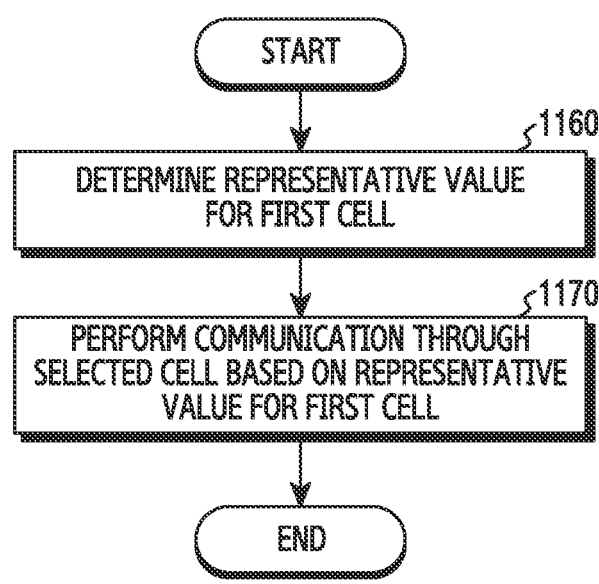
FIG. 11B is a flowchart illustrating the operation of a terminal for cell selection according to an embodiment of the present disclosure.

FIG. 11B is a flowchart illustrating the operation of a terminal for cell selection according to an embodiment of the present disclosure. The terminal may be the terminal 630 of FIG. 6.

Referring to FIG. 11B, in operation 1160, the terminal 630 may acquire the representative value for the first cell. The terminal 630 may determine the representative value for the first cell based on the optimal received signal value for the first cell and the PD value, as described in FIG. 11A.

In operation 1170, the terminal 630 may communicate through the selected cell based on the representative value for the first cell. For example, the terminal 630 may select the cell based on a measurement result and transmit a random-access signal for performing initial access to the selected cell. In another example, the terminal 630 may transmit a message including the measurement result to the serving BS 680 and communicate with the selected cell via the serving BS 680.

In some embodiments, the cell may be selected by the terminal 630. The terminal 630 may be a terminal before the initial access. The terminal 630 may compare measurement results for a plurality of cells. The terminal 630 may compare CRVs of the plurality of cells. The terminal 630 may select the cell having the greatest value among the CRVs. The selection may also be referred to as initial cell selection. For example, when the terminal 630 is a terminal supporting CA, the BS 610 may determine that the selected cell is a primary cell (Pcell). In another example, when the terminal 630 supports DC, the BS 610 may determine that the selected cell is a Pcell of a MCG (or second cell group).

After receiving system information from the BS supporting the selected cell, the terminal 630 may establish an RRC connection with the selected cell. After finishing the access procedure with the selected cell, the terminal 630 may perform communication through the selected cell.

In other embodiments, the cell may be selected by the serving BS 680 of the terminal 630. The terminal 630 may perform a measurement report procedure. The terminal 630 may transmit a measurement result for each of neighboring cells of the terminal 630 to the serving BS 680. The BS 680 may select the cell having the greatest value among CRVs included in the measurement results. For example, if the terminal 630 is a terminal supporting CA, the BS 680 may determine that the selected cell is a secondary cell (Scell). In another example, when the terminal 630 supports DC, the BS 680 may determine that the selected cell is an Scell of a secondary cell group (SCG). In yet another example, the BS 610 may perform handover to the selected cell.

The BS 680 may transmit a control instruction to the terminal 630 to perform communication through the selected cell. The terminal 630 may communicate with the selected cell based on the control instruction.

Figure 12A:
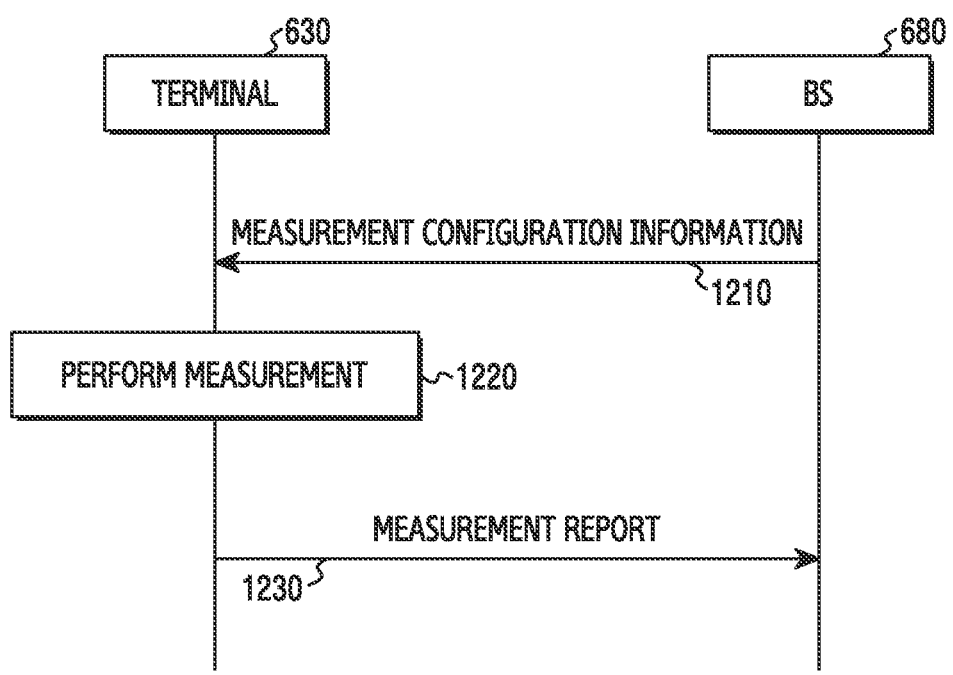
FIG. 12A illustrates an example of a measurement report according to an embodiment of the present disclosure.

FIG. 12A illustrates an example of a measurement report according to various embodiments of the present disclosure.

Referring to FIG. 12A, operations of the measurement report may be performed between the terminal and the BS. The terminal may be the terminal 630 of FIG. 6. The BS may be the serving BS 680 of the terminal 630. Hereinafter, the situation in which the terminal 630 measures a neighboring cell will be described.

Referring to FIG. 12A, in operation 1210, the serving BS 680 may transmit a measurement configuration message to the terminal 630. The measurement configuration message may contain measurement configuration information. The measurement configuration information may include (i) measurement object information, (ii) reporting configuration information, (iii) measurement identity information, (iv) quantity configuration information, and (v) measurement gap information. The measurement configuration information may further include a weighting factor ∂ for determining a CRV.

The measurement object information may indicate an object to be measured by the terminal 630. The measurement object information may indicate at least one of an intra-cell object within a cell, an inter-cell measurement object, and an inter-radio access technology (RAT) measurement object. The measurement object information may indicate cells (hereinafter, 5G cells) of a BS supporting beamforming. The terminal 630 may measure the 5G cells. For example, the measurement object information may indicate the cell 621, which is a neighboring cell serviced by the neighboring BS 620, as the measurement object. The terminal 630 may select a MCG for DC by measuring PD values for the 5G cells.

The reporting configuration information may indicate a reporting type or a reporting condition about a time point at which the measurement result is reported by the terminal 630. The reporting type indicates the type of measurement result. The reporting type may indicate whether the measurement result corresponds to path-diversity-based measurement or optimal-received-signal-based measurement. The reporting condition may be information on an event that triggers the report on the measurement result by the terminal 630 and the period of the report. The reporting conditions may include a condition associated with the PD. For example, the reporting conditions may include a condition that the PD value of the serving cell is equal to or smaller than a threshold value. In another example, the reporting conditions may include a condition that the PD value of the cell 621 corresponding to the neighboring cell is larger than or equal to the threshold value.

The measurement identity information may be information on a measurement identity indicating the measurement object, which the terminal 630 reports, when the terminal 630 reports the measurement object, and the type of the report based on a link between the measurement object and report configuration. The quantity configuration information may be parameter information on filtering of a measurement unit, a report unit, and a measurement result value. The measurement gap information may be information on a measurement gap corresponding to a section that can be used by the terminal 630 for measurement without consideration of data transmission with the serving cell.

In operation 1220, the terminal 630 may perform the measurement based on the received measurement configuration information. The terminal 630 may measure a cell indicated by measurement object information included in the measurement configuration information. For example, the terminal 630 may measure the cell 621. When a reporting condition contained in the reporting configuration information included in the measurement configuration information is satisfied, the terminal 630 may measure the indicated cell. For example, when a condition associated with PD is satisfied, the terminal 630 may measure the cell 621.

In operation 1230, the terminal 630 may report a measurement result to the serving BS 680. The message including the measurement result may be referred to as a measurement report message. The measurement report message may include a measurement identity, a representative value of the serving cell, and a representative value of the cell 621 corresponding to the measured neighboring cell. The measurement identity may be a measurement identity associated with the reporting configuration of the satisfied reporting condition. The measurement identity may indicate the cell 621.

Figure 12B:
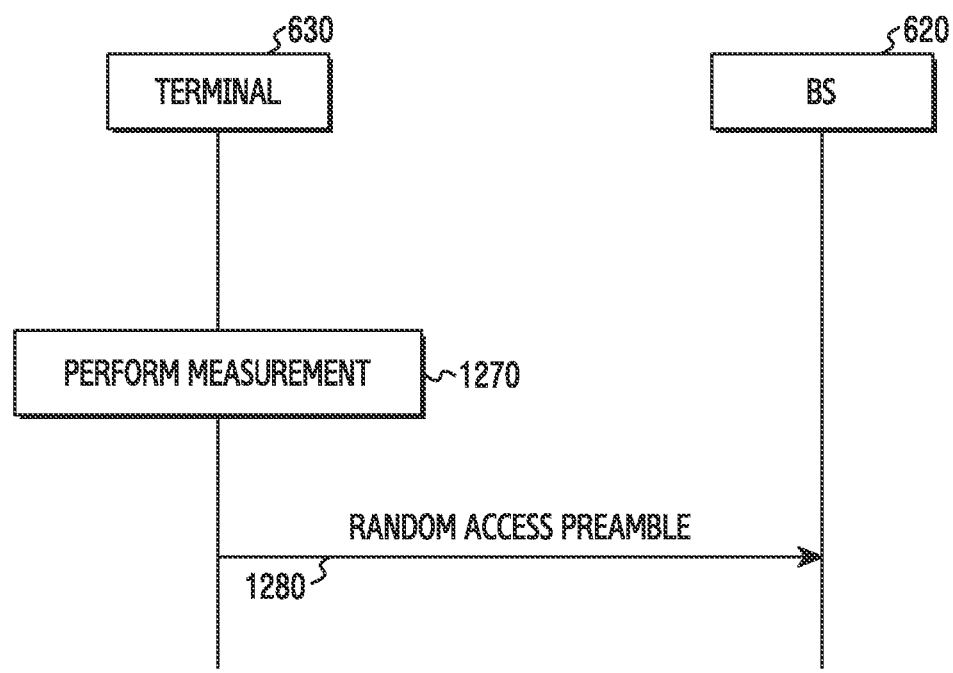
FIG. 12B illustrates an example of an access procedure according to an embodiment of the present disclosure.

FIG. 12B illustrates an example of an access procedure according to various embodiments of the present disclosure.

Referring to FIG. 12B, operations of the access procedure may be performed between the terminal and the BS. The terminal may be the terminal 630 of FIG. 6. The BS may be a BS supporting a cell selected by the terminal 630. For example, the BS may be the BS 620 of FIG. 6. Hereinafter, a situation in which the terminal 630 selects a cell and accesses the selected cell will be described.

Referring to FIG. 12B, in operation 1270, the terminal 630 may perform measurement. The terminal 630 may measure neighboring cells of the terminal 630. For example, the terminal 630 may measure the cell 621. As a result of the measurement, the terminal 630 may determine an optimal received signal value and a PD value for each of the neighboring cells. The terminal 630 may determine a CRV of each of the neighboring cells based on each of the optimal received signal values and the PD values. The terminal 630 may determine the CRV of each of the neighboring cells by controlling a weighting factor to serve a given purpose. For example, when a cell that requires channel robustness is needed, the terminal 630 may determine the CRV of each of the neighboring cells by applying a greater weighted value to the PD value. The terminal 630 may identify the CRV having the greatest value (hereinafter, referred to as a maximum CRV) among the CRVs of the neighboring cells. The terminal 630 may select a cell corresponding to the maximum CRV among the neighboring cells.

In operation 1280, the terminal 630 may transmit random-access preamble to the BS supporting the selected cell. For example, the terminal 630 may transmit the random-access preamble to the BS 620 supporting the selected cell 621. By transmitting the random-access preamble, the terminal 630 may inform the BS 620 that there is an attempt to access the cell 621, and the BS 620 may estimate a delay with the terminal 630.

FIGS. 6, 7A, 7B, 8, 9, 10, 11A, 11B, 12A, and 12B have described the method of determining the CRV that represents a predetermined cell. In the method of determining the CRV, the weighting factor may be adaptively set. For example, the weighting factor may need to be configured differently for the case in which the cell is selected with a focus on cell robustness and the case in which the cell is selected with a focus on data throughput of the cell. Hereinafter, FIGS. 13, 14, 15, 16, 17, 18, 19, 20, 21, and 22 illustrate various embodiments of selecting an optimal cell by adaptively controlling a weighting factor depending on the situation.

Figure 13:
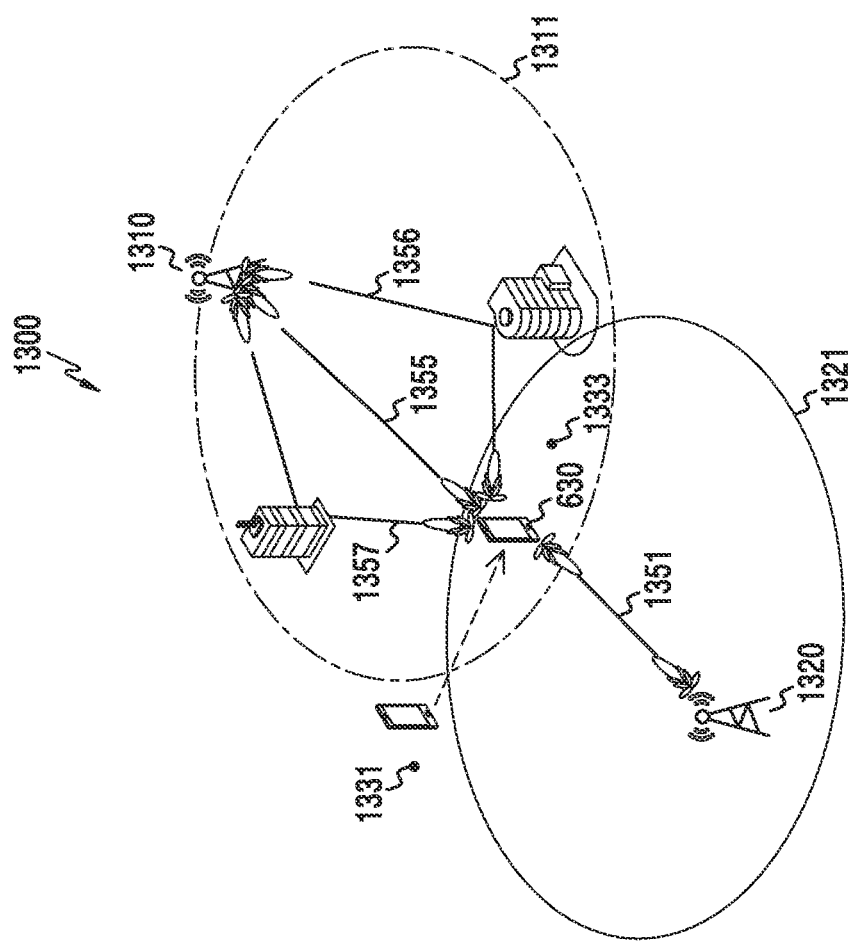
FIG. 13 illustrates an example of cell selection for a terminal that supports carrier aggregation (CA) according to an embodiment of the present disclosure.

FIG. 13 illustrates an example of cell selection for a terminal that supports CA according to an embodiment of the present disclosure. The terminal may be the terminal 630 of FIG. 6.

Referring to FIG. 13, the terminal 630 may be a terminal that supports CA technology using two or more component carriers (CCs) to support a wide transmission bandwidth. The two or more CCs may include a primary component carrier (PCC) and a secondary component carrier (SCC). In the PCC, a cell that provides service to the terminal 630 may be referred to as a Pcell. In the SCC, a cell that provides a service to the terminal 630 may be referred to as a Scell. The Pcell and the Scell may be used as serving cells.

Referring to FIG. 13, a wireless communication environment 1300 may be a wireless communication environment including the terminal 630 that supports CA. The wireless communication environment 1300 may include a BS 1310 and a BS 1320. The BS 1310 may provide service to a cell 1311. The BS 1320 may provide service to a cell 1321. The cell 1311 may provide a path 1355, a path 1356, and a path 1357 to the terminal 630 located at a position 1333. The cell 1321 may provide the path 1351 to the terminal 630 located at the position 1333.

When the terminal 630 has no serving cell (e.g., in an idle mode), the terminal 630 may perform a cell search in order to select a cell. The terminal 630 may select a cell having the greatest measurement value among the found cells. The measurement values may be CRVs that represent the found cells. The selected cell may be a Pcell. The terminal 630 may receive system information of the cell from the BS supporting the selected cell. The terminal 630 may access the selected cell through a random-access operation with the BS. In order to establish an RRC connection with the selected cell, the terminal 630 may transmit or receive control signaling to or from the BS supporting the selected cell. When selecting the Pcell, the terminal 630 may transmit or receive control information such as system information, a control signal, a random-access preamble, and a random-access response to or from the BS. The transmission of the control information may require robustness against a channel state change. Accordingly, when selecting the Pcell, the terminal 630 may be required to select a cell having relatively high robustness against the channel change.

The terminal 630 may select the cell having the greatest value among the CRVs of the cells. The terminal 630 may determine the CRV of each cell by applying a greater weighted value to PD for each cell than the weighted value applied to a received signal value. This is because the transmission of the control information should intensively consider the PD in order to prevent the generation of problems such as a transmission delay due to transmission blocking, like RLF or recovery. For example, the terminal 630 may set the weighting factor in Equation 6 above to be relatively small. The weighting factor may have a value smaller than 0.5. The terminal 630 may select the cell 1311 having the greater PD value between the cells 1311 and 1321.

When the terminal 630 has a serving cell, the terminal 630 may perform a measurement report in order to increase a transmission rate by adding the cell. The terminal 630 may report the result of measurement to a BS (hereinafter referred to as a serving BS) supporting the serving cell. The serving BS may select the cell having the greatest measurement value among measurement values for neighboring cells of the terminal 630 received from the terminal 630. The measurement value may be a CRV included in the measurement report. The selected cell may be an Scell. When the Scell already belongs to the serving cell, the selected cell may be serviced to the terminal 630 as an additional Scell. The terminal 630 may transmit or receive a larger amount of data through the selected or added Scell. General data transmission may require a higher data transmission rate while requiring relatively lower robustness than control information transmission. Accordingly, when selecting or adding the Scell, the serving BS may be required to select a cell having relatively high data transmission and data throughput.

The serving BS may select the cell having the greatest value among the CRVs of the cells. The terminal 630 may determine the CRV of each cell by applying a greater weighted value to the optimal received signal value of each cell than a weighted value applied to the PD of each cell. This is because data transmission intensively considers an amount of transmission, throughput, and output rather than problems of errors due to transmission blocks of control information. Further, the Scell may be relatively more easily added/released than the Pcell, and thus may intensively consider throughput, unlike the Pcell. For example, the terminal 630 may set the weighting factor in Equation 6 to be relatively great. The weighting factor may have a value greater than 0.5. The serving BS may select the cell 1311 having a path 1351 of a higher priority of RSRP between the cells 1311 and 1321. When the serving BS is the BS 1310 supporting the cell 1311, the CA may be referred to as intra-eNB CA. When the serving BS is different from the BS 1310 supporting the cell 1311, the CA may be referred to as inter-eNB CA.

Hereinafter, for convenience of description, when a first weighted value applied to the optimal received signal value of the cell is greater than a second weighted value applied to the PD value of the cell in the determination of the CRV for each neighboring cell, the operation mode of the terminal 630 may be referred to as an optimal-received-signal-based cell selection mode. In contrast, when the first weighted value is smaller than the second weighted value, the operation mode of the terminal 630 may be referred to as a path-diversity-based cell selection mode. However, the terms do not limit the detailed operation of the terminal 630. The operation of determining one of the operation modes by the terminal 630 is not necessary. The terminal 630 may adaptively set the weighting factor depending on the situation. The number of candidates of the weighting factor may be two or more according to the internal settings of the terminal 630.

Figure 14:
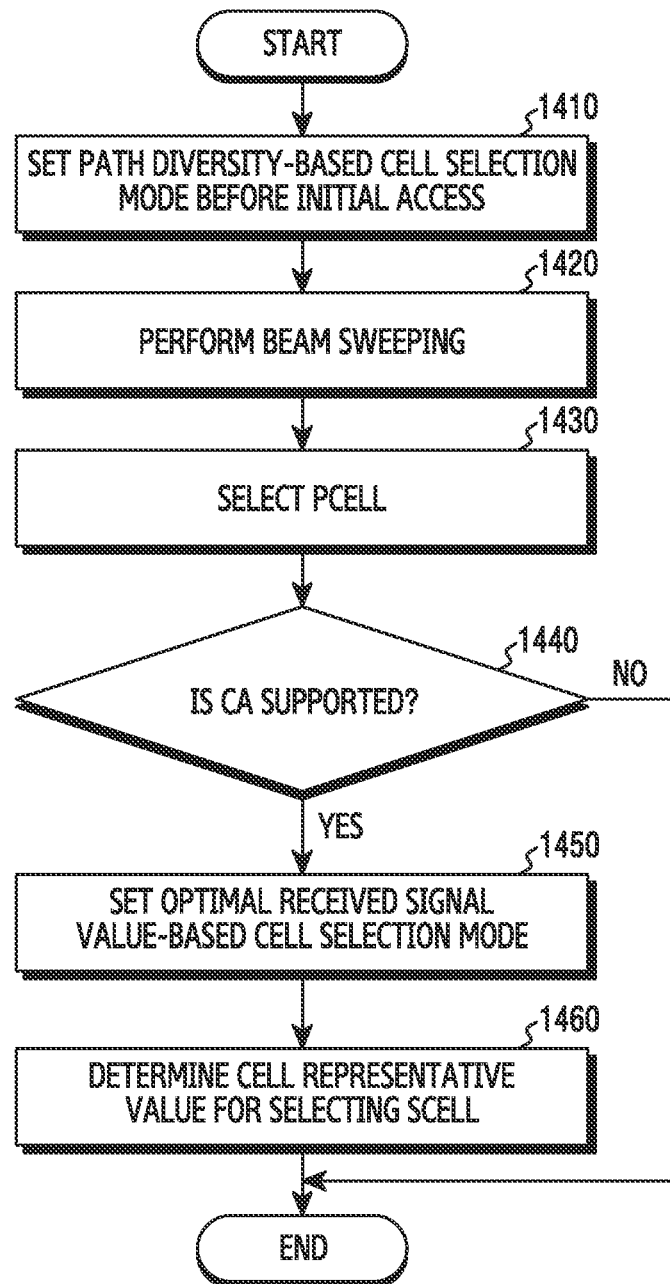
FIG. 14 is a flowchart illustrating the operation of cell selection by a terminal supporting CA according to an embodiment of the present disclosure.

FIG. 14 is a flowchart illustrating the operation of cell selection by a terminal supporting CA according to an embodiment of the present disclosure. The terminal may be the terminal 630 of FIG. 6. Hereinafter, the operation of the terminal 630 based on the assumption of the wireless communication environment 1300 of FIG. 13 will be described.

Referring to FIG. 14, in operation 1410, the terminal 630 may set the operation mode as the path-diversity-based cell selection mode before initial access. By setting the weighted factor to be small, the terminal 630 may set the weighted value to be applied to the PD value to be greater than the weighted value to be applied to the optimal received signal value.

In operation 1420, the terminal 630 may perform beam sweeping. The terminal 630 may receive reference signals from neighboring cells through the beam-sweeping operation. The reference signals may be beamformed reference signals. The terminal 630 may calculate the optimal received signal value for each cell from the received reference signals. For example, in the manner described in FIGS. 6, 7A, and 7B, the terminal 630 may calculate the optimal received signal value for each cell. The terminal 630 may identify at least one available path based on the reference signals received from the cells. The terminal 630 may determine BD values for at least one identified available path. The terminal 630 may determine a PD value of each cell from the determined BD values. The terminal 630 may determine the CRV of each cell based on the calculated optimal received signal value and the PD value. When the number of neighboring cells of the terminal 630 is N, the terminal 630 may determine N CRVs corresponding to the respective neighboring cells.

In operation 1430, the terminal 630 may select a Pcell. The terminal 630 may identify the greatest CRV among the CRVs acquired as a result of the beam sweeping in operation 1420. The terminal 630 may select the cell corresponding to the greatest CRV as the Pcell. Currently, the operation mode of the terminal 630 is the path-diversity-based cell selection mode, and thus the selected Pcell may be a cell selected in intensive consideration of the PD value.

In operation 1440, the terminal 630 may identify whether CA is supported. When CA is not supported, the terminal 630 may end the operation for additional cell selection. The Pcell is provided to the terminal 630 as a single cell. The terminal 630 may perform operation 1450 when CA is supported. The terminal 630 may perform operation 1450 to select an Scell.

In operation 1450, the terminal 630 may set the operation mode as the optimal-received-signal-based cell selection mode. When the previous operation mode of the terminal 630 is the path-diversity-based cell selection mode, the terminal 630 may change the weighting factor. By setting the weighting value to be relatively great, the terminal 630 may assign a greater weighted value to be applied the optimal received signal value than the weighted value to be applied to the PD value.

In operation 1460, the terminal 630 may determine a CRV for selecting the Scell.

In some embodiments, the terminal 630 may measure each of the neighboring cells to select the Scell. The terminal 630 may determine the CRV for each of the neighboring cells based on the measurement. Unlike the value used for selecting the Pcell, a newly applied weighted factor may be a value that applies a higher weighted value to the optimal received signal value of each cell than a weighted value applied to the PD value for each cell. In other embodiments, the terminal 630 may determine the CRV for selecting the Scell based on values calculated when the Pcell or another Scell is selected. For example, the terminal 630 may newly calculate the CRV for each cell based on the optimal received signal and the PD value for each of the neighboring cells acquired when the Pcell is selected and the newly set weighting factor. The terminal 630 may report the calculated CRVs to the serving BS that provides the Pcell.

Although not illustrated in FIG. 14, the serving BS may select the Scell to provide service to the terminal 630 based on the reported CRVs. The serving BS may select the cell corresponding to the greatest CRV as the Scell. When a supported Scell already exists, the serving BS may add the selected Scell.

Although FIG. 14 shows that operations 1410 to 1460 are sequentially performed, some operations may be omitted or the next operation may be performed after a considerable amount of time has passed. For example, when the terminal 630 has the serving cell, the terminal 630 may not perform operations 1410 to 1430. Further, when the serving cell includes the Pcell and the Scell, the terminal 630 may perform only operations 1450 to 1460 without 1410 to 1440 in order to add the Scell. In another example, when a condition to select the Scell is not satisfied after operation 1450, the terminal 630 may perform operation 1460 after a considerable amount of time has passed.

Figure 15:
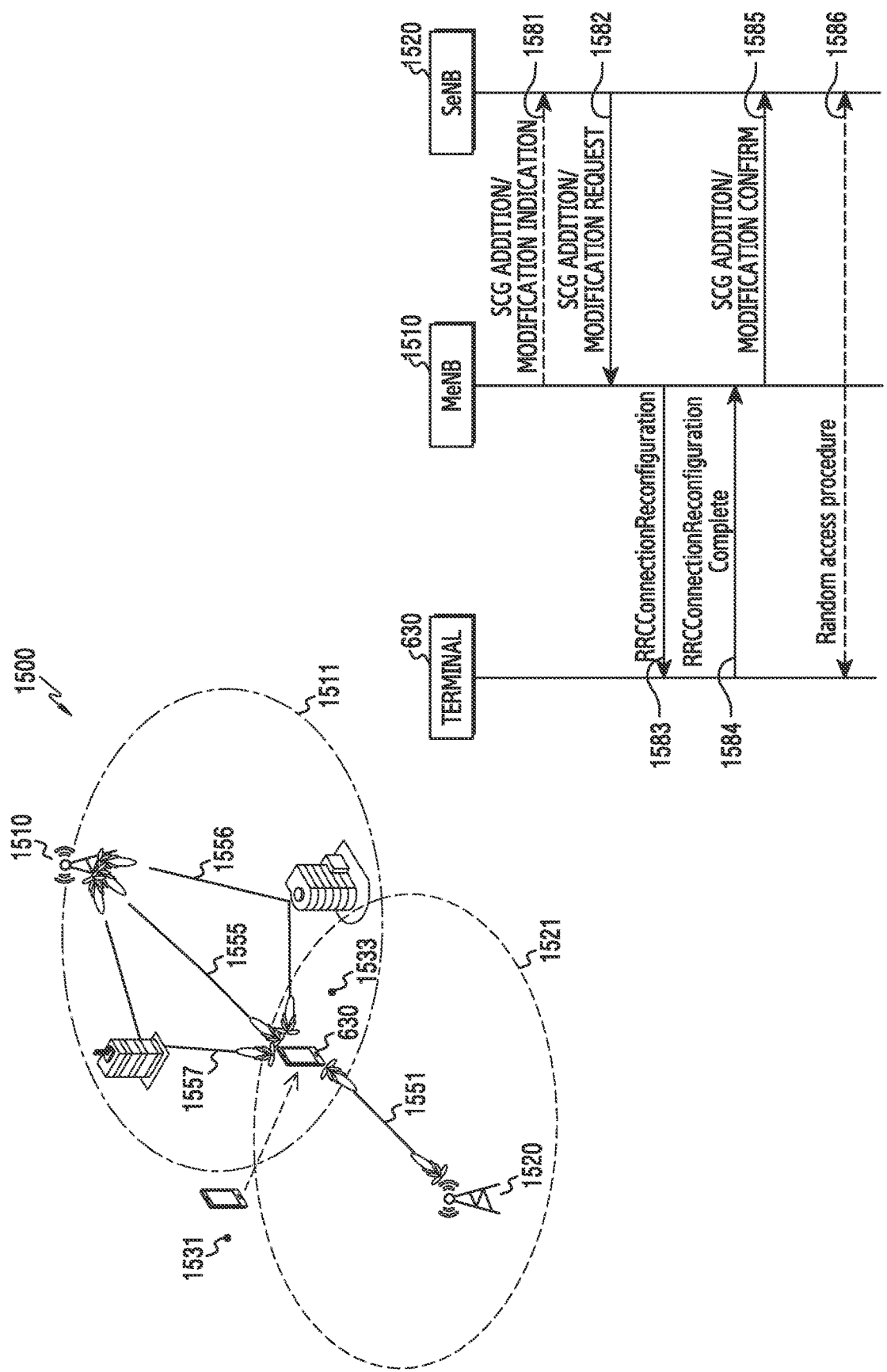
FIG. 15 illustrates an example of a cell group and cell selection for a terminal supporting dual connectivity (DC) according to an embodiment of the present disclosure.

FIG. 15 illustrates an example of a cell group and cell selection for a terminal supporting DC according to an embodiment of the present disclosure. The terminal may be the terminal 630 of FIG. 6.

Referring to FIG. 15, the BS may be divided into a macro BS, a pico BS, and a femto BS according to a covered area. The macro BS may be a BS that provides a cell (hereinafter referred to as a macro cell) of a relatively wide area compared to the pico BS or the femto BS. The pico BS or the femto BS may be referred to as a small BS. A cell of the small BS may be referred to as a small cell. The terminal 630 may receive service through the macro cell and a plurality of small cells. In order to solve the problem occurring due to handover between the plurality of small cells, the terminal 630 may support DC technology for dividing a BS (hereinafter, referred to as a master eNB (MeNB)) in charge of control signaling and a BS (hereinafter, referred to as a secondary eNB (SeNB)) in charge of data transmission.

Referring to FIG. 15, a wireless communication environment 1500 may be a wireless communication environment including the terminal 630 that supports DC. The wireless communication environment 1500 may include a BS 1510 and a BS 1520. The BS 1510 may provide service to a cell 1511. The BS 1520 may provide service to a cell 1521. The cell 1511 may provide a path 1555, a path 1556, and a path 1557 to the terminal 630 located at a position 1533. The cell 1521 may provide the path 1551 to the terminal 630 located at the position 1533.

When the terminal 630 has no serving cell (e.g., in an idle mode), the terminal 630 may perform a cell search in order to select a cell. The terminal 630 may select the cell having the greatest measurement value among the found cells. The measurement value may be a CRV that represents the found cells. The terminal 630 may set a BS supporting the selected cell as a MeNB. The cell may be a Pcell. As described in FIG. 13, when selecting the Pcell, the terminal 630 may be required to select a cell having relatively high robustness against channel change. In the determination of a CRV of each cell, the terminal 630 may determine the CRV by applying a higher weighted value to the PD for each cell than the weighted value applied to the optimal received signal value. For example, the terminal 630 may set the weighted factor in Equation 6 above to be relatively small. The terminal 630 may select the cell 1511 having a greater PD value between the cells 1521 and 1511. As the cell 1511 is selected, the terminal 630 may set the BS 1510 as the MeNB. When the terminal 630 is a terminal supporting CA, another cell (not shown), other than the cell 1511 provided by the MeNB, may be additionally set in the terminal 630. The other cell may be an Scell. A group of serving cells (the cell 1511 and the other cell) provided by the MeNB may be referred to as a MCG. The MCG may include one Pcell and at least one Scell.

After setting the MeNB, the terminal 630 may perform a measurement report in order to set the SeNB. The terminal 630 may report the result of the measurement to the MeNB (e.g., the BS 1510). The MeNB may select the SeNB based on measurement reports on neighboring cells of the terminal 630 received from the terminal 630. The SeNB may be a BS set to manage additional radio resources for increasing the amount of output data. However, the SeNB has a scheduler, which serves to manage resources, different from that of the MeNB, and thus the MeNB may select a primary secondary cell (PScell) of the SeNB that performs random access, such as the Pcell of the MeNB. The PScell is used for transmitting control information that requires robustness against channel change, and the terminal 630 may determine the CRV of each cell by applying a higher weighted value to the PD for each cell than the weighted value applied to the optimal received signal value as a measurement result for the measurement report. For example, the MeNB 1510 may set the BS 1520 as the SeNB.

Other cells (Scells) of the SeNB have the purpose of increasing the amount of output data, and the MeNB may be required to select a cell having a relatively high data transmission rate and a relatively high amount of data output when selecting or adding the cell. As a measurement result for the measurement report, the terminal 630 may determine the CRV of each cell by applying a greater weighted value to the optimal received signal value than the weighted value applied to the PD value for each cell. The terminal 630 may select the Scell based on a value different from the weighting factor used when the Pcell or the PScell is selected. For example, the MeNB 1510 may select the cell 1521 as the Scell of the SeNB. A group of serving cells (the PScell and the cell 1521) provided by the SeNB may be referred to as a SCG. The SCG may include one PScell and at least one Scell.

The detailed operation for selecting the Scell of the SeNB is as follows. The MeNB of the terminal 630 corresponds to the BS 1510, and the SeNB of the terminal 630 corresponds to the BS 1520. Although not illustrated in FIG. 15, the terminal 630 may measure neighboring cells in order to select the Scell of the SeNB. The terminal 630 may report the measurement result to the BS 1510.

In operation 1581, the BS 1510 may determine whether to add, delete, or change the Scell of the SeNB based on the measurement report received from the terminal 630. Hereinafter, the operation of adding the Scell will be described. When adding the Scell of the SeNB, the BS 1510 may transmit an indication message for indicating the addition to the BS 1520 corresponding to the SeNB. The indication message may contain current configuration information of the terminal 630, evolved packet system (EPS) bearer information, and information requested to the BS 1520.

In operation 1582, the BS 1520 may transmit a request message for adding the Scell to the BS 1510. The request message may contain information related to the cell to be added to the terminal 630 and information related to a bearer (hereinafter, referred to as offload bearer) for the terminal 630.

When the BS 1510 receives the request message, the Scell of the BS 1520 may be added to the terminal 630 in operation 1583. In order to set the offload bearer, the BS 1510 may transmit an RRC connection reconfiguration message to the terminal 630. The RRC connection reconfiguration message may contain information on the Scell of the BS 1520. Further, the RRC connection reconfiguration message may also contain information on the offload bearer between the terminal 630 and the BS 1520.

When the addition of the Scell of the BS 1520 is completed, the terminal 630 may transmit an RRC connection reconfiguration completion message to the BS 1510 in operation 1584.

When the BS 1510 receives the RRC connection reconfiguration completion message, the BS 1520 may transmit an acknowledgement message indicating the completion of the addition of the SCG to the BS 1510 in operation 1585.

In operation 1586, the terminal 630 may perform a random-access procedure with the PScell of the BS 1520. The terminal 630 may synchronize the newly added Scell of the BS 1520 through the random-access procedure and set a transmission output. The terminal 630 may transmit and receive data to and from the BS 1520 through the Scell. Operation 1586 may be independently performed from the operations (e.g., operation 1584 and operation 1585) indicating the completion of the RRC connection reconfiguration. Accordingly, operation 1586 may be performed before operation 1585.

For example, when the terminal 630 selects the cell (Pcell) for configuring the MeNB or when the MeNB selects the cell for configuring the PScell of the SeNB, the terminal 630 may operate in the path-diversity-based cell selection mode. In contrast, when the MeNB selects the cell for configuring the Scell of the MeNB or the SeNB, the terminal 630 may operate in the optimal-received-signal-based cell selection mode.

Figure 16:
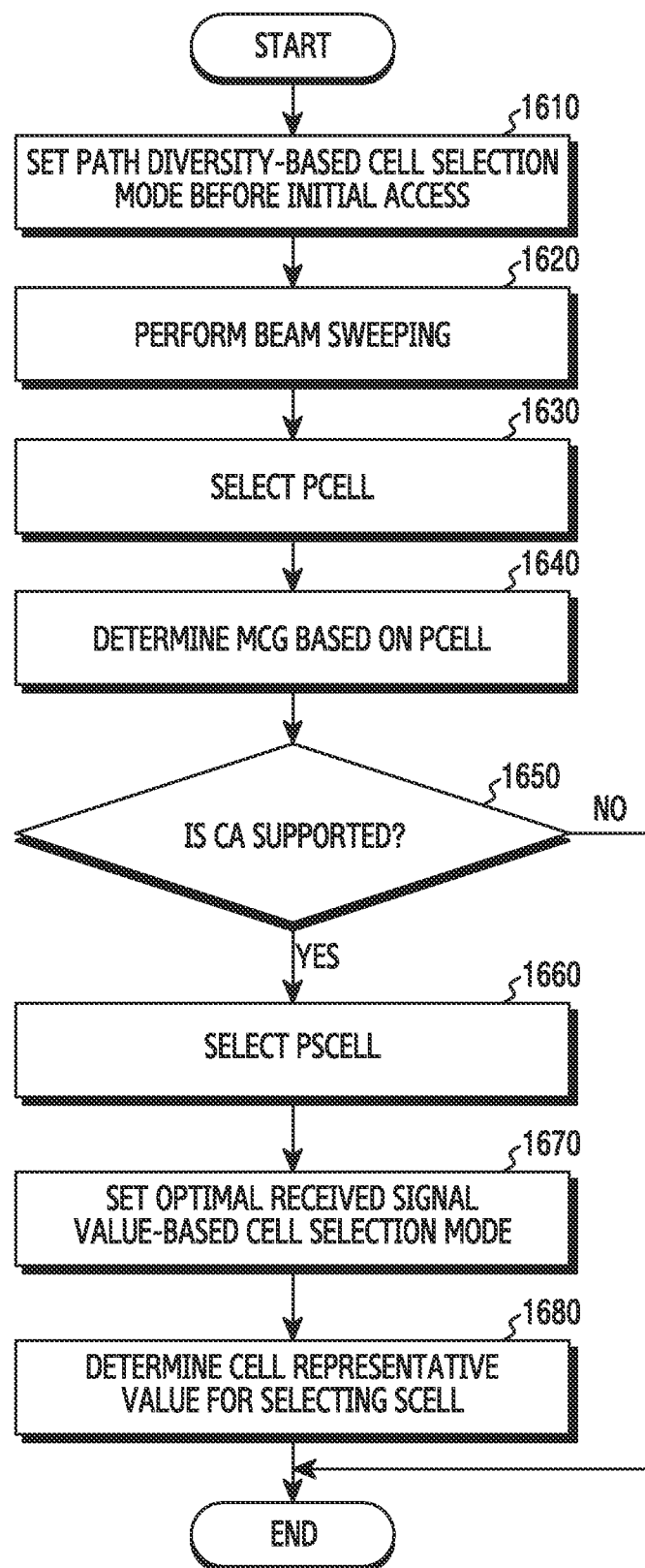
FIG. 16 is a flowchart illustrating the operation for selecting a cell group and a cell of a terminal that supports DC according to an embodiment of the present disclosure.

FIG. 16 is a flowchart illustrating the operation for selecting a cell group and a cell of a terminal that supports DC according to various embodiments of the present disclosure. The terminal may be the terminal 630 of FIG. 6.

Referring to FIG. 16, the operation of the terminal 630 as shown in FIG. 16 will be described based on the assumption of the wireless communication environment 1500 of FIG. 15.

Referring to FIG. 16, in operation 1610, the terminal 630 may set the operation mode as a PD based cell selection mode before initial access. That is, by setting the weighted factor to be small, the terminal 630 may set the weighted value to be applied to the PD value to be greater than the weighted value to be applied to the optimal received signal value.

In operation 1620, the terminal 630 may perform beam sweeping. The terminal 630 may receive reference signals from neighboring cells through the beam-sweeping operation. The reference signals may be beamformed reference signals. The terminal 630 may calculate the optimal received signal value for each cell from the received reference signals.

In operation 1630, the terminal 630 may select a Pcell. The terminal 630 may identify the greatest CRV among the CRV s acquired as a result of the beam sweeping in operation 1620. The terminal 630 may select the cell corresponding to the greatest CRV as the Pcell. Currently, the operation mode of the terminal 630 is the path-diversity-based cell selection mode, and thus the selected Pcell may be a cell selected in intensive consideration of the PD value.

In operation 1640, the terminal 630 may select the BS supporting the Pcell as the MeNB. The terminal 630 may identify a set of serving cells provided by the MeNB as an MCG.

In operation 1650, the terminal 630 may identify whether DC is supported. When DC is not supported, the terminal 630 may end the cell selection operation for selecting the SeNB. The Pcell is a single cell, and the BS of the Pcell may be provided to the terminal 630 as the serving BS. The terminal 630 may perform operation 1660 when DC is supported. The terminal 630 may perform operation 1660 to select the cell of the SeNB.

In operation 1660, the terminal 630 may select the PScell. Currently, the operation mode of the terminal 630 is the path-diversity-based cell selection mode, and thus the selected PScell may be a cell selected in intensive consideration of the PD value.

In operation 1670, the terminal 630 may set the operation mode as the optimal-received-signal-based cell selection mode. When the previous operation mode of the terminal 630 is the path-diversity-based cell selection mode, the terminal 630 may change the weighting factor. In order to select the Scell, by setting the weighting factor to be relatively great, the terminal 630 may assign a greater weighted value to be applied to the optimal received signal value than the weighted value to be applied to the PD value. This is because the purpose of the Scell is to improve data throughput and increase a data rate.

In operation 1680, the terminal 630 may determine a CRV for selecting the Scell. The terminal 630 may measure each of the neighboring cells to select the Scell. The terminal 630 may determine the CRV for each of the neighboring cells based on the measurement. Unlike the value used when the PScell is selected, a newly applied weighting factor may be a value that applies a greater weighted value to the optimal received signal value than a weighted value applied to the PD for each cell. The terminal 630 may determine the CRV for selecting the Scell based on the values calculated when selecting the Pcell, the PScell, or another cell. For example, the terminal 630 may newly calculate the CRV for each neighboring cell based on the optimal received signal value and the PD value of each neighboring cell acquired when the Pcell is selected, and the newly set weighted factor. The terminal 630 may report the calculated CRVs to the MeNB.

Although not illustrated in FIG. 16, the MeNB may select the Scell to provide service to the terminal 630 based on the reported CRVs. The MeNB may select the cell corresponding to the greatest CRV as the Scell. When an already supported Scell exists, the MeNB may add the selected Scell.

Although FIG. 16 shows that operations 1610 to 1680 are sequentially performed, some operations may be omitted, or the next operation may be performed after a considerable amount of time has passed.

Figure 17:
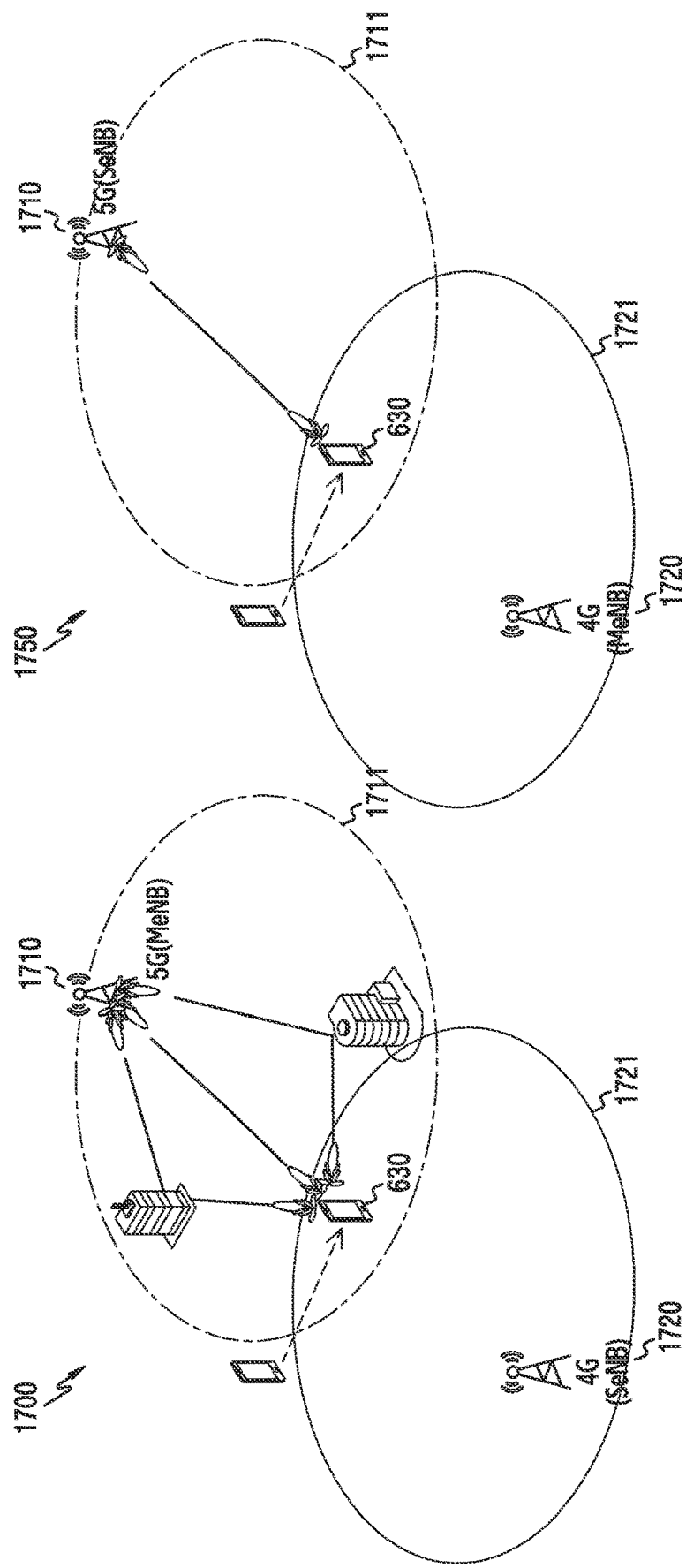
FIG. 17 illustrates an example of selecting a radio access technology (RAT) that supports a master cell group (MCG) according to an embodiment of the present disclosure.

FIG. 17 illustrates an example of selecting a RAT that supports a MCG according to various embodiments of the present disclosure.

Referring to FIG. 17, a wireless communication environment 1700 and a wireless communication environment 1750 may include a BS 1710, a BS 1720, and a terminal 630. The BS 1710 may provide service to a cell 1711. The BS 1720 may provide service to a cell 1721. The terminal 630 may be a terminal supporting DC. The BS 1710 and the BS 1720 may be BSs that provide different RATs. For example, the BS 1710 may be a BS that supports a beamforming-based RAT. The BS 1710 may be referred to as a 5G BS. The BS 1720 may be a BS that supports an omnidirectional RAT. The BS 1720 may be referred to as a $4^{th}$ generation (4G) BS.

DC may be required to set BSs such that an MeNB and an SeNB are distinguished from each other. The RAT supported by the MeNB and the RAT supported by the SeNB may be different RATs. Hereinafter, for convenience of description, the beamforming-based RAT is referred to as a first RAT. The first RAT may indicate RAT associated with $5^{th}$-generation mobile communication. The omnidirectional RAT is referred to as a second RAT. The second RAT may indicate RAT associated with $4^{th}$-generation mobile communication. The first RAT and the second RAT have different RF) structures or standards. Further, the first RAT is the beamforming-based RAT, and may transmit a signal according to a directivity characteristic so as to realize high throughput and a low delay speed. However, due to the directivity characteristic, a signal strength and a signal quality value are sensitively changed according to a channel state change, such as detection of an obstacle or movement of the terminal. Accordingly, the first RAT provides relatively low robustness. In contrast, the second RAT is an omnidirectional RAT, and may transmit a signal in all directions so as to provide relatively low throughput and a high delay speed. However, due to the omnidirectional characteristic, for a channel state change such as detection of an obstacle or movement of the terminal, the received signal strength and the signal quality value are changed within a narrow width. The second RAT provides relatively high robustness.

The MCG corresponding to a serving cell group of the MeNB may take charge of RRC signaling and control signaling, such as a random-access procedure, and thus may be required to be robust against the channel change. Accordingly, the terminal 630 may set the BS supporting the second RAT as the MeNB. However, when the BS supporting the second RAT is set as the MeNB all the time, even though the serving cell of the BS supporting the first RAT has a higher PD value than the serving cell of the BS supporting the second RAT, the terminal 630 may perform control signaling through the second RAT, thereby resulting in inefficiency. This is because the first RAT is more robust against channel change than the second RAT. Accordingly, when the cell is measured to determine the MeNB or the MCG, it may be necessary to consider the PD values for cells of the first RAT.

The terminal 630 may acquire the PD value for each of the cells supporting the first RAT, that is, the 5G cells. The terminal 630 may identify the greatest PD value among the acquired PD values. When the maximum PD value is greater than a threshold value, the terminal 630 may set the BS supporting the corresponding 5G cell as the MeNB. For example, the terminal 630 may be a terminal included in the wireless communication environment 1700. The terminal 630 may determine a cell corresponding to the maximum PD value for the 5G cells as a cell 1711. The terminal 630 may determine that the PD value of the cell 1711 including three available paths is greater than a threshold value. The terminal 630 may set the BS 1710 as the MeNB.

When the maximum PD value is not greater than the threshold value, the terminal 630 may set the BS supporting the 4G cell as the MeNB. The terminal 630 may measure optimal RSRP values for the 4G cells and set a BS supporting a cell corresponding to the greatest RSRP value as the MeNB. For example, the terminal 630 may be a terminal included in the wireless communication environment 1750. The terminal 630 may determine that a cell corresponding to the maximum PD value for the 5G cells is a cell 1711. The terminal 630 may determine that the PD value of the cell 1711 including one available path is not greater than the threshold value. The terminal 630 may determine that a cell corresponding to the greatest RSRP value among the optimal RSRP values of the 4G cells is the cell 1721. The terminal 630 may set the BS 1710 as the MeNB.

The terminal 630 may acquire, even in control signaling, an effect of acquiring a high output amount and a low delay service, which are advantages of the beamforming-based RAT, by selecting the MeNB in consideration of the PD value for each cell supporting the beamforming-based RAT.

Figure 18:
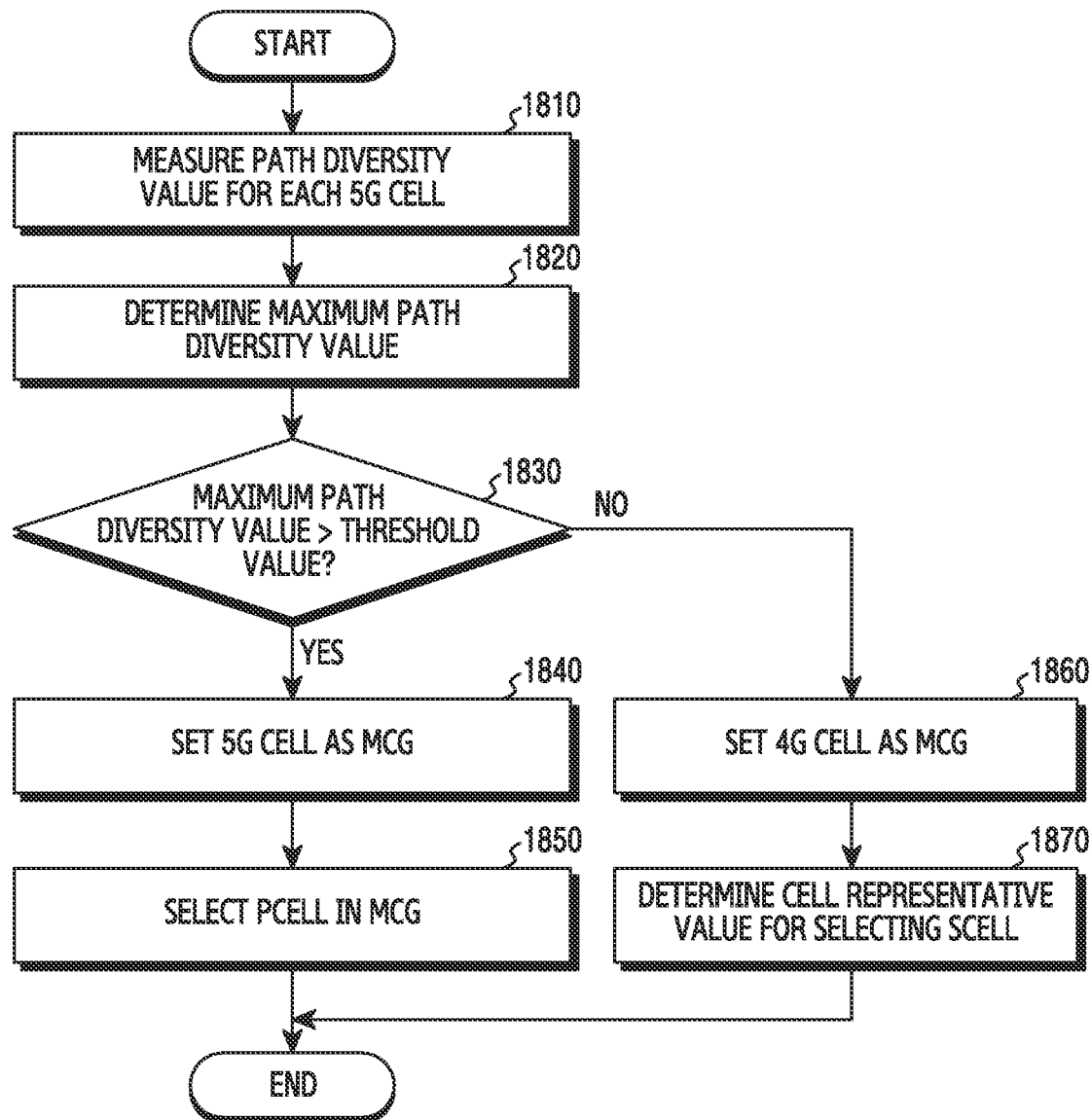
FIG. 18 is a flowchart illustrating the operation of the terminal for selecting an RAT supporting a MCG according to an embodiment of the present disclosure.

FIG. 18 is a flowchart illustrating the operation of a terminal for selecting an RAT supporting an MCG according to various embodiments of the present disclosure. The terminal may be the terminal 630 of FIG. 6.

Referring to FIG. 18, the operation of the terminal 630 will be described based on the assumption of the wireless communication environment 1700 or the wireless communication environment 1750 of FIG. 17.

Referring to FIG. 18, in operation 1810, the terminal 630 may measure a PD value for each 5G cell. The terminal 630 may identify available paths greater than or equal to a threshold value among a plurality of paths for one 5G cell. The terminal 630 may determine the PD value for the 5G cell based on BD values for the identified available paths. For example, the terminal 630 may determine the PD value according to Equation 6 above. In this way, the terminal 630 may acquire the PD values for neighboring 5G cells.

In operation 1820, the terminal 630 may determine a maximum PD value. The terminal 630 may identify the greatest value among the PD values for the 5G cells acquired in operation 1810. The terminal 630 may determine the identified value as the maximum PD value.

In operation 1830, the terminal 630 may determine whether the identified maximum PD value is greater than a threshold value. The threshold value may be a value that guarantees robustness at a predetermined level or higher against a channel state change according to movement of the terminal or the existence of an obstacle. The threshold value may be a predetermined constant. The constant may be set to be as high as possible since robustness at a predetermined level or higher should be guaranteed even in the situation in which a channel state change is largest. The constant may be stored in the terminal 630 in advance in a manufacturing and design process. The threshold value may also be a variable that can be adaptively controlled. The threshold value may be a value determined according to interference around the terminal 630 or the strength of noise.

When the identified maximum PD value is greater than the threshold value, the terminal 630 may perform operation 1840. When the identified maximum PD value is not greater than the threshold value, the terminal 630 may perform operation 1860.

In operation 1840, the terminal 630 may set the BS supporting the 5G cell corresponding to the identified maximum PD value as an MeNB. The 5G cell and at least one cell that can be provided to the terminal 630 by the MeNB are included in an MCG.

In operation 1850, the terminal 630 may determine a CRV for each serving cell included in the MCG. The terminal 630 may determine the CRV based on not only on the PD value acquired in operation 1810 but also on an optimal received signal value and a weighting factor. The terminal 630 may select the greatest CRV (hereinafter referred to as a maximum representative value) among the CRVs for serving cells included in the MCG. The terminal 630 may set the cell corresponding to the maximum representative value as a Pcell.

In operation 1860, the terminal 630 may set a BS supporting a 4G cell as the MeNB. The terminal 630 may measure RSRP values for 4G cells near the terminal 630. The terminal 630 may identify the cell having the greatest RSRP value among the RSRP values. The terminal 630 may set the BS supporting the identified cell as the MeNB.

In operation 1870, the terminal 630 may determine a CRV for selecting the Scell. In the situation in which the 5G BS is set as an SeNB, the terminal 630 may determine a CRV for each 5G cell such that the 5G cell having the greatest received signal value is selected as the Scell for high data output and a fast data rate. The terminal 630 may set the weighting factor to be greater than a reference value (e.g., 0.5) and operate in an optimal-received-signal-based cell selection mode. The terminal 630 may set the weighting factor to apply a greater weighted value to the optimal received signal value than a weighted value applied to the PD value.

Although FIGS. 17 and 18 are described based only on 4G and 5G, they are only examples for convenience of description, and the present disclosure is not limited thereto. An RAT supporting code division multiple access (CDMA) or an RAT supporting wideband CDMA (WCDMA), which is a communication scheme predating 4G, may be used.

Figure 19:
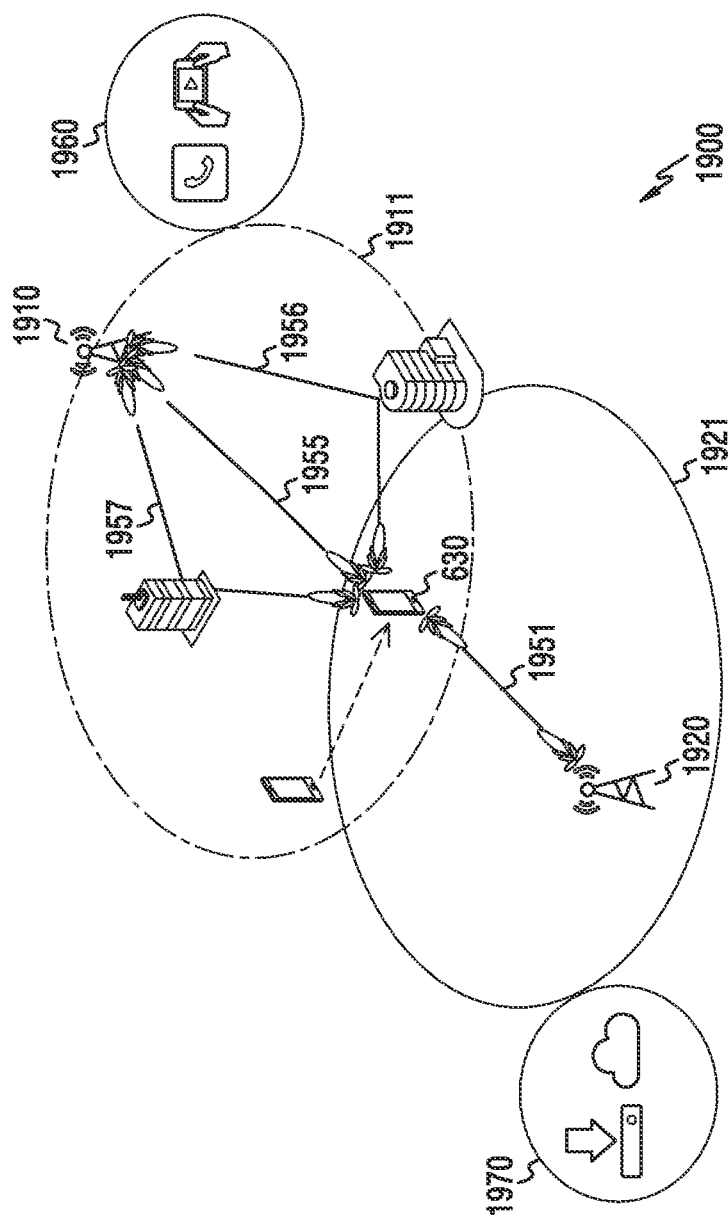
FIG. 19 illustrates an example of cell selection based on an application according to an embodiment of the present disclosure.

FIG. 19 illustrates an example of cell selection based on an application according to an embodiment of the present disclosure.

Referring to FIG. 19, the application may be an application that can be executed by the terminal 630 of FIG. 6. For example, the application may be an application that is being executed or is due to be executed by the terminal 630. The application may be an application that provides a communication service to another electronic device (e.g., a server or a terminal) over a network. The terminal 630 may be required to access the cell in order to execute the application.

Referring to FIG. 19, the wireless communication environment 1900 may include a BS 1910, a BS 1920, and the terminal 630. The BS 1910 may provide service to a cell 1911. The BS 1920 may provide service to a cell 1921. The cell 1911 may provide a path 1955, a path 1956, and a path 1957 to the terminal 630. The cell 1921 may provide a path 1951 to the terminal 630. Hereinafter, it is assumed that optimal received signal values are larger in the order of the signal received through the path 1951, the signal received through the path 1955, the signal received through the path 1966, and the signal received through the path 1957.

The terminal 630 may classify applications into two sets. The terminal 630 may classify an application required to provide real-time service as a first set 1960 and an application that is not required to provide real-time service as a second set 1970. For example, the terminal 630 may insert an application that provides a call connection into the first set. The terminal 630 may insert an application that provides a streaming service such as a video into the first set 1960. The first set 1960 may include an application that provides a video call service, a mobile game application based on the participation of users, or an application using a universal datagram protocol (UDP).

In another example, the terminal 630 may insert an application that provides a service (e.g., file transfer protocol (FTP) or peer-to-peer (P2P) file sharing) for downloading data from another electronic device into the second set 1970. The second set 1970 may further include a social network service (SNS) application, an application that provides a chatting service (e.g., a messenger service) with another user, an application that provides a cloud service, or an application using a transmission control protocol (TCP).

The application required to provide the real-time service is required to minimize a problem such as transmission blocking like RLF or a transmission delay. Accordingly, in order to select a cell servicing the applications included in the first set 1960, PD may be intensively considered. In the determination of a CRV of each cell, the terminal 630 may determine the CRV by applying a greater weighted value to the PD for each cell than the weighted value applied to the optimal received signal value. The operation mode of the terminal 630 may be a path-diversity-based cell selection mode.

In contrast, the application that is not required to provide the real-time service may be required to transmit a relatively large amount of data and have a fast data transmission speed. Accordingly, in order to select a cell servicing the applications included in the second set 1970, the optimal received signal strength value may be considered. In determination of the CRV of each cell, the terminal 630 may determine the CRV by applying a greater weighted value to the optimal received signal value than the weighted value applied to the PD value for the cell. The operation mode of the terminal 630 may be an optimal-received-signal-based cell selection mode.

The terminal 630 may acquire information on an application that is being executed or due to be executed. The terminal 630 may identify a set including the application. For example, the terminal 630 may identify the first set 1960 including the application. The terminal 630 may determine a weighting factor according to the identified set. For example, when the second set 1970 is identified, the terminal 630 may determine the weighting factor to be 0.9, which is greater than 0.5. The terminal 630 may determine CRVs for neighboring cells according to the determined weighting factor.

A cell may be selected based on the determined CRVs. The subject that selects the cell may vary depending on the state of the terminal 630. Depending on the state of the terminal 630, the cell may be selected by the terminal 630 or selected by the serving BS 680 of the terminal 630.

In some embodiments, when there is no RRC connection, the terminal 630 may select a cell for initial access. The terminal 630 may select a cell corresponding to the greatest CRV among the CRVs for respective cells. For example, when a weighting factor in the path-diversity-based cell selection mode is set for the service of the application included in the first set 1960, the terminal 630 may select a cell 1911 having a relatively great PD value. In another example, when a weighting factor in the optimal-received-signal-based cell selection mode is set for the service of the application included in the second set 1970, the terminal 630 may select a cell 1921 having a relatively great optimal received signal value.

In other embodiments, when there is an RRC connection with the terminal 630, the serving BS 680 may select a cell to provide the service to the terminal 630. The terminal 630 may be in the state in which one or more serving cells are set therein. The serving BS 680 may determine an application that is being executed by the terminal 630. The serving BS 680 may acquire application information of the determined application. The application information may contain the type of application, requirements, or quality of service (QOS) information. The QOS information may include a quality class indicator (QCI), an allocation and retention priority (ARP), a guaranteed bearer rate (GBR), and a maximum bit rate (MBR). The terminal 630 may acquire information on an EPS bearer to transmit traffic of the determined application.

The serving BS 680 may select a cell to provide the service of the application based on the acquired application information or the information on the EPS bearer. For example, when the QCI of the application is 1, the serving BS 680 may identify that the application is an application for the purpose of voice traffic. The serving BS 680 may select the cell by assigning a greater weighted value to the PD value compared to the optimal received signal value.

The serving BS 680 may select a desired cell according to various schemes. For example, when the serving BS 680 acquires the PD value for each serving cell, the serving BS 680 may select a cell having a large PD value among the serving cells for a voice service. In another example, when the serving BS 680 desires to add a serving cell, the serving BS 680 may provide a weighting factor corresponding to the path-diversity-based cell selection mode to the terminal 630 for the voice service. The weighting factor may be determined based on at least one of the QCI, the ARP, the GBR, and the MBR included in the application information. In the corresponding example, the QCI may be 1, indicating a voice chat service. The terminal 630 may calculate CRVs for neighboring cells according to the weighting factor. The terminal 630 may report the CRVs to the serving BS 680. The serving BS 680 may select the cell 1911. The serving BS 680 may provide the voice service to the terminal 630 through the selected cell 1911.

Figure 20:
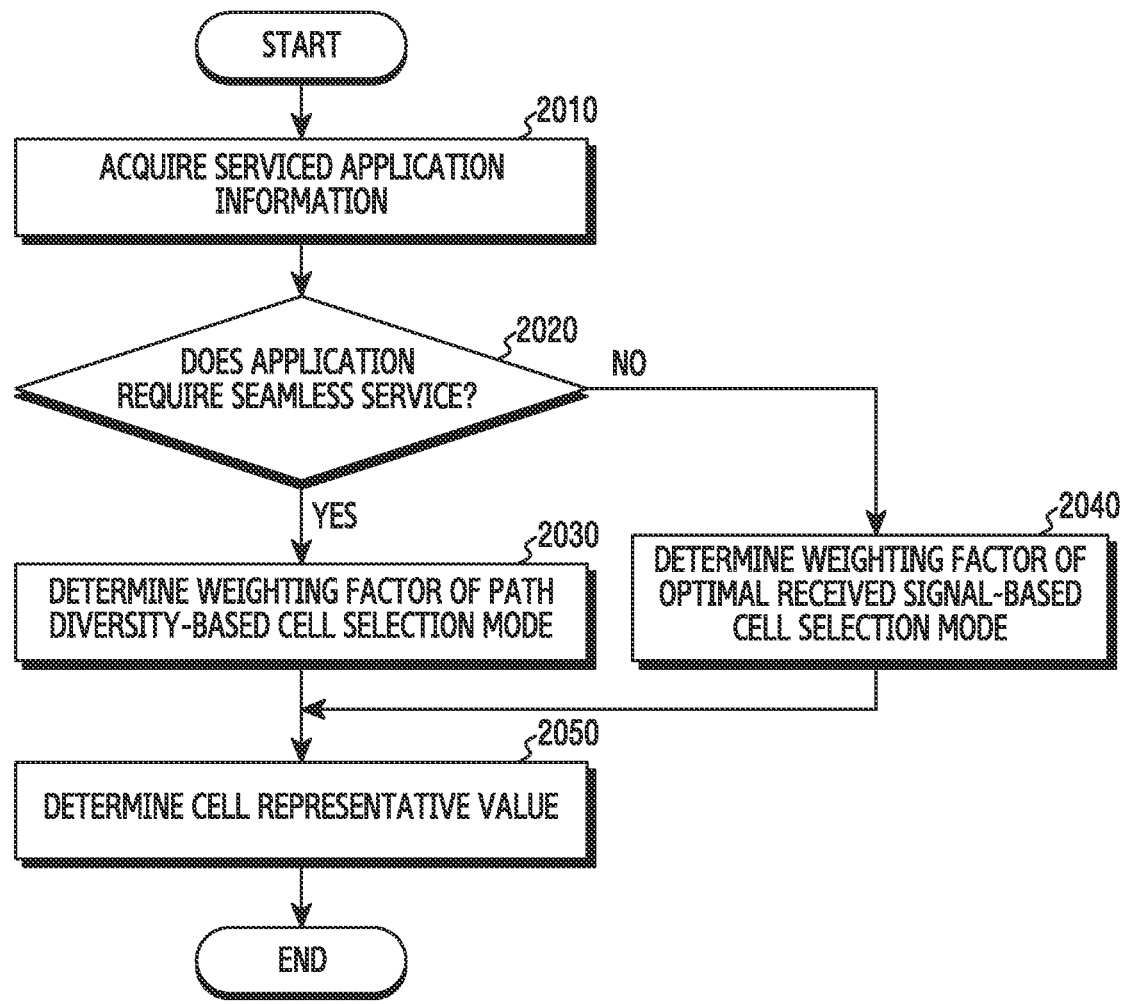
FIG. 20 is a flowchart illustrating the operation of the terminal for cell selection based on an application according to an embodiment of the present disclosure.

FIG. 20 is a flowchart illustrating the operation of a terminal for cell selection based on an application according to an embodiment of the present disclosure. The terminal may be the terminal 630 of FIG. 6.

Referring to FIG. 20, the operation of the terminal 630 will be described based on the assumption of the wireless communication environment 1900 of FIG. 19.

Referring to FIG. 20, in operation 2010, the terminal 630 may acquire application information. The application information may be information on an application that is being executed or due to be executed in the terminal 630. The application information may include parameters indicating requirements and the types of services provided by the application. For example, the application information may include information on application QOS.

In operation 2020, the terminal 630 may determine whether the application requires seamless service based on the acquired application information. When the application requires seamless service, the terminal 630 may perform operation 2030. For example, the terminal 630 may determine that the application is included in the first set 1960. When the application does not require the seamless service, the terminal 630 may perform operation 2040. For example, the terminal 630 may determine that the application is included in the second set 1970.

In operation 2030, the terminal 630 may determine a weighting factor of the path-diversity-based cell selection mode. In the calculation of the CRV, the terminal 630 may set the weighting factor such that a greater weighted value is applied to the PD value than the weighted value to be applied to the optimal received signal value. For example, the weighting factor may be smaller than 0.5.

In operation 2040, the terminal 630 may determine the weighting factor of the optimal-received-signal-based cell selection mode. In the calculation of the CRV, the terminal 630 may set the weighting factor such that a greater weighted value is applied to the optimal received signal value than the weighted value to be applied to the PD value. For example, the weighting factor may be greater than 0.5.

In operation 2050, the terminal 630 may determine the CRVs. The terminal 630 may determine the CRVs of neighboring cells according to the determined weighting factor. For example, the terminal 630 may calculate the CRVs based on Equation 6 above. Although not illustrated in FIG. 20, the terminal 630 may perform an access procedure by reporting each of the determined CRVs to the serving BS 680 or selecting a cell having the greatest value among the determined CRVs.

Although the above description has been made based on two sets including the first set 1960, which is the set of applications corresponding to the path-diversity-based cell selection mode, and the second set 1970, which is the set of applications corresponding to the optimal-received-signal-based cell selection mode, in FIGS. 19 and 20, the present disclosure is not limited thereto. The number of application sets may be three or more. The terminal 630 may identify a set corresponding to an application being executed among the three or more sets and set a weighting factor corresponding to the identified set so as to measure the cell. The terminal 630 may store a table including the three or more sets and weighting factors corresponding to the respective sets.

The serving BS 680 may also identify the set corresponding to the application being executed among the three or more sets and determine a weighting factor corresponding to the identified set. The BS 680 may store a table including the three or more sets and weighting factors corresponding to the respective sets. The serving BS 680 may select the cell according to the determined weighting factors. For example, the serving BS 680 may recalculate CRVs of reported serving cells according to previous weighting factors. In another example, the serving BS 680 may transmit measurement configuration information to the terminal 630 to perform measurement for cell addition through the determined weighting factor.

Figure 21:
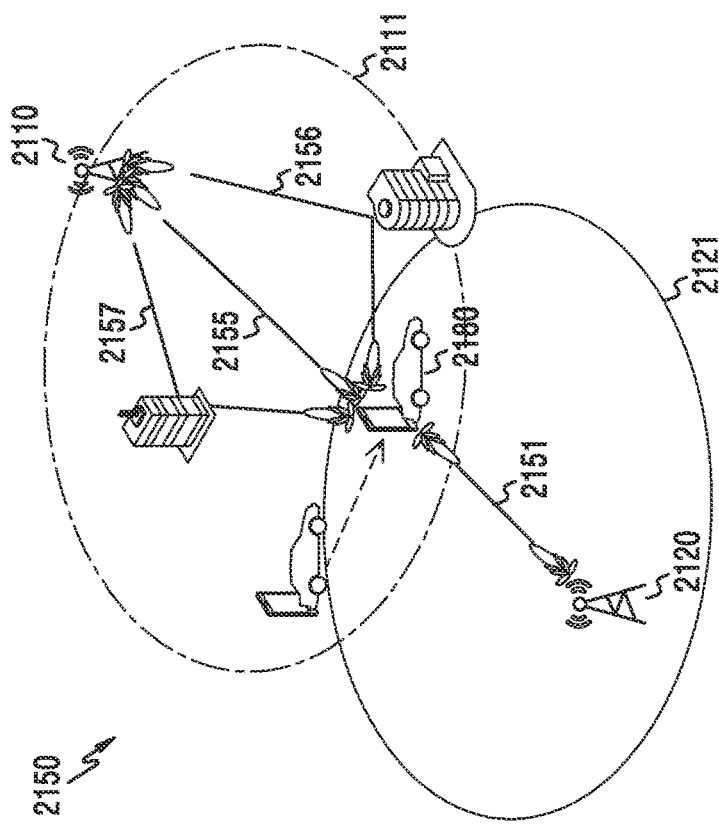
FIG. 21 illustrates an example of cell selection based on movement of the terminal according to an embodiment of the present disclosure.
Figure 21:
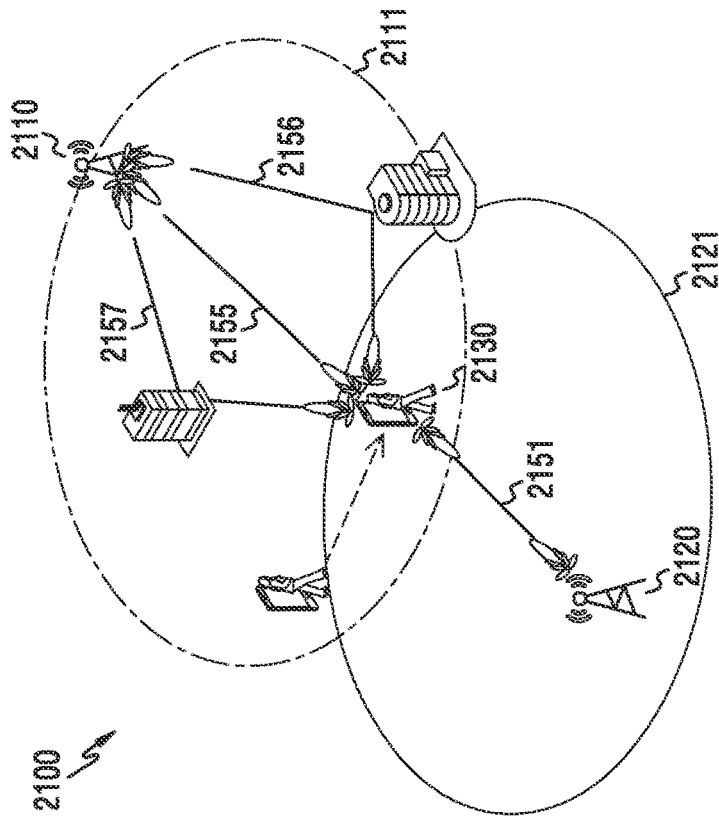

FIG. 21 illustrates an example of cell selection based on movement of a terminal according to an embodiment of the present disclosure. The terminal may be the terminal 630 of FIG. 6.

Referring to FIG. 21, a wireless communication environment 2100 and a wireless communication environment 2150 may include a BS 2110, a BS 2120, and a terminal 630. The BS 2110 may provide service to a cell 2111. The BS 2120 may provide service to a cell 2121. The cell 2111 may provide a path 2155, a path 2156, and a path 2157 to the terminal 630. The cell 2121 may provide a path 2151 to the terminal 630. Hereinafter, it is assumed that optimal received signal values are larger in the order of the signal received through the path 2151, the signal received through the path 2155, the signal received through the path 2156, and the signal received through the path 2157. In the wireless communication environment 2100, a user 2130 of the terminal 630 is passing through an overlapping area between the cell 2111 and the cell 2121 on foot. In the wireless communication environment 2150, the terminal 630 is passing through the overlapping area between the cell 2111 and the cell 2121 by car 2180.

As the terminal 630 moves, the state of a channel between the cell 2111 or the cell 2121 and the terminal 630 may change. The degree of the change in the channel state may be inversely proportional to the robustness of the cell providing the channel. The degree of the change in the channel state may vary depending on the movement level of the terminal 630. Accordingly, the terminal 630 may determine the movement level of the terminal 630 and acquire information on the degree of required robustness of the cell.

In some embodiments, the terminal 630 may determine the movement level of the terminal 630 by calculating a Doppler shift value. The terminal 630 may determine the movement level of the terminal 630 based on how much an apparent frequency changes according to a Doppler effect due to the movement of the terminal 630. In other embodiments, the terminal 630 may determine the movement level of the terminal 630 by measuring the frequency of handover or cell reselection per unit time. The terminal 630 may determine the movement level of the terminal 630 by calculating the number of handovers or cell reselections during a predetermined interval and dividing the calculated number of handovers or cell reselections by a time value corresponding to the predetermined interval. In other embodiments, the terminal 630 may include a separate device to measure the speed of movement of the terminal 630. The separate device may include a global positioning system (GPS) module, an acceleration sensor, or a gyro sensor. The terminal 630 may determine a movement level indicating a range corresponding to the measured speed. In other embodiments, the terminal 630 may determine a movement level for predicted movement of the terminal 630 based on a user's movement history information.

The terminal 630 may determine whether the determined movement level exceeds a threshold value. The threshold value may indicate a movement level at which a weighted value of a robustness degree for a required cell and a weighted value of a data rate for a desired cell equal each other. The terminal 630 may set the weighted value of the robustness degree for the cell and the weighted value of the data rate for the cell differently according to the movement level.

The terminal 630 may determine a weighting factor according to whether the movement level of the terminal 630 exceeds the threshold value. For example, when the terminal 630 moves along with the user 2130, the terminal 630 may determine that the movement level does not exceed the threshold value. Since the movement level does not exceed the threshold value, the terminal 630 may determine that robustness for the change in the channel state is at a predetermined level or higher. In order to increase the data rate, the terminal 630 may operate in the optimal-received-signal-based cell selection mode. The terminal 630 may determine a weighting factor corresponding to the optimal-received-signal-based cell selection mode. In another example, when the terminal 630 moves by car 2180, the terminal 630 may determine that the movement level exceeds the threshold value. Since the movement level is relatively high, the terminal 630 may operate in the path-diversity-based cell selection mode to select a cell that is robust against changes in the channel state. The terminal 630 may determine a weighting factor corresponding to the path-diversity-based cell selection mode.

The terminal 630 may calculate CRVs based on the determined weighting factors. For example, when the terminal 630 moves along with the user 2130, the terminal 630 may calculate CRVs with more focus on data throughput and a data rate of the cell than on robustness for the cell. The cell 2121 including a path (e.g., a path 2151) having the highest-priority optimal received signal value may be selected. In another example, when the terminal 630 moves along with the car 2180, the terminal 630 may calculate CRVs with more focus on the robustness for the cell than on the data output for the cell. The cell 2111 including a plurality of available paths (e.g., paths 2155, 2156, and 2157) having high non-correlation therebetween may be selected.

A cell may be selected based on the determined CRVs. The subject that selects the cell may vary depending on the state of the terminal 630. Depending on the state of the terminal 630, the cell may be selected by the terminal 630, or may be selected by the serving BS 680 of the terminal 630.

In some embodiments, when there is no RRC connection, the terminal 630 may select a cell for initial access. The terminal 630 may select a cell corresponding to the greatest CRV among the CRVs for respective cells. For example, when the weighting factor of the path-diversity-based cell selection mode according to the movement level of the terminal 630 moving along with the user 2130 is set, the terminal 630 may select a cell 2111 having a relatively great PD value. In another example, when the weighting factor of the optimal-received-signal-based cell selection mode according to the movement level of the terminal 630 moving along with the car 2180 is set, the terminal 630 may select the cell 2121 having a relatively great optimal received signal value.

In other embodiments, when there is an RRC connection with the terminal 630, the serving BS 680 may select a cell to provide the service to the terminal 630. The terminal 630 may be in the state in which one or more serving cells are set therein. The serving BS 680 may identify the movement level of the terminal 630. The serving BS 680 may identify the movement level of the terminal 630 based on a change in measurement report values for neighboring cells periodically received from the terminal 630, a quality measurement value of a reference signal between the serving BS 680 and the terminal, or a change in information on interference occurring near a cell boundary. Alternatively, the serving BS 680 may receive the movement level of the terminal 630 from the terminal 630.

The serving BS 680 may select the cell based on the identified movement level of the terminal 630. For example, when measurement report values for neighboring cells of the terminal 630 scarcely change, the serving BS 680 may select the cell by assigning a greater weighted value to the optimal received signal value than the PD value.

The serving BS 680 may select a desired cell according to various schemes. For example, when the serving BS 680 acquires PD values for the serving cells, the serving BS 680 may select the cell 2111 having a large PD value among the serving cells for the terminal 630 moving by car 2180. In another example, when the serving cell is added, the serving BS 680 may provide the weighting factor corresponding to the path-diversity-based cell selection mode to the terminal 630 for the terminal 630. The terminal 630 may calculate CRVs for neighboring cells according to the weighting factor. The terminal 630 may report the CRVs to the serving BS 680. The serving BS 680 may select the cell 2111. The serving BS 680 may provide the service to the terminal 630 moving along with the car 2180 through the selected cell 2111.

In the above description, the terminal 630 moves to another area, as an example. However, it goes without saying that the present disclosure is applicable to a movement in which the direction changes (e.g. the terminal is tilted or rotated). For example, when the rotation speed of the terminal 630 exceeds a threshold, the terminal 630 may determine a weighting factor corresponding to the path-diversity-based cell selection mode.

Figure 22:
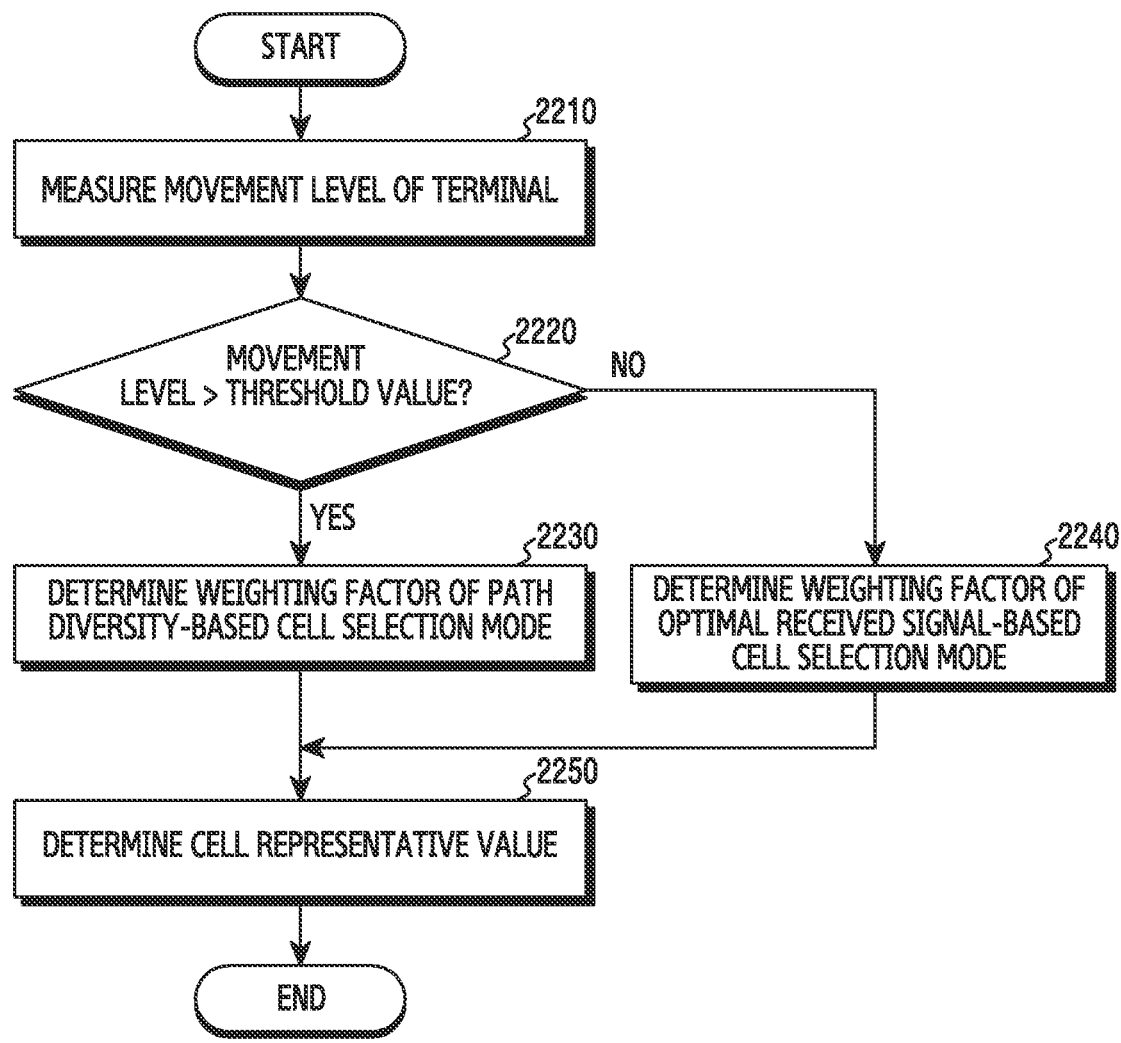
FIG. 22 is a flowchart illustrating the operation of the terminal for cell selection based on movement of the terminal according to an embodiment of the present disclosure.

FIG. 22 is a flowchart illustrating the operation of a terminal for cell selection based on movement of the terminal according to an embodiment of the present disclosure. The terminal may be the terminal 630 of FIG. 6.

Referring to FIG. 22, the operation of the terminal 630 will be described based on the assumption of the wireless communication environment 1900 or the wireless communication environment 1950 of FIG. 20.

Referring to FIG. 22, in operation 2210, the terminal 630 may measure the movement level of the terminal 630. The terminal 630 may measure the movement level of the terminal 630 based on at least one of the number of handovers, the number of cell additions/releases, a Doppler shift value, and a change in a periodic measurement report value.

In operation 2220, the terminal 630 may determine whether the measured movement level exceeds a threshold value. The terminal 630 may perform operation 2230 when the movement level exceeds the threshold value. The terminal 630 may perform operation 2240 when the movement level does not exceed the threshold value.

In operation 2230, the terminal 630 may determine a weighting factor of the path-diversity-based cell selection mode. When the terminal 630 moves relatively fast (e.g., moves along with the car 2180), a channel change becomes serious, and thus the provision of a robust link may be required. In the calculation of the CRV, the terminal 630 may set the weighting factor such that a greater weighted value is applied to the PD value than the weighted value to be applied to the optimal received signal value. For example, the weighting factor may be smaller than 0.5.

In operation 2240, the terminal 630 may determine the weighting factor of the optimal-received-signal-based cell selection mode.

When the terminal 630 moves relatively slowly (e.g., moves along with the user 2130), the channel change is relatively small and thus robustness at a predetermined level or higher is guaranteed. Accordingly, in the calculation of the CRV, for a desired data rate, the terminal 630 may set a weighting factor such that a greater weighted value is applied to the optimal received signal value than the weighted value to be applied to the PD value. For example, the weighting factor may be greater than 0.5.

In operation 2250, the terminal 630 may determine the CRVs. The terminal 630 may determine the CRVs of neighboring cells according to the determined weighting factor. For example, the terminal 630 may calculate the CRVs based on Equation 6 above. Although not illustrated in FIG. 20, the terminal 630 may perform an access procedure by reporting the determined CRVs to the serving BS 680 or selecting the cell having the greatest values among the determined CRVs.

Although FIGS. 21 and 22 have described only two cells selection modes according to the threshold value, the present disclosure is not limited thereto. Three or more divided operation modes may be considered.

When there is no RRC connection, the terminal 630 may calculate CRVs based on the weighting factor corresponding to the movement level without determining whether the movement level exceeds the threshold value. A movement level table may be used. The movement level table may include three or more movement levels and weighting factors corresponding to a plurality of movement levels. After detecting the movement speed of the terminal 630, the terminal 630 may identify a corresponding movement level and determine a corresponding weighting factor so as to determine CRVs of neighboring cells.

An embedded function may also be used. The terminal 630 may calculate the weighting factor through the function embedded in the detected movement speed. The terminal 630 may determine CRVs of neighboring cells based on the calculated weighting factor. The terminal 630 may perform an access procedure on a cell having the greatest value among the CRVs.

When there is an RRC connection in the terminal 630, the serving BS 680 may detect the movement speed of the terminal 630 and determine the movement level in the same way as the determination by the terminal 630. The serving BS 680 may select the cell based on the weighting factor determined according to the movement level. For example, the serving BS 680 may recalculate CRVs of reported serving cells according to previous weighting factors. In another example, the serving BS 680 may transmit measurement configuration information to the terminal 630 to perform measurement for cell addition through the determined weighting factor.

Various wireless environments may be considered depending on the device to which the terminal 630 is connected and the type of terminal 630.

In some embodiments, the terminal 630 may be a device connected to a display unit (e.g., monitor or TV) of a vehicle (e.g., bus, train, or airplane) to provide a service. The display unit may be a device operationally connected to a communication module (e.g., a beamforming-based communication module) of the terminal 630. The display unit may provide images or videos (e.g., advertisements). The cell may be adaptively selected in accordance with movement of the vehicle. For example, when the movement of the vehicle is greater than or equal to a threshold value, the terminal 630 may operate in the path-diversity-based cell selection mode. This is because the user has difficulty in accurately identifying the content of the display unit in the state in which the terminal 630 moves fast, and thus seamless service of a low-quality image (e.g., a two-dimensional (2D) image or a 16-bit high-color image) is more important than a high-quality image (e.g., a three-dimensional (3D) image or a 32-bit or 24-bit true-color image). In contrast, when the movement of the vehicle is smaller than the threshold value, for example, when the vehicle stops, the terminal 630 may operate in the optimal-received-signal-based cell selection mode. This is because the calling user's attention may be important in the state in which the terminal 630 stops. As the terminal 630 accesses a cell having a fast data rate, the display unit may provide a high-quality image.

In other embodiments, the terminal 630 may be a device connected to an image acquisition means (e.g., a camera, a camcorder, or a closed-circuit TV (CCTV)) to provide a service. The image acquisition means may be a device operationally connected to a communication module of the terminal 630. The image acquisition means may acquire images or videos including a predetermined object. The cell may be adaptively selected in accordance with the capability of the image acquisition means. For example, in cell selection, the terminal 630 may adaptively apply the weighted value according to QOS requirements (e.g., quarter full high definition (qHD), high definition (HD), quad HD (QHD), full HD (FHD), or ultra HD (UHD)). The terminal 630 may select a cell having a greater optimal received signal value in the case in which the camera requires a large amount of data, like UHD, rather than the case in which the camera requires a small amount of data, like HD. In another example, the terminal 630 may adaptively control the operation mode according to the purpose of the image acquisition means. When high security is required (e.g., for a CCTV, a black box, or a monitoring camera), the provision of seamless service is requested and thus the terminal 630 may operate in the path-diversity-based cell selection mode. In contrast, when security is relatively less important (e.g., a camera for broadcasting), the provision of high-quality service may be more important, and thus the terminal 630 may operate in the optimal-received-signal-based cell selection mode.

In other embodiments, the terminal 630 may be a device connected to the vehicle and the image acquisition means. For example, the terminal 630 may be an unmanned aerial vehicle (UAV). The UAV may also be referred to as a drone. The terminal 630 may adaptively select the cell based on the movement of the vehicle and the configuration of the image acquisition means. For example, the operation scenario illustrated in FIG. 23 may be considered as an example.

Figure 23:
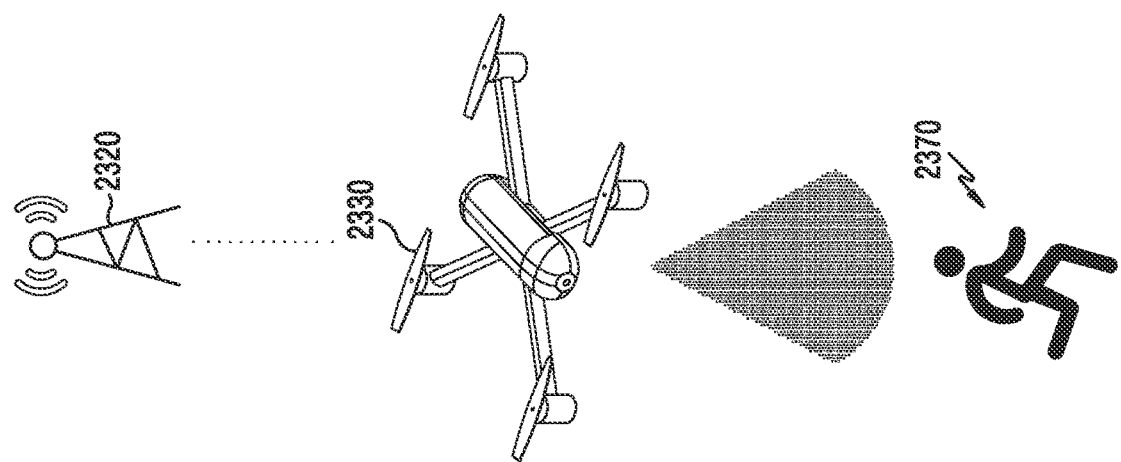
FIG. 23 illustrates an example of the operation of an unmanned aerial vehicle (UAV) according to an embodiment of the present disclosure.
Figure 23:
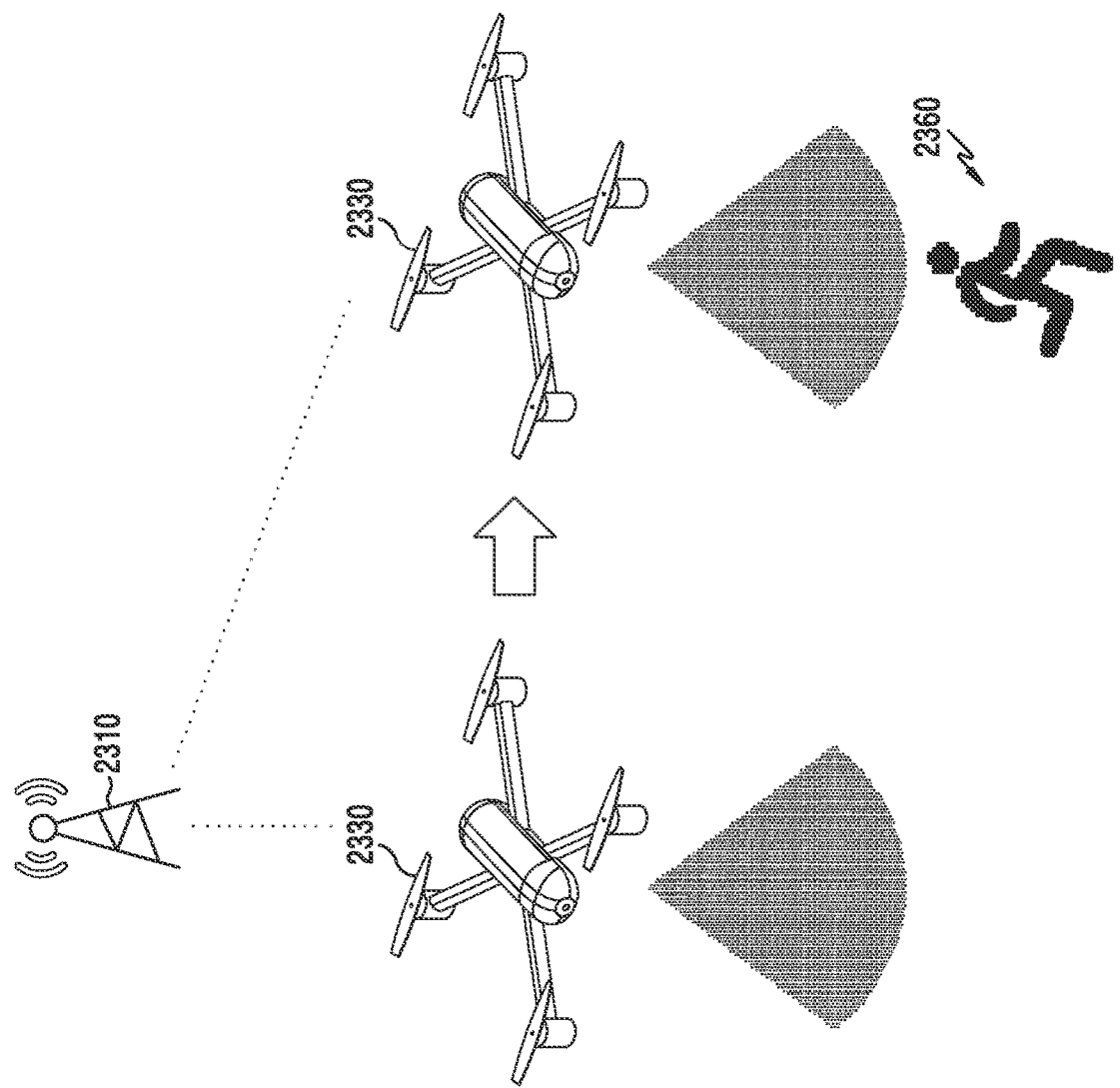

FIG. 23 illustrates an example of the operation of a UAV 2330 according to an embodiment of the present disclosure.

Referring to FIG. 23, when the UAV 2330 moves at a high speed to monitor a wide area, a BS 2310 supporting a cell having a great PD value may be selected in order to provide seamless service. In such a situation, the UAV 2330 may set the quality of the image acquisition means to be low when the data rate becomes equal to or smaller than a threshold value. The UAV 2330 may acquire a low-quality image of a predetermined object through configuration of a low quality. The UAV 2330 may transmit the acquired image to another user, another terminal, or a server. The UAV 2330 may seamlessly provide a service at a predetermined level or higher through the configuration of the low quality.

The UAV 2330 may detect a particular object. The UAV 2330 may acquire a low-quality image 2360 of the particular object. The UAV 2330 may determine that the particular object is an object required to be checked based on the low-quality image 2360. The UAV 2330 may stop to accurately identify the particular object. The UAV 2330 may change the operation mode from the path-diversity-based cell selection mode to the optimal-received-signal-based cell selection mode. In the optimal-received-signal-based cell selection mode, a cell 2320 capable of increasing the data rate may be selected. Since the UAV 2330 can acquire a high-quality image, the UAV 2330 may set the image acquisition means to be high. Through the configuration of high quality, the UAV 2330 may acquire an image 2370 of the particular object. The UAV 2330 may transmit the acquired image 2370 to another user, another terminal, or a server. Thereafter, the UAV 2330 may repeatedly perform the operations after changing the operation mode back to the path-diversity-based cell selection mode in order to monitor the wide area again.

In addition to the above-described various embodiments, various scenarios may be considered. The terminal 630 may adaptively change the operation mode according to a service required in the corresponding operation. When seamless service provided by the terminal 630 is important (e.g., for disaster broadcast, rescue broadcast, or traffic information), the terminal 630 may operate in the path-diversity-based cell selection mode. A cell having a high PD value may be selected. In contrast, when seamlessness of the service of the terminal 630 is relatively less important or service quality is important (e.g., for advertising, smart metering, or home automation), the terminal 630 may operate in the optimal-received-signal-based cell selection mode. A cell having a great optimal received signal value may be selected.

A terminal according to various embodiments of the present disclosure can perform communication through a targeted cell by calculating CRVs in consideration of PD as well as optimal received signal values (e.g., RSRP). The PD value and the optimal received signal value may be adaptively controlled according to various conditions, and a value that represents the cell may be variously defined. An index indicating the cell may be set according to the type of service provided to the terminal, communication technology (e.g., LTE-CA or DC) supported by the terminal, an application (e.g., a voice communication application) used by the terminal, the mobility level of the terminal, QOS requirements, a bandwidth request, and the importance level of data to be transmitted. A different BS, a different beam, or a different frequency may be selected according to the set index. For example, the terminal can prevent capability deterioration such as unnecessary handover or transmission blocking due to RLF by selecting a cell that is robust against channel change when there is an obstacle or when the terminal moves.

Methods stated in claims and/or specifications according to various embodiments may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the present disclosure as defined by the appended claims and/or disclosed herein.

The programs (software modules or software) may be stored in non-volatile memories including a random-access memory (RAM) and a flash memory, a read only memory (ROM), an electrically erasable programmable ROM (EEPROM), a magnetic disc storage device, a compact disc-ROM (CD-ROM), digital versatile discs (DVDs), or other type optical storage devices, or a magnetic cassette. Alternatively, any combination of some or all of the above may form a memory in which the program is stored. Further, a plurality of such memories may be included in the electronic device.

In addition, the programs may be stored in an attachable storage device which may access the electronic device through communication networks such as the internet, intranet, local area network (LAN), wide LAN (WLAN), and storage area network (SAN) or a combination thereof. Such a storage device may access, via an external port, the electronic device that performs various embodiments of the present disclosure. Further, a separate storage device on the communication network may access a portable electronic device.

In the above-described detailed various embodiments of the present disclosure, a component included in the present disclosure is expressed in the singular or the plural according to a presented detailed embodiment. However, the singular form or plural form is selected for convenience of description suitable for the presented situation, and various embodiments of the present disclosure are not limited to a single element or multiple elements thereof. Further, either multiple elements expressed in the description may be configured into a single element or a single element in the description may be configured into multiple elements.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method performed by a user equipment (UE) in a wireless communication system, the method comprising:
    receiving, from a base station, a measurement configuration for one or more cells;
    receiving one or more downlink signals associated with one or more beams on a cell;
    obtaining a measurement result for the cell based on the measurement configuration; and
    transmitting, to the base station, the measurement result for the cell;
    wherein the measurement result for the cell comprises:
        a result of a layer-3 filtering for a cell quality of the cell, and
        path diversity information for indicating a number of one or more available beams, each of the one or more available beams providing a signal quality higher than a threshold,
    wherein the cell quality is obtained based on an average of signal qualities of downlink signals among the one or more downlink signals, and
    wherein each of the signal qualities is higher than the threshold.

2. The method of claim 1, wherein one or more signal qualities correspond to at least one of reference signal received power (RSRP), reference signal received quality (RSRQ), or signal-to-interference and noise ratio (SINR).

3. The method of claim 1, wherein the measurement configuration further includes frequency information of the cell and beam information of the cell.

4. The method of claim 1, wherein the threshold is configured for the cell to be measured.

5. The method of claim 1,
    wherein when obtaining one or more signal qualities comprises:
        obtaining measurement values by measuring the downlink signals, and
        performing a layer-1 filtering to the measurement values to obtain the one or more signal qualities, and
    wherein the averaging of the signal qualities is performed between the layer-1 filtering and the layer-3 filtering.

6. The method of claim 1, further comprising:
    receiving, from a base station, measurement configuration information including:
        information for indicating the cell, and
        information associated with a reporting condition;
    determining whether the reporting condition is satisfied or not based on the layer-3 filtered measurement result; and
    transmitting the measurement result including a cell measurement information when the reporting condition is satisfied.

7. The method of claim 1, wherein the one or more downlink signals comprises one or more channel state information-reference signals (CSI-RSs).

8. The method of claim 1,
    wherein the layer-3 filtered measurement result is obtained based on an equation:

$$F_n = (1-a) \cdot F_{n-1} + a \cdot M_n, \text{ and}$$

wherein $F_{n-1}$ denotes a previous measurement result of layer-3 filtering, $M_n$ denotes the obtained measurement result for the cell, and a denotes a filter coefficient.

9. The method of claim 1, further comprising:
    identifying a representative value that is highest among one or more signal qualities;
    performing a layer-3 filtering to the identified representative value; and
    transmitting measurement information for the layer-3 filtered representative value to a base station,
    wherein the identifying of the representative value is performed after a layer-1 filtering and before the layer-3 filtering of the identified representative value.

10. A user equipment (UE) in a wireless communication system, the UE comprising:
    at least one transceiver; and
    at least one processor operably coupled to the at least one transceiver, configured to:
        receive, from a base station, a measurement configuration for one or more cells,
        receive one or more downlink signals associated with one or more beams on a cell,
        obtain a measurement result for the cell based on the measurement configuration, and
        transmit, to the base station, the measurement result for the cell,
    wherein the measurement result for the cell comprises:
        a result of a layer-3 filtering for a cell quality of the cell, and path diversity information for indicating a number of one or more available beams, each of the one or more available beams providing a signal quality higher than a threshold, wherein the cell quality is obtained based on an average of signal qualities of downlink signals among the one or more downlink signals, and wherein each of the signal qualities is higher than the threshold.

11. The UE of claim 10, wherein one or more signal qualities correspond to at least one of reference signal received power (RSRP), reference signal received quality (RSRQ), or signal-to-interference and noise ratio (SINR).

12. The UE of claim 10, wherein the measurement configuration further includes frequency information of the cell and beam information of the cell.

13. The UE of claim 10, wherein the threshold is configured for the cell to be measured.

14. The UE of claim 10,
wherein the at least one processor is, in order to obtain one or more signal qualities, configured to:
obtain measurement values by measuring the downlink signals, and
perform a layer-1 filtering to the measurement values to obtain the one or more signal qualities, and
wherein the averaging of the signal qualities is performed between the layer-1 filtering and the layer-3 filtering.

15. The UE of claim 10, wherein the at least one processor is further configured to:
receive, from a base station, measurement configuration information including:
information for indicating the cell, and
information associated with a reporting condition,
determine whether the reporting condition is satisfied or not based on the layer-3 filtered measurement result, and
control the at least one transceiver to transmit the measurement result including a cell measurement information when the reporting condition is satisfied.

16. The UE of claim 10, wherein the one or more downlink signals comprises one or more channel state information-reference signals (CSI-RSs).

17. The UE of claim 10,
wherein the layer-3 filtered measurement result is obtained based on an equation:

$$F_n = (1-a) \cdot F_{n-1} + a \cdot M_n, \text{ and}$$

wherein $F_{n-1}$ denotes a previous measurement result of layer-3 filtering, $M_n$ denotes the obtained measurement result for the cell, and a denotes a filter coefficient.

18. The UE of claim 10,
wherein the at least one processor is further configured to:
identify a representative value that is highest among one or more signal qualities,
perform a layer-3 filtering to the identified representative value, and
control the at least one transceiver to transmit measurement information for the layer-3 filtered representative value to a base station, and
wherein the identifying of the representative value is performed after a layer-1 filtering and before the layer-3 filtering of the identified representative value.

* * * * *